US012175476B2

(12) United States Patent
Sambasivan et al.

(10) Patent No.: US 12,175,476 B2
(45) Date of Patent: Dec. 24, 2024

(54) SYSTEMS AND METHODS FOR ASSESSING QUALITY OF RETAIL PRODUCTS

(71) Applicant: Walmart Apollo, LLC, Bentonville, AR (US)

(72) Inventors: Lokesh Kumar Sambasivan, Tirupati (IN); Sandeep Jaywant Tendulkar, Bengaluru (IN); Shivani S. Naik, Seattle, WA (US); Pushkar Pushp, Ranchi (IN); Soumabrata Arup Chakraborty, Pune (IN); Abhishek Kushwaha, Prayagraj (IN); Maxine Caballero Perales, Jacksonville, FL (US); Chuck E. Tilmon, Rogers, AR (US); Geronimo Valenzuela, Belton, TX (US); Ray L Baber, Pembroke, GA (US); Daniel J. Forsgren, Tremonton, UT (US); Chuck S. Rorie, Monroe, NC (US); Raghuram Sathyamurthy, Salem (IN); Nicholas G. Van Voorst, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 168 days.

(21) Appl. No.: 17/588,922

(22) Filed: Jan. 31, 2022

(65) Prior Publication Data

US 2023/0245133 A1 Aug. 3, 2023

(51) Int. Cl.
*G06Q 30/018* (2023.01)
*G06T 7/00* (2017.01)
*G06T 7/90* (2017.01)

(52) U.S. Cl.
CPC .......... *G06Q 30/018* (2013.01); *G06T 7/001* (2013.01); *G06T 7/90* (2017.01); *G06T 2207/30128* (2013.01)

(58) Field of Classification Search
CPC .... G06Q 30/0629; G03B 15/06; G03B 15/02; G03B 15/07
See application file for complete search history.

(56) References Cited

U.S. PATENT DOCUMENTS

| | | | |
|---|---|---|---|
| 4,750,197 A | 6/1988 | Denekamp | |
| 5,369,995 A | 12/1994 | Scheinbeim | |

(Continued)

FOREIGN PATENT DOCUMENTS

| | | |
|---|---|---|
| CA | 2469699 | 1/2016 |
| CN | 1789992 | 6/2006 |

(Continued)

OTHER PUBLICATIONS

S. V, G. U. Kiran, Y. Guntupalli, C. N. Gayathri and A. S. Raju, "Automatic Visual Inspection—Defects Detection using CNN," 2022 6th International Conference on Electronics, Communication and Aerospace Technology, Coimbatore, India, 2022, pp. 584-589, doi: 10.1109/ICECA55336.2022.10009402. (Year: 2022).*

(Continued)

*Primary Examiner* — Vincent M Cao
(74) *Attorney, Agent, or Firm* — Fitch, Even, Tabin & Flannery, LLP

(57) ABSTRACT

Systems and methods for assessing quality of and detecting defects in retail products include a housing having an interior, a product holding surface, an image capture device configured to capture an image of the product, a lighting element configured to provide lighting within the housing, an electronic database configured to store electronic data including reference image data associated with the product and representing the product in various sizes and various quality states, and a processor-based control circuit in communication with the first image capture device and the electronic database. The control circuit is configured to obtain image data representing the image of the product, (Continued)

obtain the reference image data, analyze the image data and the reference image data to identify the product and identify a size of a defect present on the product, and output a notification indicating whether or not the product is of acceptable quality.

20 Claims, 10 Drawing Sheets

(56) References Cited

U.S. PATENT DOCUMENTS

| | | | |
|---|---|---|---|
| 5,621,162 A | 4/1997 | Yun | |
| 5,659,630 A * | 8/1997 | Forslund | G06T 7/001 |
| | | | 348/129 |
| 5,671,362 A | 9/1997 | Cowe | |
| 5,774,053 A | 6/1998 | Porter | |
| 5,791,497 A | 8/1998 | Campbell | |
| 5,835,012 A | 11/1998 | Wilk | |
| 5,917,926 A | 6/1999 | Leverett | |
| 6,204,763 B1 | 3/2001 | Sone | |
| 6,285,282 B1 | 9/2001 | Dorenbosch et al. | |
| 6,294,997 B1 | 9/2001 | Paratore et al. | |
| 6,296,187 B1 | 10/2001 | Shearer | |
| 6,386,454 B2 | 5/2002 | Hecht | |
| 6,388,774 B1 * | 5/2002 | Kurata | H04N 1/00405 |
| | | | 358/475 |
| 6,435,002 B1 | 8/2002 | Briggs | |
| 6,497,367 B2 | 12/2002 | Conzola | |
| 6,549,135 B2 | 4/2003 | Singh | |
| 6,600,418 B2 | 7/2003 | Francis | |
| 6,624,752 B2 | 9/2003 | Klitsgaard | |
| 6,779,722 B1 | 8/2004 | Mason | |
| 6,847,447 B2 | 1/2005 | Ozanich | |
| 6,865,516 B1 | 3/2005 | Richardson | |
| 6,876,990 B2 | 4/2005 | Yamanishi | |
| 6,965,871 B1 | 11/2005 | Szabo | |
| 6,970,100 B2 | 11/2005 | Lovegreen | |
| 6,982,640 B2 | 1/2006 | Lindsay | |
| 7,004,621 B2 | 2/2006 | Roberts | |
| 7,014,816 B2 | 3/2006 | Miller | |
| 7,027,958 B2 | 4/2006 | Singh | |
| 7,057,495 B2 | 6/2006 | Debord | |
| 7,065,501 B1 | 6/2006 | Brown | |
| 7,148,803 B2 | 12/2006 | Bandy | |
| 7,185,810 B2 | 3/2007 | White | |
| 7,245,386 B2 | 7/2007 | Philipps | |
| 7,248,147 B2 | 7/2007 | Debord | |
| 7,271,720 B2 | 9/2007 | Tabe | |
| 7,271,724 B2 | 9/2007 | Goyal | |
| 7,287,694 B2 | 10/2007 | Banavar | |
| 7,298,257 B2 | 11/2007 | Suzuki | |
| 7,347,361 B2 | 3/2008 | Lovett | |
| 7,372,003 B2 | 5/2008 | Kates | |
| 7,434,724 B2 | 10/2008 | Lane | |
| 7,450,247 B2 | 11/2008 | Sandberg | |
| 7,455,225 B1 | 11/2008 | Hadfield | |
| 7,487,913 B2 | 2/2009 | Adema | |
| 7,495,558 B2 | 2/2009 | Pope | |
| 7,543,741 B2 | 6/2009 | Lovett | |
| 7,560,013 B2 | 7/2009 | Shekarriz | |
| 7,673,464 B2 | 3/2010 | Bodin | |
| 7,675,424 B2 | 3/2010 | Debord | |
| 7,693,739 B2 | 4/2010 | Schmidtberg | |
| 7,757,947 B2 | 7/2010 | Reznik | |
| 7,769,221 B1 | 8/2010 | Shakes | |
| 7,775,130 B2 | 8/2010 | Harish | |
| 7,792,711 B2 | 9/2010 | Swafford, Jr. | |
| 7,796,038 B2 | 9/2010 | Batra | |
| 7,810,720 B2 | 10/2010 | Lovett | |
| 7,835,885 B2 | 11/2010 | Ben-Tzur | |
| 7,937,244 B2 | 5/2011 | Kadaba | |
| 7,954,712 B2 | 6/2011 | Babcock | |
| 7,960,176 B2 | 6/2011 | Louvet | |
| 7,967,201 B2 | 6/2011 | Bowlus | |
| 7,978,060 B2 | 7/2011 | Mandava | |
| 8,072,605 B2 | 12/2011 | Costa | |
| 8,102,101 B2 | 1/2012 | Giurgiutiu | |
| 8,112,303 B2 | 2/2012 | Eglen | |
| 8,203,603 B2 | 6/2012 | Harbert | |
| 8,279,065 B2 | 10/2012 | Butler | |
| 8,306,871 B2 | 11/2012 | Farmer | |
| 8,325,036 B1 | 12/2012 | Fuhr | |
| 8,334,970 B2 | 12/2012 | Wildenbeest | |
| 8,354,927 B2 | 1/2013 | Breed | |
| 8,412,590 B2 | 4/2013 | Elliott | |
| 8,447,665 B1 | 5/2013 | Schoenharl | |
| 8,626,193 B1 | 1/2014 | Crossno | |
| 8,682,760 B2 | 3/2014 | Cameo | |
| 8,786,407 B2 | 7/2014 | Liu | |
| 8,803,970 B2 | 8/2014 | Weisensale | |
| 8,870,453 B2 | 10/2014 | Branch | |
| 8,947,234 B2 | 2/2015 | Doan | |
| 8,989,053 B1 | 3/2015 | Skaaksrud | |
| 8,994,508 B2 | 3/2015 | Dacus | |
| 9,024,755 B2 | 5/2015 | Fuhr | |
| 9,030,295 B2 | 5/2015 | Allen | |
| 9,031,990 B2 | 5/2015 | Scott | |
| 9,087,333 B2 | 7/2015 | Kim | |
| 9,218,585 B2 | 12/2015 | Gupta | |
| 9,244,147 B1 | 1/2016 | Soundararajan | |
| 9,273,954 B2 * | 3/2016 | Boutboul | G01B 11/2433 |
| 9,275,361 B2 | 3/2016 | Meyer | |
| 9,316,595 B2 | 4/2016 | Wakita | |
| 9,350,734 B1 | 5/2016 | Jamshidi | |
| 9,366,483 B2 | 6/2016 | Eckhoff | |
| 9,443,217 B2 | 9/2016 | Iyer | |
| 9,449,208 B2 | 9/2016 | Luk | |
| 9,514,323 B2 | 12/2016 | Mehring | |
| 9,524,648 B1 | 12/2016 | Gopalakrishnan | |
| 9,557,224 B2 | 1/2017 | Eisenstadt | |
| 9,569,944 B2 | 2/2017 | Barnes | |
| 9,710,754 B2 | 7/2017 | Kaye | |
| 9,766,114 B2 | 9/2017 | Ademe | |
| 9,789,518 B2 | 10/2017 | Iino | |
| 9,794,165 B1 | 10/2017 | Wood | |
| 9,811,632 B2 | 11/2017 | Grabiner | |
| 9,824,298 B1 | 11/2017 | Krishnan Gorumkonda | |
| 9,835,498 B2 | 12/2017 | Haarer | |
| 9,888,214 B2 | 2/2018 | Bateman | |
| 9,915,638 B2 | 3/2018 | Pakstaite | |
| 10,009,667 B2 | 6/2018 | Taylor | |
| 10,060,798 B1 | 8/2018 | Riscalla | |
| 10,089,556 B1 | 10/2018 | Xu | |
| 10,176,451 B2 | 1/2019 | Nemet | |
| 10,187,593 B2 | 1/2019 | Holmes | |
| 10,223,610 B1 | 3/2019 | Akselrod-Ballin | |
| 10,281,200 B2 | 5/2019 | Johnston | |
| 10,285,433 B2 | 5/2019 | Ademe | |
| 10,324,439 B2 | 6/2019 | Lagares-Greenblatt | |
| 10,373,472 B2 | 8/2019 | Johnston | |
| 10,386,827 B2 | 8/2019 | Enver | |
| 10,423,918 B2 | 9/2019 | Mehring | |
| 10,445,684 B2 | 10/2019 | Mehring | |
| 10,452,959 B1 | 10/2019 | Gautam | |
| 10,466,111 B2 | 11/2019 | Jones | |
| 10,546,162 B1 | 1/2020 | Diorio | |
| 10,552,654 B2 | 2/2020 | Beckmann | |
| 10,572,851 B2 | 2/2020 | Skaaksrud | |
| 10,591,306 B2 | 3/2020 | High | |
| 10,594,956 B2 | 3/2020 | Holmes | |
| 10,676,794 B2 | 6/2020 | Amini | |
| 10,956,856 B2 | 3/2021 | Ma | |
| 11,070,895 B2 | 7/2021 | Taylor | |
| 11,138,554 B2 | 10/2021 | Johnsen | |
| 11,388,325 B2 | 7/2022 | Bohling | |
| 11,393,082 B2 | 7/2022 | Mathew | |
| 11,448,632 B2 | 9/2022 | Velez | |
| 11,715,059 B2 | 8/2023 | Johnson | |
| 11,733,229 B2 | 8/2023 | Bohling | |
| 11,734,813 B2 | 8/2023 | Mathew | |
| 11,836,674 B2 | 12/2023 | Johnsen | |
| 2001/0045449 A1 | 11/2001 | Shannon | |
| 2002/0119513 A1 | 8/2002 | Alocilja | |

(56) References Cited

U.S. PATENT DOCUMENTS

| | | |
|---|---|---|
| 2003/0088442 A1 | 5/2003 | Michael |
| 2003/0214387 A1 | 11/2003 | Giaccherini |
| 2004/0018641 A1 | 1/2004 | Goldsmith |
| 2004/0069046 A1 | 4/2004 | Sunshine |
| 2004/0074957 A1 | 4/2004 | Devar |
| 2004/0148117 A1 | 7/2004 | Kirshenbaum |
| 2004/0154739 A1 | 8/2004 | Shanahan |
| 2004/0204881 A1 | 10/2004 | Mayer |
| 2004/0226392 A1 | 11/2004 | McNally |
| 2004/0233055 A1 | 11/2004 | Canich |
| 2005/0060246 A1 | 3/2005 | Lastinger |
| 2005/0061877 A1 | 3/2005 | Stevens |
| 2005/0075954 A1 | 4/2005 | Matsumoto |
| 2005/0104730 A1 | 5/2005 | Yang |
| 2005/0149470 A1 | 7/2005 | Fujie |
| 2005/0197912 A1 | 9/2005 | Wittmer |
| 2005/0203790 A1 | 9/2005 | Cohen |
| 2005/0222889 A1 | 10/2005 | Lai |
| 2005/0228712 A1 | 10/2005 | Bornstein |
| 2006/0006987 A1 | 1/2006 | Hashimoto |
| 2006/0011721 A1 | 1/2006 | Olsen, III |
| 2006/0018274 A1 | 1/2006 | Twitchell |
| 2006/0071774 A1 | 4/2006 | Brown |
| 2006/0080819 A1 | 4/2006 | McAllister |
| 2006/0096303 A1 | 5/2006 | Kavounas |
| 2006/0097875 A1 | 5/2006 | Ott |
| 2006/0171332 A1 | 8/2006 | Barnum |
| 2006/0192652 A1 | 8/2006 | Mandava |
| 2006/0238307 A1 | 10/2006 | Bauer |
| 2006/0244718 A1 | 11/2006 | Hiddink |
| 2007/0050070 A1 | 3/2007 | Strain |
| 2007/0050271 A1 | 3/2007 | Ufford |
| 2007/0064765 A1 | 3/2007 | Solie |
| 2007/0067177 A1 | 3/2007 | Martin |
| 2007/0067203 A1 | 3/2007 | Gil |
| 2007/0069867 A1 | 3/2007 | Fleisch |
| 2007/0076779 A1 | 4/2007 | Haarer |
| 2007/0156261 A1 | 7/2007 | Caldwell |
| 2007/0176773 A1 | 8/2007 | Smolander |
| 2007/0221727 A1 | 9/2007 | Reznik |
| 2008/0001752 A1 | 1/2008 | Bruns |
| 2008/0052201 A1 | 2/2008 | Bodin |
| 2008/0067227 A1 | 3/2008 | Poss |
| 2008/0073431 A1 | 3/2008 | Davis |
| 2008/0103944 A1 | 5/2008 | Hagemann |
| 2008/0186175 A1 | 8/2008 | Stern |
| 2008/0292759 A1 | 11/2008 | Palmer |
| 2008/0294488 A1 | 11/2008 | Gupta |
| 2009/0027213 A1 | 1/2009 | Debord |
| 2009/0040063 A1 | 2/2009 | Yearsley |
| 2009/0058644 A1 | 3/2009 | French |
| 2009/0076645 A1 | 3/2009 | Ben-Tzur |
| 2009/0083054 A1 | 3/2009 | Koo |
| 2009/0119170 A1 | 5/2009 | Hammad |
| 2009/0144122 A1 | 6/2009 | Ginsberg |
| 2009/0261974 A1 | 10/2009 | Bailey |
| 2009/0322481 A1 | 12/2009 | Marr, III |
| 2010/0006646 A1 | 1/2010 | Stiller |
| 2010/0007464 A1 | 1/2010 | Mctigue |
| 2010/0042369 A1 | 2/2010 | Mian |
| 2010/0065632 A1 | 3/2010 | Babcock |
| 2010/0101317 A1 | 4/2010 | Ashrafzadeh |
| 2010/0111354 A1 | 5/2010 | Hornabrook |
| 2010/0138281 A1 | 6/2010 | Zhang |
| 2010/0253504 A1 | 10/2010 | Lliteras |
| 2011/0029413 A1 | 2/2011 | Ben-Tzur |
| 2011/0035326 A1 | 2/2011 | Sholl |
| 2011/0068921 A1 | 3/2011 | Shafer |
| 2011/0153469 A1 | 6/2011 | Mackenzie |
| 2011/0301903 A1 | 12/2011 | Humbert |
| 2012/0101876 A1 | 4/2012 | Turvey |
| 2012/0161967 A1 | 6/2012 | Stern |
| 2012/0264446 A1 | 10/2012 | Xie |
| 2012/0267541 A1 | 10/2012 | Utukuri |
| 2012/0304014 A1 | 11/2012 | Prophete |
| 2012/0310853 A1 | 12/2012 | Aldstadt |
| 2013/0002443 A1 | 1/2013 | Breed |
| 2013/0117053 A2 | 5/2013 | Campbell |
| 2013/0176115 A1 | 7/2013 | Puleston |
| 2013/0214797 A1 | 8/2013 | Gruden |
| 2013/0218511 A1 | 8/2013 | Mager |
| 2013/0235206 A1 | 9/2013 | Smith |
| 2013/0271595 A1* | 10/2013 | Hiroi ............... H01L 22/12 348/80 |
| 2013/0282522 A1 | 10/2013 | Hassan |
| 2014/0138440 A1 | 5/2014 | D'Ambrosio |
| 2014/0146164 A1 | 5/2014 | Bajema |
| 2014/0147015 A1* | 5/2014 | Bajema ............. G06T 7/0004 382/110 |
| 2014/0180953 A1 | 6/2014 | Westcott |
| 2014/0201041 A1 | 7/2014 | Meyer |
| 2014/0270540 A1* | 9/2014 | Spector ............. G06T 7/162 382/199 |
| 2014/0294239 A1 | 10/2014 | Duckett |
| 2014/0297487 A1 | 10/2014 | Bashkin |
| 2014/0313055 A1 | 10/2014 | Warkentin |
| 2014/0316235 A1* | 10/2014 | Davis ................ G16H 50/20 600/407 |
| 2014/0316875 A1 | 10/2014 | Tkachenko |
| 2014/0330407 A1 | 11/2014 | Corder |
| 2015/0015373 A1 | 1/2015 | Mongrenier |
| 2015/0019391 A1 | 1/2015 | Kumar |
| 2015/0021401 A1 | 1/2015 | Rajagopal |
| 2015/0022313 A1 | 1/2015 | Maier |
| 2015/0041616 A1 | 2/2015 | Gentile |
| 2015/0048938 A1 | 2/2015 | Tew |
| 2015/0084100 A1 | 3/2015 | Sablong |
| 2015/0095255 A1 | 4/2015 | Hall |
| 2015/0102903 A1 | 4/2015 | Wilkinson |
| 2015/0154550 A1 | 6/2015 | Skaaksrud |
| 2015/0186840 A1 | 7/2015 | Torres |
| 2015/0192475 A1 | 7/2015 | Eisenstadt |
| 2015/0237309 A1 | 8/2015 | Heilmann |
| 2015/0245179 A1 | 8/2015 | Jarvis |
| 2015/0283585 A1 | 10/2015 | Gual Pasalodos |
| 2015/0338846 A1 | 11/2015 | Boivin |
| 2015/0347945 A1 | 12/2015 | Reese |
| 2015/0349917 A1 | 12/2015 | Skaaksrud |
| 2016/0012337 A1 | 1/2016 | Kaye |
| 2016/0026032 A1 | 1/2016 | Moore |
| 2016/0033194 A1 | 2/2016 | Sumihiro |
| 2016/0034907 A1 | 2/2016 | Worrall |
| 2016/0048798 A1 | 2/2016 | Meyer |
| 2016/0063367 A1 | 3/2016 | Cai |
| 2016/0132821 A1 | 5/2016 | Glasgow |
| 2016/0148440 A1 | 5/2016 | Kwak |
| 2016/0171434 A1 | 6/2016 | Ladden |
| 2016/0189087 A1 | 6/2016 | Morton |
| 2016/0203591 A1 | 7/2016 | Justaniah |
| 2016/0210734 A1* | 7/2016 | Kass ................ G06T 7/001 |
| 2016/0217417 A1 | 7/2016 | Ma |
| 2016/0239794 A9 | 8/2016 | Shafer |
| 2016/0260059 A1 | 9/2016 | Benjamin |
| 2016/0283904 A1 | 9/2016 | Siegel |
| 2016/0292634 A1 | 10/2016 | Mehring |
| 2016/0307040 A1 | 10/2016 | Shulman |
| 2016/0314514 A1 | 10/2016 | High |
| 2016/0350715 A1 | 12/2016 | Minvielle |
| 2016/0350756 A1 | 12/2016 | Shepard |
| 2017/0039194 A1 | 2/2017 | Tschetter |
| 2017/0039511 A1 | 2/2017 | Corona |
| 2017/0059391 A1 | 3/2017 | Ademe |
| 2017/0061171 A1 | 3/2017 | Lombardi |
| 2017/0061394 A1 | 3/2017 | High |
| 2017/0069075 A1* | 3/2017 | Okuda ............... G06V 10/764 |
| 2017/0074921 A1 | 3/2017 | Uota |
| 2017/0102694 A1 | 4/2017 | Enver |
| 2017/0116565 A1 | 4/2017 | Feiner |
| 2017/0122771 A1 | 5/2017 | Keal |
| 2017/0164773 A1 | 6/2017 | Wirtz |
| 2017/0220985 A1 | 8/2017 | White |
| 2017/0255901 A1 | 9/2017 | Bermudez Rodriguez |
| 2017/0269601 A1 | 9/2017 | Jones |
| 2017/0278261 A1 | 9/2017 | Focht |

(56) References Cited

U.S. PATENT DOCUMENTS

| | | |
|---|---|---|
| 2017/0280351 A1 | 9/2017 | Skaaksrud |
| 2017/0286905 A1 | 10/2017 | Richardson |
| 2017/0300984 A1 | 10/2017 | Hurwich |
| 2017/0344934 A1 | 11/2017 | Millhouse |
| 2017/0344935 A1 | 11/2017 | Mattingly |
| 2018/0039853 A1 | 2/2018 | Liu |
| 2018/0045700 A1 | 2/2018 | Biermann |
| 2018/0078992 A1 | 3/2018 | High |
| 2018/0096175 A1 | 4/2018 | Schmeling |
| 2018/0137642 A1 | 5/2018 | Malisiewicz |
| 2018/0143131 A1 | 5/2018 | Choi |
| 2018/0144300 A1 | 5/2018 | Wiechers |
| 2018/0144430 A1 | 5/2018 | Millhouse |
| 2018/0150684 A1 | 5/2018 | Wang |
| 2018/0168054 A1 | 6/2018 | Scarlata |
| 2018/0180492 A1 | 6/2018 | Ribi |
| 2018/0181838 A1 | 6/2018 | Yang |
| 2018/0195869 A1 | 7/2018 | High |
| 2018/0211208 A1 | 7/2018 | Winkle |
| 2018/0217118 A1 | 8/2018 | Payne |
| 2018/0242768 A1 | 8/2018 | Lewis |
| 2018/0247257 A1 | 8/2018 | Lert, Jr. |
| 2018/0270631 A1 | 9/2018 | High |
| 2018/0290809 A1 | 10/2018 | Espinosa |
| 2018/0315011 A1 | 11/2018 | Clarke |
| 2019/0033283 A1 | 1/2019 | Yamasaki |
| 2019/0073770 A1 | 3/2019 | Moradi |
| 2019/0147396 A1 | 5/2019 | Bohling |
| 2019/0223643 A1 | 7/2019 | Hara |
| 2019/0285603 A1 | 9/2019 | Velez |
| 2019/0340749 A1* | 11/2019 | Schwartzer ............ G01N 21/31 |
| 2020/0034962 A1* | 1/2020 | Mathew ................ G06T 7/0004 |
| 2020/0065577 A1* | 2/2020 | Le Henaff ............ G06T 7/0002 |
| 2020/0085290 A1 | 3/2020 | Wang |
| 2020/0090314 A1* | 3/2020 | Mayr ..................... G06F 18/40 |
| 2020/0118072 A1 | 4/2020 | Johnson |
| 2020/0160497 A1 | 5/2020 | Shah |
| 2020/0242402 A1 | 7/2020 | Jung |
| 2020/0275010 A1 | 8/2020 | Bohling |
| 2020/0402221 A1* | 12/2020 | Ijiri ....................... G06N 3/084 |
| 2021/0117984 A1* | 4/2021 | Sharma ................. G06T 7/001 |
| 2021/0398065 A1 | 12/2021 | Johnsen |
| 2022/0010160 A1 | 1/2022 | Zhong |
| 2022/0036021 A1 | 2/2022 | Burchell |
| 2022/0042925 A1* | 2/2022 | Cheng ................. G01N 21/958 |
| 2023/0259869 A1 | 8/2023 | Johnson |
| 2024/0062153 A1 | 2/2024 | Johnsen |

FOREIGN PATENT DOCUMENTS

| | | | | |
|---|---|---|---|---|
| CN | 201314907 | | 9/2009 | |
| CN | 202306566 | | 7/2012 | |
| CN | 102930649 | | 2/2013 | |
| CN | 203275285 | | 11/2013 | |
| CN | 203306566 | | 11/2013 | |
| CN | 103543703 | | 1/2014 | |
| CN | 103593746 A | | 2/2014 | |
| CN | 104036354 | | 9/2014 | |
| CN | 204010264 | | 12/2014 | |
| CN | 104749329 | | 7/2015 | |
| CN | 204514846 | | 7/2015 | |
| CN | 204989059 | | 1/2016 | |
| CN | 105444504 | | 3/2016 | |
| CN | 106408173 | | 2/2017 | |
| CN | 106600286 | | 4/2017 | |
| CN | 107703269 | | 2/2018 | |
| EP | 1221613 | | 7/2002 | |
| EP | 1374688 | | 1/2004 | |
| EP | 2165298 | | 3/2010 | |
| EP | 2509412 A1 | | 10/2012 | |
| EP | 2835078 A1 | | 2/2015 | |
| GB | 2256708 | | 12/1992 | |
| JP | 2000155098 A | | 6/2000 | |
| JP | 2002195971 A | | 7/2002 | |
| JP | 2004198296 A | | 7/2004 | |
| JP | 2008004133 A | | 1/2008 | |
| JP | 2013068547 | | 4/2013 | |
| WO | 2000078919 A1 | | 12/2000 | |
| WO | 2001023256 | | 4/2001 | |
| WO | 2003098175 | | 11/2003 | |
| WO | 2007052208 A1 | | 5/2007 | |
| WO | 2008006152 A1 | | 1/2008 | |
| WO | 2008016309 | | 2/2008 | |
| WO | 2008147897 | | 12/2008 | |
| WO | 2009147821 A1 | | 12/2009 | |
| WO | 2012125960 | | 9/2012 | |
| WO | 2013174983 | | 11/2013 | |
| WO | 2014059048 | | 4/2014 | |
| WO | 2015061429 | | 4/2015 | |
| WO | 2015066594 | | 5/2015 | |
| WO | WO-2016105441 A1 * | | 6/2016 | ............ A23L 3/001 |
| WO | 2020023762 | | 1/2020 | |

OTHER PUBLICATIONS

M. Nakahara et al., "Inspection of unexpected defective products by semi-supervised learning based on a probability density function in high-yield food production," 2022 IEEE International Conference on Big Data (Big Data), Osaka, Japan, 2022, pp. 6 (Year: 2022).*

D. K. Shetty, et al., "A Review of Application of Computer-vision for Quality Grading of Food Products," 2019 International Conference on Automation, Computational and Technology Management (ICACTM), London, UK, 2019, pp. 297-303, doi: 10.1109/ICACTM.2 (Year: 2019).*

Zhu, Lili, et al. "Deep learning and machine vision for Food Processing: A survey." Current Research in Food Science, vol. 4, 2021, pp. 233-249, https://doi.org/10.1016/j.crfs.2021.03.009. (Year: 2021).*

3M; "3M MonitorMark Time Temperature Indicators"; https://www.3m.com/3M/en_US/company-us/all-3m-products/~/MONMARK-3M-MonitorMark-Time-Temperature-Indicators/?N=5002385+3293785721&rt=rud; Available at least as early as Feb. 7, 2019; pp. 1-4.

Agrofresh; "FreshCloud™ Storage Insights helps you monitor fruit in storage for added peace of mind"; https://www.agrofresh.com/technologies/freshcloud/storage-insights/; Available at least as early as Feb. 7, 2019; pp. 1-4.

Ahearn, Brianna; "Kroger Wins For Food Temperature Innovation"; https://www.retailsupplychaininsights.com/doc/kroger-wins-for-food-temperature-innovation-0001; Jun. 4, 2015; pp. 1-2.

Ambrosus; "Decentralised IoT Networks for Next-Generation Supply Chains"; https://ambrosus.com/#home; Available at least as early as Feb. 7, 2019; pp. 1-12.

Andrew Wilson, "Vision Software Blends into Food Processing", Jun. 1, 2012, pp. 1-13.

Anzilotti, Eillie; "These High-Tech Sensors Track Exactly How Fresh Our Produce Is So We Stop Wasting Food"; https://www.fastcompany.com/40424163/these-high-tech-sensors-track-exactly-how-fresh-our-produce-is-so-we-stop-wasting-food; May 26, 2017; pp. 1-3.

Arah, Isaac Kojo et al.; "Preharvest and Postharvest Factors Affecting the Quality and Shelf Life of Harvested Tomatoes: A Mini Review"; http://downloads.hindawi.com/journals/ija/2015/478041.pdf; Available as early as Oct. 14, 2015; pp. 1-7.

Badia, Ricardo; "Cold Chain Logistics: Assessing the Challenge"; https://www.zestlabs.com/assessing-cold-chain-logistics/; Mar. 19, 2019; pp. 1-4.

Barthe, J.F.; "D.2.3.2. Database of consumer awareness, expectations and concerns on cold chain"; http://www.frisbee-project.eu/images/result/FRISBEE_DEL_2-3-2.pdf; Dec. 2, 2011; pp. 1-26.

Barthe, J.F.; "D.2.3.2.1 Survey questionnaires and materials for studies of consumer perspectives and attitudes towards refrigerated foods, the cold chain and relevant refrigeration technologies (Informed consent forms, privacy, personal data handling)"; http://www.frisbee-project.eu/images/result/FRISBEE_DEL_2-3-2-1.pdf;Feb. 8, 2012; pp. 1-21.

(56) References Cited

OTHER PUBLICATIONS

Bedard, Jean; "Temperature Mapping of Storage Areas"; Technical supplement to WHO Technical Report Series, No. 961, 2011; WHO Press, World Health Organization; available at least as early as Jan. 2014; pp. 1-25.
Bevan et al.; "Storage of Organically Produced Crops"; https://orgprints.org/8241/1/Storage_organic_produce_report.pdf; Dec. 1997; pp. 1-227.
Bogataj, M., et al.; "Stability of perishable goods in cold logistic chains"; International Journal of Production Economics, vol. 93-94; 2005; pp. 345-356.
BT9 Intelligent Supply Chain Solutions; "Multi Segment, Real Time, Cold Chain Perishable Information"; http://www.bt9-tech.com; Published 2018; pp. 1-6.
Business Wire; "Emerson Expands Global Capabilities in Fresh Food Monitoring with Acquisitions of Locus Traxx and PakSense"; https://www.businesswire.com/news/home/20160830005136/en/Emerson-Expands-Global-Capabilities-Fresh-Food-Monitoring; Aug. 30, 2016; pp. 1-2.
Cao, Jordan; "Intelligent Container—powered by Sap Hana"; https://blogs.saphana.com/2018/09/27/intelligent-container-powered-sap-hana/; Sep. 27, 2018; pp. 1-5.
Capgemini; "Schuitema Revolutionizes Food Quality Control Through RFID"; https://www.capgemini.com/se-en/wp-content/uploads/sites/29/2017/07/Schuitema_Revolutionizes_Food_Quality_Control_Through_RFID.pdf; Jul. 29, 2017; pp. 1-2.
Carrefour Group; "Carrefour launches Europe's first food blockchain"; http://www.carrefour.com/current-news/carrefour-launches-europes-first-food-blockchain; Mar. 6, 2018; pp. 1-2.
Chainlink Research; "Achieving Consistent Product Quality"; https://www.zestlabs.com/wp-content/uploads/2016/12/Quality-Management-For-Produce.pdf; Available as early as Dec. 2016; pp. 1-8.
Chainlink Research; "Measuring Produce Freshness: The Key to Preventing Waste"; https://www.zestlabs.com/wp-content/uploads/2016/03/Measuring-Produce-Freshness.pdf; Available as early as Mar. 2016; pp. 1-12.
Chainlink Research; "Preemptive Freshness Management"; https://www.zestlabs.com/wp-content/uploads/2017/03/Preemptive-Freshness-Management.pdf; Available as early as Mar. 2017; pp. 1-8.
Chainlink Research; "Blockchain's Role in the Produce Supply Chain"; https://www.zestlabs.com/wp-content/uploads/2018/01/Blockchains-Role-in-the-Produce-Supply-Chain.pdf; Available as early as Jan. 2018; pp. 1-20.
Chainlink Research; "Pallet-level Monitoring"; https://www.zestlabs.com/wp-content/uploads/2016/03/Pallet-Monitoring-for-the-Fresh-Food-Supply-Chain.pdf; Available as early as Mar. 2016; pp. 1-9.
Chainlink Research; "Why Quality Consistency Matters"; https://www.zestlabs.com/wp-content/uploads/2016/03/Why-Food-Supply-Chain-Quality-Matters-1.pdf; Available as early as Mar. 2016; pp. 1-10.
Claussen, Ingrid C.; "Deliverable D.3.2.4.3 Literature review and experimental data of chilled, superchilled/supercooled fish quality and safety models"; http://www.frisbee-project.eu/images/result/FRISBEE_DEL_3-2-4-3.pdf; May 6, 2011; pp. 1-29.
Cognex, "Introduction to Machine vision, A guide to automating process & quality improvements", pp. 1-24.
Colmer, Christian; "Chill—On! Transparent food quality all the way"; https://www.innovations-report.com/html/reports/medicine-health/chill-transparent-food-quality-168201.html; Oct. 1, 2011; pp. 1-5.
compact.net; "Inspection Planning / Quality Inspection / SPC / LIMS"; https://www.caq.de/en/Software/InspectionPlanning_QualityInspection_SPC; available at least as early as Jan. 27, 2017; pp. 1-4.
Cotillon, C.; "Deliverable 8.2.1.1 Publication in Scientific Journals"; http://www.frisbee-project.eu/images/result/FRISBEE_DEL_8.2.1.1.pdf; Oct. 27, 2011; pp. 1-5.
Cotillon, C.; "Deliverable 8.3.3.1 Mini conferences"; http://www.frisbee-project.eu/images/result/FRISBEE_DEL_8.3.3.1.pdf; Dec. 7, 2011; pp. 1-8.
Cotillon, C.; "Deliverable 8.6.1 Report on collaboration with other EU projects"; http://www.frisbee-project.eu/images/result/FRISBEE_DEL_8.6.1.pdf; Dec. 5, 2011; pp. 1-12.
Dada, Ali, et al.; "Sensor Applications in the Supply Chain: The Example of Quality-Based Issuing of Perishables"; The Internet of Things. Lecture Notes in Computer Science, edited by Christian Floerkemeier, et al.; vol. 4952; 2008; pp. 140-154.
De Troch, Stefan; "Item-level cold chain monitoring, another cool NFC solution"; https://blog.nxp.com/internet-of-things-2/item-level-cold-chain-monitoring-another-cool-nfc-solution; Aug. 30, 2016; pp. 1-5.
Desmedt, Frederique; "Deliverable 8.1.1 Project logo, Leaflet and PowerPoint presentation"; http://www.frisbee-project.eu/images/result/FRISBEE_DEL_8.1.1.pdf; Nov. 19, 2010; pp. 1-30.
Desmedt, Frederique; "Deliverable 8.1.2 Project internet and intranet website"; http://www.frisbee-project.eu/images/result/FRISBEE_DEL_8.1.2.pdf; Mar. 3, 2011; pp. 1-9.
Digi; "Digi Honeycomb Keeping food safe just got easier and cheaper. Digi Honeycomb lets you monitor your entire Cold Chain System"; https://s3.amazonaws.com/telusdigital-marketplace-production/iot/user-content/product/64aa-o.pdf; Available at least as early as Feb. 7, 2019; pp. 1-2.
Dji Ferntech; "Drones For Agriculture"; https://www.djistore.co.nz/agriculture; Available at least as early as Feb. 7, 2019; pp. 1-13.
Do Nascimento Nunes, M. C., et al.; "Improvement in fresh fruit and vegetable logistics quality: berry logistics field studies"; Philosophical Transactions of the Royal Society; http://dx.doi.org/10.1098/rsta.2013.0307; 2014; pp. 1-19.
Doyle, John P.; "Seafood Shelf Life as a Function of Temperature"; Alaska Sea Grant Marine Advisory Program; No. 30; 1989; pp. 1-6.
Ecoark Holdings, Inc.; "Ocean Mist Farms Selects Zest Fresh to Optimize Freshness Management"; https://www.globenewswire.com/news-release/2018/12/04/1661680/0/en/Ocean-Mist-Farms-Selects-Zest-Fresh-to-Optimize-Freshness-Management.html; Dec. 4, 2018; pp. 1-3.
EMERSON; "ProAct Services and ProAct Transport"; https://www.emerson.com/en-us/commercial-residential/proact; Available at least as early as Feb. 7, 2019; pp. 1-4.
Emerson; "Real-Time Temperature & Location Trackers"; https://climate.emerson.com/en-us/products/controls-monitoring-systems/cargo-tracking-monitoring/trackers; Available at least as early as Feb. 7, 2019; pp. 1-4.
Emerson; "Supply Chain Data Loggers"; https://climate.emerson.com/en-us/products/controls-monitoring-systems/cargo-tracking-monitoring/loggers; Available at least as early as Feb. 7, 2019; pp. 1-4.
Eom, Ki-Hwan, et al.; "The Meat Freshness Monitoring System Using the Smart RFID Tag"; International Journal of Distributed Sensor Networks, vol. 2014; http://journals.sagepub.com/doi/10.1155/2014/591812; Jul. 9, 2014; pp. 1-10.
Evans, J.; "Deliverable D2.2.2 : Assessment of current refrigeration technologies of selected food industries and their potential improvement in current refrigeration"; http://www.frisbee-project.eu/images/result/FRISBEE_DEL_2-2-2.pdf; Jan. 30, 2012; pp. 1-181.
Evans, Judith et al.; "Deliverable D.2.2.3 : Analysis of potential of novel refrigeration technologies suitable for selected industries for application and improvement of food quality, energy consumption and environmental impact"; http://www.frisbee-project.eu/images/result/FRISBEE_DEL_2-2-3.pdf; Dec. 2, 2011; pp. 1-54.
Fast Casual; "Wireless temperature-monitoring, tracking solution available for shipping perishable goods"; https://www.fastcasual.com/news/wireless-temperature-monitoring-and-tracking-solution-now-available-for-shipping-perishable-goods/; Aug. 15, 2017; pp. 1-10.
Food and Agriculture Organization of the United Nations; "Flying robots for food security"; http://www.fao.org/zhc/detail-events/en/c/428256; Aug. 10, 2016; pp. 1-3.
FreshAI; "AI-powered waste reduction for smart food businesses."; http://freshai.farmsteadapp.com/; Available as early as Feb. 7, 2019; pp. 1-5.

(56) References Cited

OTHER PUBLICATIONS freshfruitportal.com; "Zest Labs fights food waste by routing pallets according to real-time freshness"; https://www.freshfruitportal.com/news/2018/07/19/technology-zest-labs-food-waste-profits-sensors; Jul. 19, 2018; pp. 1-5.
Friedlos, Dave; "New Zealand Kiwifruit Processor Finds ROI"; https://www.rfidjournal.com/articles/view?4090; May 20, 2008; pp. 1-4.
Friedman, Phil; "Ai, machine learning, and more efficient routing"; https://www.omnitracs.com/blog/ai-machine-learning-and-more-efficient-routing; Jun. 28, 2018; pp. 1-6.
Frisbee; "Frisbee european project—Archive"; https://web.archive.org/web/20180815100417/http://www.frisbee-project.eu/archive-results.html; Available as early as Aug. 15, 2018; pp. 1-5.
Frisbee; "Frisbee european project—Developing novel breakthrough technologies"; https://web.archive.org/web/20180316101206/http://www.frisbee-project.eu/research/92-developing-novel-breakthrough-technologies.html; Available as early Mar. 16, 2018; pp. 1-3.
Frisbee; "Frisbee european project—Frisbee at the Sixteenth Conference on Food Microbiology, Belgium"; http://www.frisbee-project.eu/news/40-frisbee-at-the-sixteenth-conference-on-food-microbiology.html; Nov. 15, 2011; pp. 1-1.
Frisbee; "Frisbee european project—Frisbee develops a Virtual Platform application"; http://www.frisbee-project.eu/news/90-frisbee-develops-a-virtual-platform-application.html; Mar. 18, 2013; pp. 1-1.
Frisbee; "Frisbee european project—Frisbee dissemination activities"; http://www.frisbee-project.eu/news/91-frisbee-dissemination-activities.html; Mar. 18, 2013; pp. 1-1.
Frisbee; "Frisbee european project—Frisbee on the starting-blocks"; http://www.frisbee-project.eu/news/49-frisbee-on-the-starting-blocks.html; Mar. 9, 2012; pp. 1-2.
Frisbee; "Frisbee european project—Frisbee welcomes New Members Advisory Board"; http://www.frisbee-project.eu/news/48-new-members-advisory-board.html; Mar. 9, 2012; pp. 1-1.
Frisbee; "Frisbee european project—Frisbee: Latest Developments"; http://www.frisbee-project.eu/news/42-frisbee-project-latest-developments.html; Dec. 21, 2011; pp. 1-2.
Frisbee; "Frisbee european project—Join the first European Food Cold Chain Database!!!";http://www.frisbee-project.eu/news/55-database2.html; Jul. 9, 2012; pp. 1-2.
Frisbee; "Frisbee european project—Magnetic refrigeration technology. Frisbee's experts team work on this disruptive technology"; https://web.archive.org/web/20180316101206/http://www.frisbee-project.eu/research/51-magnetic-refrigeration-technology.html; Available as early as Mar. 16, 2018; pp. 1-3.
Frisbee; "Frisbee european project—MEP-scientist pairing scheme"; http://www.frisbee-project.eu/news/41-mep-scientist-pairing-scheme.html; Dec. 20, 2011; pp. 1-2.
Frisbee; "Frisbee european project—Nanoparticles, a concentrate of energy: PCM nanoparticles where low temperatures are needed"; https://web.archive.org/web/20180316101206/http://www.frisbee-project.eu/research/27-nanoparticles-a-concentrate-of-energy.html; Available as early as Mar. 16, 2018; pp. 1-2.
Frisbee; "Frisbee european project—Project Overview"; https://web.archive.org/web/20120211082956/http://www.frisbee-project.eu/project-overview.html; Available as early as Feb. 11, 2012; pp. 1-1.
Frisbee; "Frisbee european project—Saving energy by refrigeration predictive control"; https://web.archive.org/web/20180316101206/http://www.frisbee-project.eu/research/52-saving-energy-by-refrigeration-predictive-control.html; Available as early as Mar. 16, 2018; pp. 1-3.
Frisbee; "Frisbee european project—Superchilling! A new technology to have your food products fresher than fresh"; https://web.archive.org/web/20180316101206/http://www.frisbee-project.eu/research/50-superchilling.html; Available as early as Mar. 16, 2018; pp. 1-3.
Frisbee; "Frisbee european project—Taking Europe's temperature: Cold chain database"; http://www.frisbee-project.eu/news/89-taking-europe%E2%80%99s-temperature-cold-chain-database.html; Mar. 18, 2013; pp. 1-2.
Frisbee; "Frisbee european project—Workpackages"; https://web.archive.org/web/20120210124516/http://www.frisbee-project.eu/workpackages.html; Available as early as Feb. 10, 2012; pp. 1-2.
Frisbee; "Simulate a cold chain"; https://frisbee-etool.irstea.fr; Available as early as 2020; pp. 1-3.
Gabbett, Rita Jane; "Amazon using artificial intelligence to monitor food safety issues"; http://www.micausa.org/amazon-using-artificial-intelligence-monitor-food-safety-issues/; May 9, 2018; pp. 1-3.
Gapud, Veny; "Food Safety Trends Exploring Implications of Mandatory Safety Standards in Retail and Foodservice"; https://www.foodsafetymagazine.com/magazine-archive1/december-2009january-2010/food-safety-trends-exploring-implications-of-mandatory-safety-standards-in-retail-and-foodservice/; Dec. 12, 2019; pp. 1-20.
Gaukler, Gary et al.; "Establishing Dynamic Expiration Dates for Perishables: An Application of RFID and Sensor Technology"; International Journal of Production Economics; vol. 193; Jul. 25, 2017; pp. 617-632.
GEIE/CEMA/ITP; "Deliverable D 8.3.1.3 Newsletter edited by GEIE for industrial use N°3"; http://www.frisbee-project.eu/images/result/FRISBEE_DEL_8.3.1.3.pdf; Mar. 13, 2012; pp. 1-10.
GEIE/CEMA/ITP; "Deliverable D8.3.1.2 Newsletter edited by GEIE for industrial use N°2"; http://www.frisbee-project.eu/images/result/FRISBEE_DEL_8.3.1.2.pdf; Oct. 27, 2011; pp. 1-10.
Giannakourou, M. C., et al.; "Application of a TTI-Based Distribution Management System for Quality Optimization of Frozen Vegetables at the Consumer End"; Journal of Food Science, vol. 68, Issue 1; Jan. 2003; pp. 201-209.
Grand View Research; "Cold Chain Market Size Worth $447.50 Billion By 2025 | CAGR: 15.1%"; https://www.grandviewresearch.com/press-release/global-cold-chain-market; Mar. 2019; pp. 1-10.
Greenwalt, Megan; "Acquisition Leads to New, Fresh Food Waste Solution"; https://www.waste360.com/mergers-and-acquisitions/acquisition-leads-new-fresh-food-waste-solution; Aug. 15, 2018; pp. 1-6.
Greis, Noel P.; "Monitoring the 'Cool Chain' Maximizing Shelf Life for Safer Food"; https://atecentral.net/r20093/case_study_monitoring_the_cool_chain; National Science Foundation; published on Dec. 2011; pp. 1-9.
Haard, Norman F., et al.; "Characteristics of Edible Plant Tissues"; Food Chemistry, edited by Owen R. Fennema; 3rd Ed.; Marcel Dekker, Inc.; 1996; pp. 943-1011.
Hagen, Christian et al.; "A Fresh Look: Perishable Supply Chains Go Digital"; https://www.atkearney.com/operations-performance-transformation/article?/a/a-fresh-look-perishable-supply-chains-go-digital; Available at least as early as Feb. 7, 2019; pp. 1-22.
Harvard Business Review; "How Blockchain Will Accelerate Business Performance and Power the Smart Economy"; https://hbr.org/sponsored/2017/10/how-blockchain-will-accelerate-business-performance-and-power-the-smart-economy; Oct. 27, 2017; pp. 1-8.
Hertog, M. L. A. T. M., et al.; "Shelf-life modelling for first-expired-first-out warehouse management"; Philosophical Transactions of the Royal Society; http://dx.doi.org/10.1098/rsta.2013.0306; 2014; pp. 1-15.
Hsu, Jenny W.; "Freshippo Customers Can Track Farm-To-Shelf Journey for Food"; https://www.alizila.com/hema-food-tracking/; Aug. 7, 2018; pp. 1-6.
Husseini, Talal; "Walmart's 'Eden' artificial intelligence technology to inspect fresh food for spoilage"; https://www.foodprocessing-technology.com/news/walmarts-eden-artificial-intelligence-technology-inspect-fresh-food-spoilage; Mar. 2, 2018; pp. 1-4.
IBM; "DHL Breaks New Ground with RFID-Based Real-Time Tracking of Sensitive Shipments"; ftp://ftp.software.ibm.com/software/solutions/pdfs/ODC00298-USEN-00.pdf; Available as early as Mar. 2007; pp. 1-4.
IBM; "Take your food data further with Fresh Insights for IBM Food Trust"; https://www.ibm.com/blockchain/solutions/food-trust/freshness; Available at least as early as Feb. 7, 2019; pp. 1-3.

(56) References Cited

OTHER PUBLICATIONS

IBM; "Focus on Food Safety"; https://www.ibm.com/downloads/cas/ZN9EWKRQ; Available at least as early as 2018; pp. 1-2.
ImpactVision; "Non-invasive, real time food quality information"; https://www.impactvi.com; Available at least as early as Feb. 7, 2019; pp. 1-18.
Impinj; "Hy-Vee Grocery Automates Cold Chain Monitoring"; https://www.impinj.com/library/customer-stories/hy-vee-cold-chain-monitoring-increases-shelf-life/; Available as early as Feb. 7, 2019; pp. 1-3.
Infratab; "Products"; https://infratab.com/products/; Available at least as early as Feb. 7, 2019; pp. 1-2.
Infratab; "Infratab Freshtime RF Sensor Blockchain Solutions for the Fresh Seafood Cold Chain"; https://web.aimglobal.org/external/wcpages/wcecommerce/eComItemDetailsPage.aspx?ItemID=656; 2019; pp. 1-5.
Intel; "Intelligent Dynamic Store Merchandising Solution Cuts Losses on Perishables and Raises Brand Awareness"; Available at least as early as Feb. 7, 2019; pp. 1-12.
IQA Team; "Material Inspection Using a Cloud Software"; http://Mqalims.com/wp-content/uploads/2015/02/MAT_INSP.pdf; available at least as early as Jan. 27, 2017; pp. 1-5.
Jedermann, Reiner, et al.; "Semi-passive RFID and Beyond: Steps Towards Automated Quality Tracing in the Food Chain"; Inderscience Enterprises Ltd.; Int. J. Radio Frequency Identification Technology and Applications, vol. 1, No. 3; published in 2007; pp. 247-259.
Jedermann, Reiner, et al.; "Communication techniques and challenges for wireless food quality monitoring"; Philosophical Transactions of the Royal Society; http://dx.doi.org/10.1098/rsta.2013.0304; 2014; pp. 1-18.
Jedermann, Reiner, et al.; "Reducing food losses by intelligent food logistics"; Philosophical Transactions of the Royal Society; http://dx.doi.org/10.1098/rsta.2013.0302; 2014; pp. 1-20.
Kader, A. A.; "Pre- and Postharvest Factors Affecting Fresh Produce Quality, Nutritional Value, and Implications for Human Health"; Proceedings of the International Congress of Food Production and the Quality of Life, Sassari (Italy) Sep. 4-8, 2000, vol. 1, pp. 109-119.
Kader, Adel A., et al .; "Technologies to Extend the Refrigerated Shelf Life of Fresh Fruit"; Food Storage Stability, edited by Irwin A. Taub, et al.; Boca Raton; CRC Press; 1998; pp. 1-27.
Kader, Adel A.; "Postharvest Technology of Horticultural Crops"; 2002; 3rd Ed.; University of California Agriculture and Natural Resources; Oakland; 56 pages.
Kader, Adel A.; "Postharvest Technology of Horticultural Crops"; 2002; 3rd Ed.; University of California Agriculture and Natural Resources; Oakland; 74 pages.
Kader, Adel A.; "Postharvest Technology of Horticultural Crops"; 2002; 3rd Ed.; University of California Agriculture and Natural Resources; Oakland; pp. 113-196.
Kader, Adel A.; "Postharvest Technology of Horticultural Crops"; 2002; 3rd Ed.; University of California Agriculture and Natural Resources; Oakland; pp. 197-250.
Kader, Adel A.; "Postharvest Technology of Horticultural Crops"; 2002; 3rd Ed.; University of California Agriculture and Natural Resources; Oakland; pp. 251-314.
Kader, Adel A.; "Postharvest Technology of Horticultural Crops"; 2002; 3rd Ed.; University of California Agriculture and Natural Resources; Oakland; pp. 315-384.
Kader, Adel A.; "Postharvest Technology of Horticultural Crops"; 2002; 3rd Ed.; University of California Agriculture and Natural Resources; Oakland; pp. 385-434.
Kader, Adel A.; "Postharvest Technology of Horticultural Crops"; 2002; 3rd Ed.; University of California Agriculture and Natural Resources; Oakland; pp. 435-480.
Kader, Adel A.; "Postharvest Technology of Horticultural Crops"; 2002; 3rd Ed.; University of California Agriculture and Natural Resources; Oakland; pp. 67-112.
Ketzenberg, M., et al.; "Expiration Dates and Order Quantities for Perishables"; European Journal of Operational Research; vol. 266, Issue 2; Apr. 2018; pp. 569-584.
Ketzenberg, M., et al.; "Managing Perishables with Time and Temperature History"; Production and Operations Management; vol. 24, Issue 1; Jan. 2015; pp. 54-70.
Ketzenberg, M., et al.; "The Value of RFID Technology Enabled Information to Manage Perishables"; https://pdfs.semanticscholar.org/bded/16af2e689b4fdcea7f8421f6e012a6041324.pdf; Apr. 2009; pp. 1-37.
Kong, F. et al.; "Chemical Deterioration and Physical Instability of Foods and Beverages"; The Stability and Shelf Life of Food, edited by Persis Subramaniam; 2nd Ed.; Woodhead Publishing; 2016; pp. 1-21.
Koutsoumanis, K., et al.; "Development of a safety monitoring and assurance system for chilled food product"; International Journal of Food Microbiology, vol. 100; 2005; pp. 253-260.
Kroger; "Kroger Gets HarvestMark Allows consumers to trace the origin of salads"; https://www.cspdailynews.com/foodservice/kroger-gets-harvestmark; Oct. 29, 2009; pp. 1-11.
Labuza, T. P., et al.; "The Relationship Between Processing and Shelf Life"; Foods for the '90s, edited by Gordon G. Birch, et al.; Elsevier Applied Science; Aug. 1, 1990; pp. 1-21.
Leake, Linda L.; "The Search for Shelf Life Solutions"; https://www.ift.org/news-and-publications/food-technology-magazine/issues/2007/november/columns/laboratory?page=viewall; Nov. 1, 2007; pp. 1-8.
Marvin, Rob; "Blockchain: The Invisible Technology That's Changing the World"; https://in.pcmag.com/amazon-web-services/112363/blockchain-the-invisible-technology-thats-changing-the-world; Aug. 30, 2017; pp. 1-29.
Mazur, Michal; "Six Ways Drones Are Revolutionizing Agriculture"; https://www.technologyreview.com/s/601935/six-ways-drones-are-revolutionizing-agriculture; Jul. 20, 2016; pp. 1-5.
McCeath, Bill; "Winning the Freshness Wars: Creating Shopper Loyalty and Improving Profitability in Retail Grocery"; https://www.zestlabs.com/wp-content/uploads/2016/11/ZL_WP_FreshnessWars_060415.pdf; Available as early as Feb. 2013; pp. 1-16.
Mehring, Peter; "Blockchain for Food Safety—Addressing the Challenges"; https://www.zestlabs.com/will-blockchain-solve-food-safety-challenges/; Sep. 26, 2018; pp. 1-4.
Mehring, Peter; "Zest Labs CEO Peter Mehring on the Walmart Lawsuit"; https://www.zestlabs.com/zest-labs-ceo-peter-mehring-walmart-lawsuit/; Aug. 1, 2018; pp. 1-4.
MIPSIS; "Quality Control Inspection Software"; http://www.mipsis.com/QualityInspectionSoftware.html; available at least as early as Jan. 27, 2017; pp. 1-3.
Mitrokotsa et al.; "Integrated RFID and Sensor Networks: Architectures and Applications"; https://pdfs.semanticscholar.org/e5b0/c2a44971bad209cbf66afb6c825f89792723.pdf; Jun. 22, 2009; pp. 511-536.
Moorthy, Rahul et al.; "On-Shelf Availability in Retailing"; vol. 116—No. 23; International Journal of Computer Applications; Apr. 2015; pp. 47-51.
Musani, Parvez; "Eden: The Tech That's Bringing Fresher Groceries to You"; https://blog.walmart.com/innovation/20180301/eden-the-tech-thats-bringing-fresher-groceries-to-you; Mar. 1, 2018; pp. 1-4.
My Devices; "Alibaba Cloud and myDevices Partner to Launch Turnkey IoT Solutions in China"; https://mydevices.com/newspost/alibaba-cloud-mydevices-partner-launch-turnkey-iot-solutions-china/; Sep. 11, 2018; pp. 1-3.
National Geographic Society, Season, Sep. 22, 2016 (Year: 2016).
NBC Bay Area; "Tech Company Helps Inspect Food During Shutdown"; https://www.nbcbayarea.com/news/tech/tech-company-helps-inspect-food-during-shutdown_bay-area/4851; Jan. 11, 2019; pp. 1-6.
NRDC; "Wasted: How America is Losing up to 40 Percent of Its Food From Farm to Fork Landfill"; https://www.nrdc.org/sites/default/files/wasted-2017-report.pdf; Available as early as Aug. 2017; pp. 1-58.

(56) References Cited

OTHER PUBLICATIONS

Opatova, H.; "Deliverable 8.2.2.1 Organisation of a Workshop in Prague 2011 at International Congress of Refrigeration"; http://www.frisbee-project.eu/images/result/FRISBEE_DEL_8.2.2.1.pdf; Oct. 27, 2011; pp. 1-8.

Oracle; "Oracle Unveils Business-Ready Blockchain Applications"; https://www.oracle.com/nz/corporate/pressrelease/oow18-oracle-blockchain-applications-cloud-2018-10-23.html; Oct. 23, 2018; pp. 1-4.

Palanza, Rich; "IoT Monitoring: Rapidly Deliver on the Promise of IoT"; https://business.weather.com/blog/iot-monitoring-rapidly-deliver-on-the-promise-of-iot; May 16, 2018; pp. 1-4.

Payne, Kevin; " New Verizon Ad Sheds Light on Important Food Safety Issues"; https://www.zestlabs.com/new-verizon-ad-sheds-light-on-important-food-safety-issues/; Dec. 15, 2017; pp. 1-4.

Payne, Kevin; "Agriculture Technology and "The Messy Middle""; https://www.zestlabs.com/agriculture-technology-messy-middle/; Jun. 25, 2019; pp. 1-4.

Payne, Kevin; "Are You Ready to Make 2018 Your Best Year Ever?" https://www.zestlabs.com/are-you-ready-to-make-2018-your-best-year-ever/; Feb. 13, 2018; pp. 1-4.

Payne, Kevin; "Blockchain for Fresh Food Supply Chains—Reality Sets In?"; https://www.zestlabs.com/blockchain-fresh-supply-chains-reality/; May 7, 2019; pp. 1-4.

Payne, Kevin; "Cold Chain Visibility: Who's Winning the Freshness Wars?"; https://www.zestlabs.com/cold-chain-visibility-freshness-wars/; Apr. 9, 2019; pp. 1-4.

Payne, Kevin; "Cold Supply Chain Variability—The Impact of Delays"; https://www.zestlabs.com/cold-supply-chain-variability/; Apr. 23, 2019; pp. 1-4.

Payne, Kevin; "Earth Day 2019 and Looking Ahead to 2020"; https://www.zestlabs.com/earth-day-2019/; Apr. 30, 2019; pp. 1-4.

Payne, Kevin; "Finding the Right Tools: Can Blockchain and IOT Fix the Fresh Food Supply Chain?—Register for the Webinar"; https://www.zestlabs.com/finding-the-right-tools-can-blockchain-and-iot-fix-the-fresh-food-supply-chain-register-for-the-webinar/; Feb. 27, 2018; pp. 1-4.

Payne, Kevin; "Food Grower And Supplier Challenges: The Top 10"; https://www.zestlabs.com/food-growers-suppliers-challenges/; Feb. 19, 2019; pp. 1-4.

Payne, Kevin; "Food Labels and Food Waste—A Solution"; https://www.zestlabs.com/food-labels-food-waste/; Mar. 12, 2019; pp. 1-4.

Payne, Kevin; "Food Safety Tips: Three Things to Consider"; https://www.zestlabs.com/food-safety-tips-three-things-to-consider/; Jul. 2, 2019; pp. 1-4.

Payne, Kevin; "Fresh Produce and Health: What's the Connection?"; https://www.zestlabs.com/fresh-produce-health-interrelationship/; Apr. 2, 2019; pp. 1-4.

Payne, Kevin; "Grocery Shopper Trends 2019: Key Insights"; https://www.zestlabs.com/grocery-shopper-trends-2019-key-insights/; Jul. 23, 2019; pp. 1-4.

Payne, Kevin; "How to Feed a Hungry Planet: Food for Thought"; https://www.zestlabs.com/feed-a-hungry-planet/; Aug. 6, 2019; pp. 1-4.

Payne, Kevin; "Hyped Up? Blockchain and Why a Hybrid Model is Best"; https:// www.zestlabs.com/hyped-up-blockchain-the-fresh-food-supply-chain-and-why-a-hybrid-model-is-best/; Jan. 30, 2018; pp. 1-4.

Payne, Kevin; "I'll Never Look at Strawberries the Same Way"; https://www.zestlabs.com/ill-never-look-at-strawberries-the-same-way/; Dec. 15, 2017; pp. 1-4.

Payne, Kevin; "Improving Operational Efficiency: TQM for the Fresh Food Supply Chain"; https://www.zestlabs.com/improving-operational-efficiency-deming-drucker/; Aug. 27, 2019; pp. 1-4.

Payne, Kevin; "Increasing Trucking Costs Further Squeezes Grocery Margins - Don't Waste Your Money!" https://www.zestlabs.com/increasing-trucking-costs-further-squeezes-grocery-margins-dont-waste-your-money/; Feb. 6, 2018; pp. 1-4.

Payne, Kevin; "IoT Sensors and Reducing Food Waste"; https://www.zestlabs.com/iot-sensors-reduce-food-waste/; Feb. 12, 2019; pp. 1-4.

Payne, Kevin; "Millennials Want True Transperency"; https://www.zestlabs.com/millennials-want-true-transparency/; Jan. 9, 2018; pp. 1-4.

Payne, Kevin; "Myth Busting: Produce Shrink is Caused at the Store"; https://www.zestlabs.com/myth-busting-produce-shrink-occurs-at-the-store/; Feb. 20, 2018; pp. 1-4.

Payne, Kevin; "New Zest Fresh for Produce Modules: Rapid Implementations and Faster ROI"; https://www.zestlabs.com/zest-fresh-produce-modules/; Jul. 10, 2019; pp. 1-4.

Payne, Kevin; "Online Grocery Shopping Options Abound But . . . "; https://www.zestlabs.com/online-grocery-shopping/; Feb. 5, 2019; pp. 1-4.

Payne, Kevin; "Preventing Food Waste: Multiple Approaches"; https://www.zestlabs.com/preventing-food-waste-multiple-approaches/; Jul. 16, 2019; pp. 1-4.

Payne, Kevin; "Proactive Food Safety: Moving the Industry Forward"; https://www.zestlabs.com/proactive-food-safety/; Aug. 13, 2019; pp. 1-4.

Payne, Kevin; "Produce Marketing: Brandstorm Offers A Wealth Of Insights"; https://www.zestlabs.com/produce-marketing-ideas; Feb. 26, 2019; pp. 1-4.

Payne, Kevin; "Reducing Fresh Food Waste: Addressing the Problem"; https://www.zestlabs.com/reducing-fresh-food-waste-problem/; Mar. 5, 2019; pp. 1-4.

Payne, Kevin; "Rethinking Food Safety and the Supply Chain"; https://www.zestlabs.com/rethinking-food-safety-supply-chain/; May 14, 2019; pp. 1-5.

Payne, Kevin; "Salad Kits: How to Ensure Freshness"; https://www.zestlabs.com/salad-kits-fresh/; Apr. 16, 2019; pp. 1-4.

Payne, Kevin; "Shelf-life Variability at Grocery Stores: Half-bad is Not Good"; https://www.zestlabs.com/shelf-life-variability-among-leading-grocery-stores/; Jun. 10, 2019; pp. 1-4.

Payne, Kevin; "Start the Year Fresh!" https://www.zestlabs.com/start-the-year-fresh/; Jan. 16, 2018; pp. 1-4.

Payne, Kevin; "Supply Chain Waste: Can We Fix the Problem? (Yes)"; https://www.zestlabs.com/supply-chain-waste/; Jul. 30, 2019; pp. 1-5.

Payne, Kevin; "Sustainability and the Supply Chain"; https://www.zestlabs.com/sustainability-supply-chain/; Jun. 18, 2019; pp. 1-4.

Payne, Kevin; "Sustainability or Greenwashing" https://www.zestlabs.com/sustainability-or-greenwashing/; Jan. 23, 2018; pp. 1-4.

Payne, Kevin; "The "Best If Used By" Date Label: Will It Reduce Food Waste?"; https://www.zestlabs.com/best-if-used-by-date-label/; Jun. 4, 2019; pp. 1-4.

Payne, Kevin; "The Emergence of Brand Marketing in Produce"; https://www.zestlabs.com/brand-marketing-produce/; Aug. 20, 2019; pp. 1-4.

Payne, Kevin; "The Grocery Shopping Experience: Fresh Foods, Fresh Ideas"; https://www.zestlabs.com/grocery-shopping-experience-fresh-foods/; May 21, 2019; pp. 1-4.

Payne, Kevin; "To Use or Not to Use—What's Up With Date Labels" https://www.zestlabs.com/date-label/; Jan. 2, 2018; pp. 1-4.

Payne, Kevin; "Want to Improve Your Grocery Margins? Take a Look at Your Supply Chain"; https://www.zestlabs.com/want-to-improve-your-grocery-margins-take-a-look-at-your-supply-chain/; Dec. 19, 2017; pp. 1-4.

Payne, Kevin; "World Hunger Day 2019: Sustainability"; https://www.zestlabs.com/world-hunger-day-2019-sustainability/; May 28, 2019; pp. 1-4.

Payne, Kevin; "Your Technology Roadmap for Digital Transformation"; https://www.zestlabs.com/technology-roadmap/; Mar. 26, 2019; pp. 1-4.

Payne, Kevin; "A Picture Is Worth . . . "; https://www.zestlabs.com/a-picture-is-worth/; Apr. 3, 2018; pp. 1-4.

Payne, Kevin; "Before and After—The Benefits of Digital Transformation"; https://www.zestlabs.com/benefits-digital-transformation/; Jan. 29, 2019; pp. 1-5.

Payne, Kevin; "Being Proactive: What We Can Learn from Football"; https://www.zestlabs.com/being-proactive-learn-from-football/; Jul. 17, 2018; pp. 1-4.

(56) References Cited

OTHER PUBLICATIONS

Payne, Kevin; "Digital Transformation Technology: Is It Finally Time?"; https://www.zestlabs.com/digital-transformation-technology/; Aug. 7, 2018; pp. 1-4.
Payne, Kevin; "Experience the Many Benefits of Family Meals"; https://www.zestlabs.com/benefits-family-meals/; Sep. 3, 2019; pp. 1-4.
Payne, Kevin; "First Principles Thinking and the Fresh Food Supply Chain"; https://www.zestlabs.com/first-principles-thinking/; Oct. 2, 2018; pp. 1-4.
Payne, Kevin; "Five Days? The Causes of Shelf-life Variability"; https://www.zestlabs.com/five-days-shelf-life-variability/; Nov. 20, 2018; pp. 1-4.
Payne, Kevin; "Food Service Delivery: This Isn't What I Ordered!"; https://www.zestlabs.com/isnt-what-ordered/; Aug. 28, 2018; pp. 1-4.
Payne, Kevin; "Food Spoilage: The Impact On Your Business"; https://www.zestlabs.com/food-spoilage-impact-business/; Jan. 15, 2019; pp. 1-4.
Payne, Kevin; "Food Sustainability Goals: Noble But Are They Viable?"; https://www.zestlabs.com/food-sustainability-goals/; Aug. 14, 2018; pp. 1-4.
Payne, Kevin; "Fresh Food Industry Trends 2019—Our Predictions"; https://www.zestlabs.com/fresh-food-industry-trends-2019/; Jan. 2, 2019; pp. 1-4.
Payne, Kevin; "Fresh Food Industry Trends from 2018"; https://www.zestlabs.com/fresh-food-industry-trends-2018/; Dec. 11, 2018; pp. 1-4.
Payne, Kevin; "Fresh Food Sustainability—It's More Than Field to Fork"; https://www.zestlabs.com/fresh-food-sustainability/; Jan. 22, 2019; pp. 1-4.
Payne, Kevin; "Freshness Capacity: Strawberries Are Like Your Cell Phone . . ."; https://www.zestlabs.com/your-fresh-strawberries-are-like-your-cellphone/; Jul. 10, 2018; pp. 1-4.
Payne, Kevin; "Grocers Are Applying Artificial Intelligence"; https://www.zestlabs.com/grocers-turning-artificial-intelligence/; Oct. 9, 2018; pp. 1-4.
Payne, Kevin; "Growers And Suppliers—What Really Happens In The Food Supply Chain"; https://www.zestlabs.com/what-happens-fresh-food-supply-chain/; Apr. 24, 2018; pp. 1-5.
Payne, Kevin; "Improving Post-Harvest Operational Efficiency"; https://www.zestlabs.com/improving-operational-efficiency/; Sep. 18, 2018; pp. 1-4.
Payne, Kevin; "Is Your Fresh Food Supply Chain Stuck In The '60s?"; https://www.zestlabs.com/is-your-fresh-food-supply-chain-stuck-in-the-60s/; Mar. 13, 2018; pp. 1-4.
Payne, Kevin; "It's (Past) Time for Freshness Management"; https://www.zestlabs.com/managing-fresh-food-shelf-life/; Nov. 27, 2018; pp. 1-4.
Payne, Kevin; "It's Like Waze For The Fresh Food Supply Chain"; https://www.zestlabs.com/waze-fresh-food-supply-chain/; Apr. 10, 2018; pp. 1-5.
Payne, Kevin; "Let's Celebrate National Salad Month!"; https://www.zestlabs.com/lets-celebrate-national-salad-month/; May 1, 2018; pp. 1-4.
Payne, Kevin; "Let's Start At The Beginning"; https://www.zestlabs.com/lets-start-at-the-beginning/; May 15, 2018; pp. 1-4.
Payne, Kevin; "Margins Matter—Don't Get Squeezed"; https://www.zestlabs.com/6931-2/; Apr. 17, 2018; pp. 1-4.
Payne, Kevin; "Perishable Food Waste Cuts Profits & Raises Greenhouse Gases"; https://www.zestlabs.com/food-waste-profits-greenhouse-gases/; Sep. 11, 2018; pp. 1-4.
Payne, Kevin; "PMA Fresh Summit 2018—Wow!"; https://www.zestlabs.com/pma-fresh-summit/; Oct. 23, 2018; pp. 1-4.
Payne, Kevin; "PMA's Fresh Summit: Eat Up!"; https://www.zestlabs.com/pma-fresh-summit-2018/; Oct. 16, 2018; pp. 1-4.
Payne, Kevin; "Poor Quality Produce: Never Going Back Again"; https://www.zestlabs.com/never-going-back-again/; Jul. 3, 2018; pp. 1-4.
Payne, Kevin; "Premature Food Spoilage: Uh Oh, It's the Fuzz!"; https://www.zestlabs.com/uh-oh-its-the-fuzz/; Jun. 19, 2018; pp. 1-4.
Payne, Kevin; "Produce Shelf Life Extenders and Fresh Food Waste"; https://www.zestlabs.com/shelf-life-extenders-food-waste/; Nov. 13, 2018; pp. 1-4.
Payne, Kevin; "Refed: Committed to Reducing U.S. Food Waste"; https://www.zestlabs.com/refed-committed-reducing-waste/; Oct. 30, 2018; pp. 1-4.
Payne, Kevin; "Romaine Lettuce Labeling—Zest Fresh Can Help"; https://www.zestlabs.com/romaine-lettuce-labeling/; Dec. 4, 2018; pp. 1-4.
Payne, Kevin; "Saving Money Day 1—Invest $1, Get $9 Back" ;https://www.zestlabs.com/saving-money-day-1/; Nov. 6, 2018; pp. 1-4.
Payne, Kevin; "September Is National Family Meals Month"; https://www.zestlabs.com/september-family-meals-month/; Sep. 4, 2018; pp. 1-4.
Payne, Kevin; "Shelf-life Variability in Produce: The Five Causes"; https://www.zestlabs.com/shelf-life-variability-produce-five-causes/ ; Jan. 8, 2019; pp. 1-4.
Payne, Kevin; "Solving the Problem of Fresh Produce Waste"; https://www.zestlabs.com/solving-problem-fresh-food-waste/; Dec. 18, 2018; pp. 1-4.
Payne, Kevin; "Stay Cool! (And Visit Us at United Fresh!)"; https://www.zestlabs.com/stay-cool-and-visit-us-at-united-fresh/; Jun. 5, 2018; pp. 1-4.
Payne, Kevin; "Stop Doing That!"; https://www.zestlabs.com/stop-doing-that/; May 29, 2018; pp. 1-4.
Payne, Kevin; "Supply Chain Performance: The Fox and the Henhouse"; https://www.zestlabs.com/fox-hen-house/; Jun. 26, 2018; pp. 1-4.
Payne, Kevin; "The Fresh Food Industry and Charles Darwin"; https://www.zestlabs.com/charles-darwin-fresh-food-industry/; Aug. 21, 2018; pp. 1-4.
Payne, Kevin; "The Game of (Shelf) Life"; https://www.zestlabs.com/game-shelf-life/; Sep. 25, 2018; pp. 1-4.
Payne, Kevin; "Timing Is Everything—The Impact Of Cut-To-Cool Time On Freshness"; https://www.zestlabs.com/timing-is-everything-the-impact-of-cut-to-cool-time-on-freshness/; May 8, 2018; pp. 1-5.
Payne, Kevin; "What to do to Build Grocery Store Loyalty?"; https://www.zestlabs.com/grocery-store-loyalty/; Jul. 24, 2018; pp. 1-4.
Payne, Kevin; "What? No Bacon? (Cue Ominous Music)"; https://www.zestlabs.com/what-no-bacon-cue-ominous-music/; Mar. 6, 2018; pp. 1-5.
Payne, Kevin; "What's In The Bag?"; https://www.zestlabs.com/whats-in-the-bag/; May 22, 2018; pp. 1-4.
Payne, Kevin; "Where's The Beef (Been)?"; https://www.zestlabs.com/wheres-the-beef-been/; Mar. 27, 2018; pp. 1-5.
Payne, Kevin; "Zest Labs Offers Fresh Wishes for the New Year"; https://www.zestlabs.com/zest-labs-fresh-wishes-new-year/; Dec. 24, 2018; pp. 1-4.
Peterson, Hayley; "Walmart is saving $2 billion with a machine called 'Eden' that inspects food and knows when it will spoil"; https://www.businessinsider.in/walmart-is-saving-2-billion-with-a-machine-called-eden-that-inspects-food-and-knows-when-it-will-spoil/articleshow/63127641.cms; Mar. 1, 2018; pp. 1-12.
Pridevel; "IoT Cold Chain Monitoring"; http://www.pridevel.com/sap-iot-cold-chain-monitoring; Available at least as early as Feb. 7, 2019; pp. 1-3.
QA; "Carrefour and SGS Launch Visual Trust in China"; https://www.qualityassurancemag.com/article/carrefour-and-sgs-launch-visual-trust-in-china/; Sep. 28, 2017; pp. 1-4.
ReFED; "A Roadmap to Reduce U.S. Food Waste by 20 Percent"; https://www.refed.com/downloads/ReFED_Report_2016.pdf; 2016; pp. 1-96.
ReFED; "Restaurant Food Waste Action Guide"; https://www.refed.com/downloads/Restaurant_Guide_Web.pdf; 2018; pp. 1-44.
ReFED; "Retail Food Waste Action Guide"; https://www.refed.com/downloads/Retail_Guide_Web.pdf; 2018; pp. 1-44.
Ripple News Tech Staff; "Alibaba is Using Blockchain to Improve Consumer Confidence and Fight Food Fraud"; https://ripplenews.

(56) References Cited

OTHER PUBLICATIONS tech/2018/05/03/alibaba-is-using-blockchain-to-improve-consumer-confidence-and-fight-food-fraud/; May 3, 2018; pp. 1-7.
Robertson, Gordon L.; "Food Packaging: Principles and Practice"; 3rd Ed.; Boca Raton; CRC Press; 2013; pp. 1-33.
Ruiz-Garcia, Luis et al.; "Monitoring Cold Chain Logistics by Means of RFID"; http://cdn.intechweb.org/pdfs/8493.pdf; Feb. 1, 2010; pp. 1-16.
Ryan, John M.; "Guide to Food Safety and Quality During Transportation: Controls, Standards and Practices"; Academic Press; available at least as early as 2014; pp. 1-8.
Ryan, John; "Why Blockchain Will Be Used to Improve Distribution Food Safety, Quality, and Traceability"; https://www.foodsafetymagazine.com/enewsletter/why-blockchain-will-be-used-to-improve-distribution-food-safety-quality-and-traceability/; Feb. 5, 2019; pp. 1-3.
S. Mandal et al., "Optimal production inventory policy for defective items with fuzzy lime period", Science Direct, Applied Mathematical modelling, vol. 34, Issue 3, Mar. 2010, pp. 1-27.
S. Ren, K. He, R. Girshick, and J. Sun. Faster R-CNN: Towards real-time object detection with region proposal networks. In NIPS, 2015. (Year: 2015); pp. 1-9.
Scalco, Dan; "5 Ways to Ensure Meals Stay Fresh and Safe in Transit"; https://www.zestlabs.com/meals-stay-fresh-safe-transit/; Jun. 12, 2018; pp. 1-4.
Scotto Di Tella, F.; "Deliverable D8.3.1.1 Newsletter edited by GEIE for industrial use N°1"; http://www.frisbee-project.eu/images/result/FRISBEE_DEL_8.3.1.1.pdf; May 6, 2011; pp. 1-9.
Sensefly; "Why Use Agriculture Drones?"; https://www.sensefly.com/industry/agricultural-drones-industry; Available at least as early as Feb. 7, 2019; pp. 1-15.
Sensegrow; "Supply Chain Monitoring with Real-time IoT Platform"; http://www.sensegrow.com/blog/supply-chain-monitoring; May 10, 2018; pp. 1-5.
Shacklett, Mary; "Customer Retention and Growth in Today's Competitive Retail Grocery Environment"; https://www.zestlabs.com/downloads/Food-Freshness-and-Customer-Satisfaction-Transworld-Research-Apr. 2019.pdf; Apr. 2019; pp. 1-7.
Shacklett, Mary; "Improving Profits and Operational Efficiency on the Farm"; https://www.zestlabs.com/downloads/Improving-Operational-Efficiency-on-the-Farm-Transworld-Research-2018.pdf; Available as early as 2018; pp. 1-6.
Shacklett, Mary; "Optimizing Profit Margins in a Changing Retail Grocery Industry"; https://www.zestlabs.com/downloads/Optimizing-Profit-Margins-Transworld.pdf; 2018; pp. 1-10.
Siawsolit, Chokdee et al.; "The Value of Demand Information in Omni-Channel Grocery Retailing"; https://www.researchgate.net/publication/331048136_The_Value_of_Demand_Information_in_Omni-Channel_Grocery_Retailing; Available as early as Jan. 2019; pp. 1-11.
Singh, R. P.; "Scientific Principles of Shelf-Life Evaluation"; Shelf-Life Evaluation of Foods, edited by Dominic Man, et al.; 2nd Ed.; Aspen Publishers, Inc.; 2000; pp. 1-23.
Singh, R. Paul et al.; "Introduction to Food Engineering"; 5th Ed.; Academic Press; 2014; pp. 1-31.
Smart Sense; "Supermarket Remote Monitoring Solutions"; https://www.smartsense.co/industries/retail/supermarkets; Available at least as early as Feb. 7, 2019; pp. 1-6.
Smilo; "The latest generation hybrid blockchain platform"; https://smilo.io/files/Smilo_White_Paper_V1.8.1.pdf; Available at least as early as Feb. 7, 2019; pp. 1-33.
Springer, Jon; "Walmart, Kroger join suppliers in blockchain food safety initiative"; https://www.supermarketnews.com/news/walmart-kroger-join-suppliers-blockchain-food-safety-initiative; Aug. 22, 2017; pp. 1-4.
Stahl, Valerie et al.; "Deliverable D.3.2.4.2 Literature review and experimental data of chilled and frozen meat quality and safety models"; http://www.frisbee-project.eu/images/result/FRISBEE_DEL_3.2.4.2.pdf; Jun. 6, 2011; pp. 1-28.

Sunny George, Gwanpua; "Deliverable D3.2.4.1 Literature review and experimental data of chilled apple quality models"; http://www.frisbee-project.eu/images/result/FRISBEE_DEL_3.2.4.1.pdf; Mar. 1, 2011; pp. 1-24.
Swedberg, Claire; "DOD Considers RFID-based Solutions for Tracking Food's Shelf Life"; https://www.rfidjournal.com/articles/pdf?11423; Feb. 11, 2014; pp. 1-3.
Swedberg, Claire; "Researchers Seek to Reduce Wastage for First-Strike Rations"; https://www.rfidjournal.com/articles/pdf?9162; Jan. 26, 2012; pp. 1-4.
Swedberg, Claire; "Schuitema Ponders Future of Fresh-Chain Pilot"; https://www.rfidjournal.com/articles/pdf?3793; Dec. 10, 2007; pp. 1-4.
Swedberg, Claire; "Starbucks Keeps Fresh with RFID"; https://www.rfidjournal.com/articles/view?2890; Dec. 13, 2006; pp. 1-1.
Taoukis, P. S., et al.; "Applicability of Time-Temperature Indicators as Shelf Life Monitors of Food Products"; Journal of Food Science; vol. 54, Issue 4; Jul. 1989; pp. 783-788.
Taoukis, P. S., et al.; "Use of time-temperature integrators and predictive modelling for shelf life control of chilled fish under dynamic storage conditions"; International Journal of Food Microbiology, vol. 53; 1999; pp. 21-31.
Taoukis, Petros et al.; "Deliverable D.2.1.2 Temperature monitoring techniques and traceability systems along the cold chain";http://www.frisbee-project.eu/images/result/FRISBEE_DEL_2%201%202.pdf; Jul. 26, 2011; pp. 1-28.
Taoukis, Petros; "Deliverable D 3.2.4.4 Literature review and experimental data of frozen milk products and vegetables quality models"; http://www.frisbee-project.eu/images/result/FRISBEE_DEL_3-2-4-4.pdf; Jun. 6, 2011; pp. 1-24.
TCS Worldwide; "TCS Cargo Monitoring Solution: Track freshness of perishable cargo"; https://www.tcs.com/cargo-monitoring-solution; Available at least as early as Feb. 7, 2019; pp. 1-7.
TE-Food; "TE-Food Partners with Halal Trail Bringing Halal Food Companies to the Blockchain"; https://www.reuters.com/brandfeatures/venture-capital/article?id=38153; May 31, 2018; pp. 1-6.
Tech Mahindra; "Cold Chain Monitoring"; https://www.techmahindra.com/services/NextGenSolutions/DES/Solutions/Cold_Chain_Monitoring.aspx; Available at least as early as Feb. 7, 2019; pp. 1-4.
Tech Mahindra; "Farm to fork"; https://www.techmahindra.com/services/NextGenSolutions/DES/Solutions/Farm_to_fork.aspx; Available at least as early as Feb. 7, 2019; pp. 1-2.
Teijin—Human Chemistry, Human Solutions, Teijin's RFID Smart Shelf-Management System Used for Mass Document Management. Retrieved online at: http://www.teijin.com/news/2014/ebd140307_11.html. 2 pages, Mar. 7, 2014.
The NeWave® Smart Inventory Managment System: Take Your Management to the Next Level, NeWave Sensor Solutions Innovation Center, Oct. 7, 2016; pp. 1-2.
This New World By Huffpost; "Eating Ugly: The Food Waste That Could Refeed America"; https://www.facebook.com/ThisNewWorldHuffPost/videos/428476821288487; Apr. 22, 2019; pp. 1-9.
Tive; "A Complete Supply Chain Visibility System"; https://tive.co/product; Available at least as early as Feb. 7, 2019; pp. 1-7.
Tive; "Environmental Monitoring for Perishables"; https://tive.co/solution/environmental-monitoring-for-perishables/; Available at least as early as Feb. 7, 2019; pp. 1-5.
TraQtion; "TraQtion's Supply Chain Solution Manages Global Food Supplier Compliance and Audits"; https://www.traqtion.com/documents/TraQtion-Costco.pdf; Available as early as Feb. 7, 2019; pp. 1-2.
Trimble; "Trimble Acquires HarvestMark to Provide Food Traceability and Quality Control"; https://www.prnewswire.com/news-releases/trimble-acquires-harvestmark-to-provide-food-traceability-and-quality-control-300070050.html; Apr. 22, 2015; pp. 1-6.
Trust in Food ™; "Sustainability Research Report 2019"; https://www.zestlabs.com/downloads/Trust-In-Food-Sustainability-Survey-2019.pdf; Available as early as Jul. 18, 2019; pp. 1-19.
Tsenso; "The Fresh Index: A Real-Time Shelf Life Indicator"; https://tsenso.com/en/freshindex-instead-of-bestbefore; Available at least as early as Feb. 7, 2019; pp. 1-5.
United States Army Medical Command; "U.S. Army Veterinary Command Guidelines and Procedures"; https://www.dla.mil/Portals/

(56) References Cited

OTHER PUBLICATIONS

104/Documents/TroopSupport/Subsistence/Rations/qapubs/medcom/ 40-13.pdf; Feb. 13, 2006; pp. 1-171.
Verigo; "Introducing Pod Quality Continuous Product Life Data, From Farm to Store"; https://www.farmtoforkfresh.com/; Available at least as early as Feb. 7, 2019; pp. 1-8.
Wageningen Ur Food & Biobased Research; "Food & Biobased Research"; https://www.worldfoodinnovations.com/userfiles/documents/FBR%20Corporate%20Brochure.pdf; Jul. 2014; pp. 1-24.
Wells, John H. et al.; "Quality Management During Storage and Distribution"; Food Storage Stability, edited by Irwin A. Taub, et al.; Boca Raton; CRC Press; 1998; pp. 1-29.
Wells, John H., et al.; "A Kinetic Approach to Food Quality Prediction using Full-History Time-Temperature Indicators"; Journal of Food Science; vol. 53, Issue 6; Nov. 1988; pp. 1866-1871.
Wells, John H., et al.; "A Quality-Based Inventory Issue Policy For Perishable Foods"; Journal of Food Processing & Preservation; vol. 12, Issue 4; Jan. 1989; pp. 271-292.
Wells, John H., et al.; "Temperature Tolerance of Foods during Distribution"; Handbook of Food Engineering Practice, edited by Kenneth J. Valentas, et al.; Boca Raton; CRC Press; 1997; pp. 1-29.
Wells, John H., et al.; "The Application of Time-Temperature Indicator Technology to Food Quality Monitoring and Perishable Inventory Management"; Mathematical Modelling of Food Processing Operations, edited by Stuart Thorne; Elsevier Applied Science; 1992; pp. 1-41.
Wells, John Henry, et al.; "Application of Time-Temperature Indicators in Monitoring Changes in Quality Attributes of Perishable and Semiperishable Foods"; Journal of Food Science; vol. 53, Issue 1; Jan. 1988; pp. 148-152, 156.
Weston, L.A. et. al.; "Preharvest Factors Affecting Postharvest Quality of Vegetables"; HortScience; vol. 32(5), Aug. 1997, pp. 812-816.
Whelan, Jenny; "Kelsius To Install FoodCheck Monitoring System In SuperValu And Centra Stores"; https://www.checkout.ie/kelsius-signs-deal-to-put-foodcheck-monitoring-system-in-supervalu-and-centra-stores/; Aug. 6, 2015; pp. 1-4.
Williamson, Katie et al.; "Climate Change Needs Behavior Change"; https://www.zestlabs.com/downloads/2018-CCNBC-Report.pdf; 2018; pp. 1-22.
Wynne-Jones, Stephen; "Maxima Group Unveils 'Electronic Nose' To Track Freshness"; https://www.esmmagazine.com/maxima-group-unveils-electronic-nose-track-freshness/29589; Jul. 5, 2016; pp. 1-4.
Xinfin; "Enterprise Ready Hybrid Blockchain for Global Trade and Finance"; https://www.xinfin.org; Available at least as early as Feb. 7, 2019; pp. 1-13.
Yan, Lu, et al.; "The Internet of Things: From RFID to the Next-Generation Pervasive Networked Systems"; Auerbach Publications; New York; available at least as early as 2008; pp. 1-35.
Yiannas, Frank; "How Walmart's Spark Keeps Your Food Fresh"; https://blog.walmart.com/sustainability/20150112/how-walmarts-spark-keeps-your-food-fresh; Jan. 12, 2015; pp. 1-16.
Zelem, MC.; "Deliverable D.2.3.1 National legal and ethical requirements for the surveys"; http://www.frisbee-project.eu/images/result/FRISBEE_DEL_2.3.1.pdf; Jun. 23, 2011; pp. 1-68.
*Zest Labs, Inc.* v *Walmart*; Bohling, Joshua; "Transcript of the Testimony of Bohling, Joshua"; Bushman Court Reporting; Case No. 4:18-CV-00500-JM; Aug. 15-16, 2019; pp. 5-6, 47-48, 52-69, 78, 80-82, 85, 87, 98-102, 107-134, 137-145, 158-163, 182-184, 209-210, 233-234, 239-242, 246, and 357.
*Zest Labs, Inc.* v *Walmart*; Dickinson, Q. Todd; "Expert Report of Q. Todd Dickinson"; United States District Court for the Eastern District of Arkansas; Case No. 4:18-CV-00500-JM; Oct. 29, 2019; pp. 1-33.
*Zest Labs, Inc.* v *Walmart*; ECF No. 002; Zest Labs, Inc et al.; "Motion for Leave to File Complaint Under Seal and to Establish Briefing Schedule Relating to Potentially Confidential Information in Complaint"; United States District Court for the Eastern District of Arkansas; Case No. 4:18-CV-00500-JM; Aug. 1, 2018; pp. 1-4.

*Zest Labs, Inc.* v *Walmart*; ECF No. 003; Zest Labs, Inc et al.; "Brief in Support of Motion for Leave to File Complaint Under Seal and to Establish Briefing Schedule Relating to Potentially Confidential Information Complaint"; United States District Court for the Eastern District of Arkansas; Case No. 4:18-CV-00500-JM; Aug. 1, 2018; pp. 1-4.
*Zest Labs, Inc.* v *Walmart*; ECF No. 035; Walmart; "Defendant's Response to Plaintiffs' Motion for Leave to File Complaint Under Seal"; United States District Court for the Eastern District of Arkansas; Case No. 4:18-CV-00500-JM; Aug. 27, 2018; pp. 1-3.
*Zest Labs, Inc.* v *Walmart*; ECF No. 038; Zest Labs, Inc et al.; "Plaintiffs' Reply in Support of Plaintiffs' Motion for Leave to File Complaint Under Seal"; United States District Court for the Eastern District of Arkansas; Case No. 4:18-CV-00500-JM; Aug. 31, 2018; pp. 1-3.
*Zest Labs, Inc.* v *Walmart*; ECF No. 041; Walmart; "Defendant's Motion for Leave to File Under Seal"; United States District Court for the Eastern District of Arkansas; Case No. 4:18-CV-00500-JM; Sep. 4, 2018; pp. 1-3.
*Zest Labs, Inc.* v *Walmart*; ECF No. 098; Walmart; "Defendant's Brief in Support of Its Motion for Protective Order and to Compel Identification of Alleged Trade Secrets"; United States District Court for the Eastern District of Arkansas; Case No. 4:18-CV-00500-JM; Feb. 11, 2019; pp. 1-29.
*Zest Labs, Inc.* v *Walmart*; ECF No. 101-01; Sammi, P. Anthony; "Exhibit A"; United States District Court for the Eastern District of Arkansas; Case No. 4:18-CV-00500-JM; Feb. 15, 2019; pp. 1-3.
*Zest Labs, Inc.* v *Walmart*; ECF No. 101-02; Tulin, Edward L.; "Exhibit B"; United States District Court for the Eastern District of Arkansas; Case No. 4:18-CV-00500-JM; Feb. 15, 2019; pp. 1-4.
*Zest Labs, Inc.* v *Walmart*; ECF No. 101-03; Tulin, Edward L.; " Exhibit C"; United States District Court for the Eastern District of Arkansas; Case No. 4:18-CV-00500-JM; Feb. 15, 2019; pp. 1-5.
*Zest Labs, Inc.* v *Walmart*; ECF No. 101-04; Zest Labs, Inc. et al.; "Exhibit D Filed Under Seal Pursuant to Order Dated Sep. 7, 2018"; United States District Court for the Eastern District of Arkansas; Case No. 4:18-CV-00500-JM; Feb. 15, 2019; 1 page.
*Zest Labs, Inc.* v *Walmart*; ECF No. 101-05; Zest Labs, Inc. et al.; "Exhibit E Filed Under Seal Pursuant to Order Dated Sep. 7, 2018"; United States District Court for the Eastern District of Arkansas; Case No. 4:18-CV-00500-JM; Feb. 15, 2019; 1 page.
*Zest Labs, Inc.* v *Walmart*; ECF No. 101; Zest Labs, Inc. et al.; "Plaintiffs' Brief in Opposition to Defendant's Motion for Protective Order and to Compel Identification of Trade Secrets"; United States District Court for the Eastern District of Arkansas; Case No. 4:18-CV-00500-JM; Feb. 15, 2019; pp. 1-28.
*Zest Labs, Inc.* v *Walmart*; ECF No. 102-01; Zest Labs, Inc. et al.; "Exhibit A"; United States District Court for the Eastern District of Arkansas; Case No. 4:18-CV-00500-JM; Feb. 20, 2019; pp. 1-28.
*Zest Labs, Inc.* v *Walmart*; ECF No. 102-03; Zest Labs, Inc. et al.; "Exhibit C Filed Under Seal"; United States District Court for the Eastern District of Arkansas; Case No. 4:18-CV-00500-JM; Feb. 20, 2019; 1 page.
*Zest Labs, Inc.* v *Walmart*; ECF No. 102-04; Walmart; "Exhibit D"; United States District Court for the Eastern District of Arkansas; Case No. 4:18-CV-00500-JM; Feb. 20, 2019; pp. 1-10.
*Zest Labs, Inc.* v *Walmart*; ECF No. 102-06; Zest Labs, Inc. et al.; "Exhibit F Filed Under Seal"; United States District Court for the Eastern District of Arkansas; Case No. 4:18-CV-00500-JM; Feb. 20, 2019; 1 page.
*Zest Labs, Inc.* v *Walmart*; ECF No. 102-07; Zest Labs, Inc. et al.; "Exhibit G Filed Under Seal"; United States District Court for the Eastern District of Arkansas; Case No. 4:18-CV-00500-JM; Feb. 20, 2019; 1 page.
*Zest Labs, Inc.* v *Walmart*; ECF No. 102-08; Williams, Fred I.; "Exhibit H"; United States District Court for the Eastern District of Arkansas; Case No. 4:18-CV-00500-JM; Feb. 20, 2019; pp. 1-5.
*Zest Labs, Inc.* v *Walmart*; ECF No. 102-09; Simons, Michael; "Exhibit I"; United States District Court for the Eastern District of Arkansas; Case No. 4:18-CV-00500-JM; Feb. 20, 2019; pp. 1-8.
*Zest Labs, Inc.* v *Walmart*; ECF No. 102-10; Williams, Fred I.; "Exhibit J"; United States District Court for the Eastern District of Arkansas; Case No. 4:18-CV-00500-JM; Feb. 20, 2019; pp. 1-4.

(56) References Cited

OTHER PUBLICATIONS

Zest Labs, Inc. v Walmart; ECF No. 102-11; Simons, Michael; "Exhibit K"; United States District Court for the Eastern District of Arkansas; Case No. 4:18-CV-00500-JM; Feb. 20, 2019; pp. 1-2.
Zest Labs, Inc. v Walmart; ECF No. 102-12; Tulin, Edward L.; "Exhibit L"; United States District Court for the Eastern District of Arkansas; Case No. 4:18-CV-00500-JM; Feb. 20, 2019; pp. 1-4.
Zest Labs, Inc. v Walmart; ECF No. 102-13; Sammi, P. Anthony; "Exhibit M"; United States District Court for the Eastern District of Arkansas; Case No. 4:18-CV-00500-JM; Feb. 20, 2019; pp. 1-3.
Zest Labs, Inc. v Walmart; ECF No. 102-14; Sammi, P. Anthony; "Exhibit N"; United States District Court for the Eastern District of Arkansas; Case No. 4:18-CV-00500-JM; Feb. 20, 2019; pp. 1-3.
Zest Labs, Inc. v Walmart; ECF No. 102; Zest Labs, Inc. et al.; "Plaintiffs' Motion to Compel Supplemental Responses to Interrogatories and Requests for Production From Defendant"; United States District Court for the Eastern District of Arkansas; Case No. 4:18-CV-00500-JM; Feb. 20, 2019; pp. 1-6.
Zest Labs, Inc. v Walmart; ECF No. 103; Zest Labs, Inc. et al.; "Plaintiffs' Brief in Support of Motion to Compel Supplemental Responses to Interrogatories and Requests for Production From Defendant"; United States District Court for the Eastern District of Arkansas; Case No. 4:18-CV-00500-JM; Feb. 20, 2019; pp. 1-24.
Zest Labs, Inc. v Walmart; ECF No. 105-1; Walmart; "Exhibit A—Filed Under Seal Pursuant to Order Dated Sep. 7, 2018"; United States District Court for the Eastern District of Arkansas; Case No. 4:18-CV-00500-JM; Feb. 25, 2019; 1 page.
Zest Labs, Inc. v Walmart; ECF No. 105; Walmart; "Defendant's Response to Plaintiffs' Motion to Compel"; United States District Court for the Eastern District of Arkansas; Case No. 4:18-CV-00500-JM; Feb. 25, 2019; pp. 1-21.
Zest Labs, Inc. v Walmart; ECF No. 125; Zest Labs, Inc. et al.; "Plaintiffs' Motion to Compel Defendant Walmart to Comply With the Court's Mar. 6, 2019 Order and Otherwise Produce Technical Discovery"; United States District Court for the Eastern District of Arkansas; Case No. 4:18-CV-00500-JM; Apr. 22, 2019; pp. 1-9.
Zest Labs, Inc. v Walmart; ECF No. 126; Zest Labs, Inc. et al.; "Plaintiffs' Brief in Support of Motion to Compel Defendant Walmart to Comply With the Court's Mar. 6, 2019 Order and Otherwise Produce Technical Discovery"; United States District Court for the Eastern District of Arkansas; Case No. 4:18-CV-00500-JM; Apr. 22, 2019; pp. 1-21.
Zest Labs, Inc. v Walmart; ECF No. 130-1; Sammi, P. Anthony; "Zest V. Walmart: Mar. 29, 2019 M. Simons Letter to P. Sammi Re Deficient Production of Technical Documents"; United States District Court for the Eastern District of Arkansas; Case No. 4:18-CV-00500-JM; May 8, 2019; pp. 1-2.
Zest Labs, Inc. v Walmart; ECF No. 130-2; Tulin, Edward L.; "Zest V. Walmart: Deposition Notices"; United States District Court for the Eastern District of Arkansas; Case No. 4:18-CV-00500-JM; May 8, 2019; pp. 1-2.
Zest Labs, Inc. v Walmart; ECF No. 130-3; Simons, Michael; "Zest V. Walmart: Deposition Notices"; United States District Court for the Eastern District of Arkansas; Case No. 4:18-CV-00500-JM; May 8, 2019; pp. 1-3.
Zest Labs, Inc. v Walmart; ECF No. 130-4; Walmart; "Exhibit D—Filed Under Seal Pursuant to Order Dated Sep. 7, 2018"; United States District Court for the Eastern District of Arkansas; Case No. 4:18-CV-00500-JM; May 8, 2019; 1 page.
Zest Labs, Inc. v Walmart; ECF No. 130-5; Simons, Michael; "Zest Labs V. Walmart—Walmart's Apr. 5, 2019 Production"; United States District Court for the Eastern District of Arkansas; Case No. 4:18-CV-00500-JM; May 8, 2019; pp. 1-2.
Zest Labs, Inc. v Walmart; ECF No. 130; Walmart; "Defendant's Response To Plaintiffs' Motion to Compel Compliance With the Mar. 6, 2019 Order and Technical Discovery"; United States District Court for the Eastern District of Arkansas; Case No. 4:18-CV-00500-JM; May 8, 2019; pp. 1-26.
Zest Labs, Inc. v Walmart; ECF No. 131-1; Walmart; "Exhibit A—Filed Under Seal Pursuant to Order Dated Sep. 7, 2018"; United States District Court for the Eastern District of Arkansas; Case No. 4:18-CV-00500-JM; May 8, 2019; 1 page.
Zest Labs, Inc. v Walmart; ECF No. 131-2; Walmart; "Exhibit B—Filed Under Seal Pursuant to Order Dated Sep. 7, 2018"; United States District Court for the Eastern District of Arkansas; Case No. 4:18-CV-00500-JM; May 8, 2019; 1 page.
Zest Labs, Inc. v Walmart; ECF No. 131-3; Sammi, P. Anthony; "Re: 4:18-CV-00500-JM Zest Labs Inc et al V. Wal-Mart Inc"; United States District Court for the Eastern District of Arkansas; Case No. 4:18-CV-00500-JM; May 8, 2019; 1 page.
Zest Labs, Inc. v Walmart; ECF No. 131-4; Simons, Michael; "Re: 4:18-CV-00500-JM Zest Labs Inc et al V. Wal-Mart Inc"; United States District Court for the Eastern District of Arkansas; Case No. 4:18-CV-00500-JM; May 8, 2019; 1 page.
Zest Labs, Inc. v Walmart; ECF No. 131; Walmart; "Defendant's Sur-Reply Brief in Further Opposition to Plaintiffs' Motion to Compel"; United States District Court for the Eastern District of Arkansas; Case No. 4:18-CV-00500-JM; May 8, 2019; pp. 1-21.
Zest Labs, Inc. v Walmart; ECF No. 250; Walmart; "Defendant's Reply Brief in Support of Its Motion to Exclude Proposed Expert Testimony of Patent Attorney Q. Todd Dickinson"; United States District Court for the Eastern District of Arkansas; Case No. 4:18-CV-00500-JM; Mar. 27, 2020; pp. 1-13.
Zest Labs, Inc. v Walmart; ECF No. 257-1; Walmart; "Defendant's Surreply in Further Opposition to Zest Labs, Inc.'S Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-168.
Zest Labs, Inc. v Walmart; ECF No. 257-1; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 169-336.
Zest Labs, Inc. v Walmart; ECF No. 257-1; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 337-342.
Zest Labs, Inc. v Walmart; ECF No. 257; Walmart; "Defendant's Motion for Leave to File Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 1-3.
Zest Labs, Inc. v Walmart; ECF No. 261-1; Blitzer, Rachel R.; "Declaration of Rachel R. Blitzer Regarding Walmart's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-169.
Zest Labs, Inc. v Walmart; ECF No. 261-1; Blitzer, Rachel R.; "Declaration of Rachel R. Blitzer Regarding Walmart's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 170-337.
Zest Labs, Inc. v Walmart; ECF No. 261; Walmart; "Defendant's Surreply in Further Opposition to Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Apr. 6, 2020; pp. 1-5.
Zest Labs, Inc. v Walmart; ECF No. 262; Walmart; "Brief in Support of Defendant's Motion for Summary Judgment"; United States District Court for the Eastern District of Arkansas; Case No. 4:18-CV-00500-JM; Apr. 21, 2020; pp. 1-54.
Zest Labs, Inc. v Walmart; ECF No. 263; Walmart; "Defendant's Motion to Exclude Certain Proposed Expert Testimony of Mark

(56) References Cited

OTHER PUBLICATIONS

Lanning"; United States District Court for the Eastern District of Arkansas; Case No. 4:18-CV-00500-JM; Apr. 21, 2020; pp. 1-6.
*Zest Labs, Inc.* v *Walmart*; ECF No. 264; Walmart; "Brief in Support of Defendant's Motion To Exclude Proposed Expert Testimony of Mark Lanning"; United States District Court for the Eastern District of Arkansas; Case No. 4:18-CV-00500-JM; Apr. 21, 2020; pp. 1-26.
*Zest Labs, Inc.* v *Walmart*; ECF No. 265; Walmart; "Defendant's Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-7.
*Zest Labs, Inc.* v *Walmart*; ECF No. 266; Walmart; "Brief in Support of Defendant's Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-22.
*Zest Labs, Inc.* v *Walmart*; ECF No. 267; Walmart; "Defendant's Response to Zest Labs, Inc.'s Motion for Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-23.
*Zest Labs, Inc.* v *Walmart*; ECF No. 268; Walmart; "Defendant's Response to Zest Labs, Inc.'s Motion for Partial Summary Judgment That Walmart Used and Disclosed Zest Labs' Information in the Walmart Applications"; United States District Court for the Eastern District of Arkansas; Case No. 4:18-CV-00500-JM; Apr. 21, 2020; pp. 1-29.
*Zest Labs, Inc.* v *Walmart*; ECF No. 269; Walmart; "Defendant's Response to Plaintiffs' Motion to Exclude Testimony of Walmart's Damages Expert, Dr. William Choi"; United States District Court for the Eastern District of Arkansas; Case No. 4:18-CV-00500-JM; Apr. 21, 2020; pp. 1-17.
*Zest Labs, Inc.* v *Walmart*; ECF No. 270; Walmart; "Defendant's Response to Plaintiffs' Motion to Exclude Testimony of Walmart's Technical Expert, Dr. David Dobkin, Ph.D."; United States District Court for the Eastern District of Arkansas; Case No. 4:18-CV-00500-JM; Apr. 21, 2020; pp. 1-13.
*Zest Labs, Inc.* v *Walmart*; ECF No. 271; Walmart; "Defendant's Response to Plaintiffs' Motion to Exclude Testimony of Walmart's Technical Expert, Dr. Catherine Adams Hutt, Ph.D."; United States District Court for the Eastern District of Arkansas; Case No. 4:18-CV-00500-JM; Apr. 21, 2020; pp. 1-25.
*Zest Labs, Inc.* v *Walmart*; ECF No. 272; Walmart; "Defendant's Reply Brief in Support of Its Motion to Exclude Testimony of Damages Expert Stephen L. Becker, Ph.D."; United States District Court for the Eastern District of Arkansas; Case No. 4:18-CV-00500-JM; Apr. 21, 2020; pp. 1-22.
*Zest Labs, Inc.* v *Walmart*; ECF No. 273; Walmart; "Defendant's Reply Brief in Support of Its Motion for Summary Judgment"; United States District Court for the Eastern District of Arkansas; Case No. 4:18-CV-00500-JM; Apr. 21, 2020; pp. 1-56.
*Zest Labs, Inc.* v *Walmart*; ECF No. 274; Walmart; "Defendant's Reply Brief in Support of Its Motion to Exclude Proposed Expert Testimony of Mark Lanning"; United States District Court for the Eastern District of Arkansas; Case No. 4:18- CV-00500-JM; Apr. 21, 2020; pp. 1-22.
*Zest Labs, Inc.* v *Walmart*; ECF No. 275; Zest Labs, Inc et al.; "Zest Labs Inc.'s Motion for Partial Summary Judgment That Walmart Used and Disclosed Zest's Information in the Walmart Applications"; United States District Court for the Eastern District of Arkansas; Case No. 4:18-CV-00500-JM; Apr. 21, 2020; pp. 1-4.
*Zest Labs, Inc.* v *Walmart*; ECF No. 276; Zest Labs, Inc. et al.; "Plaintiffs' Motion To Exclude Testimony of Walmart's Expert, Dr. David P. Dobkin"; United States District Court for the Eastern District of Arkansas; Case No. 4:18-CV-00500-JM; Apr. 21, 2020; pp. 1-3.
*Zest Labs, Inc.* v *Walmart*; ECF No. 277; Zest Labs, Inc. et al.; "Brief in Support of Plaintiffs' Motion to Exclude the Testimony of Walmart's Expert Witness, Dr. David P. Dobkin"; United States District Court for the Eastern District of Arkansas; Case No. 4:18-CV-00500-JM; Apr. 21, 2020; pp. 1-59.
*Zest Labs, Inc.* v *Walmart*; ECF No. 278; Zest Labs, Inc. et al.; "Plaintiffs' Motion to Exclude Testimony of Walmart Expert, Dr. Catherine Adams Hutt"; United States District Court for the Eastern District of Arkansas; Case No. 4:18-CV-00500-JM; Apr. 21, 2020; pp. 1-4.
*Zest Labs, Inc.* v *Walmart*; ECF No. 279; Zest Labs, Inc. et al.; "Brief in Support of Plaintiffs' Motion to Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-64.
*Zest Labs, Inc.* v *Walmart*; ECF No. 280; Zest Labs, Inc. et al.; "Zest Labs Inc.'s Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-4.
*Zest Labs, Inc.* v *Walmart*; ECF No. 281; Zest Labs, Inc. et al.; "Plaintiffs' Motion to Exclude Testimony of Walmart's Damages Expert, Dr. William Choi"; United States District Court for the Eastern District of Arkansas; Case No. 4:18-CV-00500-JM; Apr. 21, 2020; pp. 1-4.
*Zest Labs, Inc.* v *Walmart*; ECF No. 282; Zest Labs, Inc. et al.; "Plaintiffs' Brief in Support of Motion to Exclude Testimony of Walmart's Damages Expert, Dr. William Choi"; United States District Court for the Eastern District of Arkansas; Case No. 4:18-CV-00500-JM; Apr. 21, 2020; pp. 1-30.
*Zest Labs, Inc.* v *Walmart*; ECF No. 283; Zest Labs, Inc. et al.; "Zest Labs Inc.'s Brief in Support of Its Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-159.
*Zest Labs, Inc.* v *Walmart*; ECF No. 284; Zest Labs, Inc. et al.; "Zest Labs Inc.'s Brief in Support of Its Motion for Partial Summary Judgment That Walmart Used and Disclosed Zest Labs' Information in the Walmart Applications"; United States District Court for the Eastern District of Arkansas; Case No. 4:18-CV-00500-JM; Apr. 21, 2020; pp. 1-165.
*Zest Labs, Inc.* v *Walmart*; ECF No. 285; Zest Labs, Inc. et al.; "Zest Labs Inc.'s Motion for Summary Judgment on its Claim for Breach of Contract"; United States District Court for the Eastern District of Arkansas; Case No. 4:18-CV-00500-JM; Apr. 21, 2020; pp. 1-3.
*Zest Labs, Inc.* v *Walmart*; ECF No. 286; Zest Labs, Inc. et al.; "Zest Labs Inc.'s Brief in Support of Its Motion for Summary Judgment on its Claim for Breach of Contract"; United States District Court for the Eastern District of Arkansas; Case No. 4:18-CV-00500-JM; Apr. 21, 2020; pp. 1-30.
*Zest Labs, Inc.* v *Walmart*; ECF No. 287; Zest Labs, Inc. et al.; "Plaintiffs' Response to Defendant's Motion for Summary Judgment"; United States District Court for the Eastern District of Arkansas; Case No. 4:18-CV-00500-JM; Apr. 21, 2020; pp. 1-138.
*Zest Labs, Inc.* v *Walmart*; ECF No. 288; Zest Labs, Inc. et al.; "Plaintiffs' Opposition to Defendant's Motion To Exclude Testimony of Damages Expert Stephen L. Becker, Ph.D."; United States District Court for the Eastern District of Arkansas; Case No. 4:18-CV-00500-JM; Apr. 21, 2020; pp. 1-63.
*Zest Labs, Inc.* v *Walmart*; ECF No. 289; Zest Labs, Inc. et al.; "Plaintiffs' Brief in Opposition of Defendant's Motion to Exclude Proposed Expert Testimony of Patent Attorney Q. Todd Dickinson"; United States District Court for the Eastern District of Arkansas; Case No. 4:18-CV-00500-JM; Apr. 21, 2020; pp. 1-180.
*Zest Labs, Inc.* v *Walmart*; ECF No. 290; Zest Labs, Inc. et al.; "Plaintiffs' Brief in Opposition of Defendant's Motion To Exclude Proposed Expert Testimony of Mark Lanning"; United States District Court for the Eastern District of Arkansas; Case No. 4:18-CV-00500-JM; Apr. 21, 2020; pp. 1-62.
*Zest Labs, Inc.* v *Walmart*; ECF No. 291; Zest Labs, Inc. et al.; "Zest Labs Inc.'s Reply Brief in Support of Its Motion for Partial Summary Judgment That Information in Walmart's Patent Application Was Not Generally Known or Readily Ascertainable"; United

(56) References Cited

OTHER PUBLICATIONS

States District Court for the Eastern District of Arkansas; Case No. 4:18-CV-00500-JM; Apr. 21, 2020; pp. 1-18.
*Zest Labs, Inc.* v *Walmart*; ECF No. 292; Zest Labs, Inc. et al.; "Plaintiffs' Reply in Support of Their Motion to Exclude Testimony of Walmart's Damages Expert Dr. William Choi"; United States District Court for the Eastern District of Arkansas; Case No. 4:18-CV-00500-JM; Apr. 21, 2020; pp. 1-20.
*Zest Labs, Inc.* v *Walmart*; ECF No. 293; Zest Labs, Inc. et al.; "Brief in Support of Plaintiffs' Motion to Exclude the Testimony of Walmart's Expert Witness, Dr. David P. Dobkin"; United States District Court for the Eastern District of Arkansas; Case No. 4:18-CV-00500-JM; Apr. 21, 2020; pp. 1-13.
*Zest Labs, Inc.* v *Walmart*; ECF No. 294; Zest Labs, Inc. et al.; "Zest Labs Inc.'s Reply in Support of Their Motion for Partial Summary Judgment That Walmart Used and Disclosed Zest's Information in the Walmart Application"; United States District Court for the Eastern District of Arkansas; Case No. 4:18-CV-00500-JM; Apr. 21, 2020; pp. 1-39.
*Zest Labs, Inc.* v *Walmart*; ECF No. 295; Zest Labs, Inc. et al.; "Plaintiffs' Reply in Support of Their Motion to Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-23.
*Zest Labs, Inc.* v *Walmart*; ECF No. 296; Zest Labs, Inc. et al.; "Plaintiffs' Objections to and Motion to Strike Evidence Cited in Walmart's Responses to Zest Labs, Inc.'S Statement of Material Facts in Support of Its Motions for Partial Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart*; ECF No. 297; Zest Labs, Inc. et al.; "Plaintiffs' Memorandum in Support of Objections to and Motion to Strike Evidence Cited in Walmart's Responses to Zest Labs, Inc.'s Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart*; ECF No. 298; Walmart; "Defendant's Consolidated Brief in Opposition to Plaintiffs' Objections to and Motions to Strike Evidence Cited by Walmart in Connection With Summary Judgment Motions (Dkts. 222 & 248)"; United States District Court for the Eastern District of Arkansas; Case No. 4:18-CV-00500-JM; May 4, 2020; pp. 1-18.
*Zest Labs, Inc.* v *Walmart*; Kunin, Stephen G.; "Rebuttal Expert Report of Stephen G. Kunin"; United States District Court for the Eastern District of Arkansas; Case No. 4:18-CV-00500-JM; Nov. 25, 2019; pp. 1-38.
*Zest Labs, Inc.* v *Walmart*; Zest Labs, Inc. et al.; "Complaint"; United States District Court for the Eastern District of Arkansas; Case No. 4:18-CV-00500-JM; Aug. 1, 2018; pp. 1-26.
Zest Labs; "Blockchain for Supply Chains"; https://www.zestlabs.com/challenges/blockchain-for-supply-chains/; Available as early as Jul. 18, 2019; pp. 1-4.
Zest Labs; "Food Safety and the Supply Chain"; https://www.zestlabs.com/challenges/food-safety/; Available as early as Jul. 18, 2019; pp. 1-5.
Zest Labs; "Food Supplier Operational Efficiency"; https://www.zestlabs.com/challenges/food-supplier-operational-efficiency/; Available as early as Jul. 18, 2019; pp. 1-5.
Zest Labs; "Food Waste is a Significant Problem"; https://www.zestlabs.com/challenges/food-waste-challenge/; Available as early as Jul. 18, 2019; pp. 1-6.
Zest Labs; "Fresh Food Supply Chain"; https://www.zestlabs.com/challenges/fresh-food-supply-chain/; Available as early as Jul. 18, 2019; pp. 1-5.
Zest Labs; "Fresh Food Sustainability"; https://www.zestlabs.com/challenges/fresh-food-sustainability/; Available as early as Jul. 18, 2019; pp. 1-4.
Zest Labs; "Fresh Produce"; http://www.zestlabs.com/fresh-produce; Available as early as Oct. 21, 2017; pp. 1-14.
Zest Labs; "On-Demand Delivery"; https://www.zestlabs.com/on-demand-delivery/; Available as early as Oct. 22, 2017; pp. 1-7.
Zest Labs; "On-demand meal quality visibility from the restaurant to consumer delivery"; https://www.zestlabs.com/zest-delivery/; Available as early as Oct. 22, 2017; pp. 1-7.
Zest Labs; "Post-Harvest Technology"; https://www.zestlabs.com/challenges/post-harvest-technology/; Available as early as Jul. 18, 2019; pp. 1-8.
Zest Labs; "The Freshest Produce"; https://www.zestlabs.com/resources; Available as early as May 2, 2018; pp. 1-16.
Zest Labs; "Zest Fresh—Deep Dive"; https://www.zestlabs.com/resources; Available as early as May 2, 2018; pp. 1-15.
Zest Labs; "Zest Fresh Differentiation"; https://www.zestlabs.com/zest-fresh-differentiation/; Available as early as Jul. 18, 2019; pp. 1-6.
Zest Labs; "Zest Fresh for Beef, Poultry, Pork and Seafood"; https://www.zestlabs.com/zest-fresh-for-protein/; Available as early as Jul. 18, 2019; pp. 1-5.
Zest Labs; "Zest Fresh for Grocers"; https://www.zestlabs.com/zest-fresh-for-produce-for-grocers/; Available as early as Jul. 18, 2019; pp. 1-13.
Zest Labs; "Zest Fresh for Growers, Packers, and Shippers"; https://www.zestlabs.com/zest-fresh-for-growers-and-suppliers/; Available as early as Jul. 18, 2019; pp. 1-17.
Zest Labs; "Zest Fresh for Growers, Retailers and Restaurants"; https://www.zestlabs.com/zest-fresh-for-produce/; Available at least as early as Feb. 7, 2019; pp. 1-7.
Zest Labs; "Zest Fresh for Restaurants"; https://www.zestlabs.com/zest-fresh-for-produce-for-restaurants/; Available as early as Jul. 18, 2019; pp. 1-13.
Zest Labs; "Zest Fresh Grower Testimonial"; https://www.zestlabs.com/resources; Available as early as May 2, 2018; pp. 1-13.
Zest Labs; "Zest Fresh Overview"; https://www.zestlabs.com/resources; Available as early as May 2, 2018; pp. 1-19.
Zest Labs; "Zest Fresh Use Cases"; https://www.zestlabs.com/zest-fresh-use-cases/; Available as early as Jul. 18. 2019; pp. 1-6.
Zest Labs; "Zest Fresh: Pallet-level Quality Management from Harvest to Store"; http://www.zestlabs.com/zest-fresh; Available as early as Oct. 29, 2017; pp. 1-10.
Zest Labs; "Zest Labs Overview"; https://www.zestlabs.com/resources; Available as early as Aug. 1, 2018; pp. 1-13.
Zest Labs; " . . . Not Worth a Thousand Words—Why Traditional Temperature Loggers and Imaging Technologies are Inadequate to Determine Freshness and Reduce Waste"; https://www.zestlabs.com/wp-content/uploads/2018/03/WP-05-0318-Not-Worth-A-Thousand-Words.pdf; Mar. 5, 2018; pp. 1-6.
Zest Labs; "10 Limitations of Traditional Temperature Data Loggers And Why They're No Longer Adequate for the Cold Chain"; https://www.zestlabs.com/wp-content/uploads/2018/05/PB-04-0418-10-Limitations-of-Data-Loggers.pdf; May 4, 2018; pp. 1-3.
Zest Labs; "Before and After—The Benefits of Digital Transformation in the Fresh Food Supply Chain"; https://www.zestlabs.com/downloads/Before-and-After-Digital-Transformation.pdf; Jan. 13, 2019; pp. 1-6.
Zest Labs; "Blockchain and Achieving True Transparency—Proactively Managing Food Safety and Freshness with Blockchain and IoT Technologies"; https://www.zestlabs.com/wp-content/uploads/2018/01/WP-08-0118.Blockchain.and_.Achieving.True_.Transparency-1.pdf; Jan. 8, 2018; pp. 1-4.
Zest Labs; "Blockchain and Its Value to Suppliers"; https://www.zestlabs.com/downloads/Blockchain-and-Its-Value-to-Suppliers.pdf; Available as early as Jul. 18, 2019; pp. 1-5.
Zest Labs; "Comparing Pallet- and Trailer-level Temperature Monitoring—Implications on Quality, Freshness, Traceability and Profitability for Retail Grocers"; https://www.zestlabs.com/wp-content/uploads/2018/03/WP-04-0318-Pallet-vs-Trailer.pdf; Mar. 4, 2018; pp. 1-4.
Zest Labs; "Freshness Baseline Study—Sample Report"; http://www.zestlabs.com/wp-content/uploads/2018/03/Zest-Labs-Sample-Baseline-Report.pdf; Available as early as Mar. 2018; pp. 1-11.

(56) References Cited

OTHER PUBLICATIONS

Zest Labs; "Freshness Myths—False Beliefs That Lead to Food Waste"; https://www.zestlabs.com/downloads/Freshness-Myths.pdf; Aug. 7, 2018; pp. 1-5.
Zest Labs; "Half-bad Is Not Good"; https://www.zestlabs.com/downloads/Grocery-Store-Variability.pdf; Jun. 15, 2019; pp. 1-11.
Zest Labs; "Improve Operational Efficiency—Optimize Labor and Process Adherence to Reduce Costs"; https://www.zestlabs.com/downloads/Improving-Operational-Efficiency.pdf; Available as early as Jul. 18, 2019; pp. 1-3.
Zest Labs; "Improving Quality and Profitability for Retail Grocers—The Benefits of Pallet-level Monitoring for the Fresh and Perishable Food Cold Chain"; https://www.zestlabs.com/wp-content/uploads/2017/12/WP-01-1117.Improving.Quality.and_.Profitability.for_.Retail.Grocers.pdf; Nov. 1, 2017; pp. 1-8.
Zest Labs; "Let's Start at the Beginning—Reducing Shrink Begins at Harvest"; https://www.zestlabs.com/wp-content/uploads/2018/05/WP-12-0518-Lets-Start-at-the-Beginning.pdf; May 12, 2018; pp. 1-4.
Zest Labs; "Margins Matter—Reducing Fresh Food Waste to Improve Product Margins by 6% or More"; https://www.zestlabs.com/wp-content/uploads/2018/04/WP-11-0418-Margins-Matter-1.pdf; Apr. 11, 2018; pp. 1-6.
Zest Labs; "Measuring and Managing Operational Efficiency for Growers and Suppliers"; https://www.zestlabs.com/downloads/Zest-Fresh-Metrics-Datasheet.pdf; Aug. 25, 2019; pp. 1-5.
Zest Labs; "Monitoring the Safety and Quality of Fresh, Frozen and Processed Foods"; https://www.zestlabs.com/wp-content/uploads/2016/03/IN-SB-Fresh Produce_RestaurantFoodService_031016.pdf; Mar. 10, 2016; pp. 1-2.
Zest Labs; "Pallet-level Quality Management from Harvest to Store"; https://www.zestlabs.com/wp-content/uploads/2016/03/IN_SB_FoodIndustry_ProduceGrowers_031016.pdf; Mar. 10, 2016; pp. 1-2.
Zest Labs; "Poor Customer Experiences—Half-Bad is Not Good! A Shelf-Life Variability Study"; https://www.zestlabs.com/downloads/Variability-Infographic.pdf; Available as early as Jul. 2019; pp. 1-1.
Zest Labs; "Proactive Freshness Management: Modernizing the Fresh Food Supply Chain to Reduce Waste and Improve Profitability"; https://www.zestlabs.com/downloads/Proactive-Freshness-Management.pdf; Feb. 6, 2019; pp. 1-7.
Zest Labs; "Reduce Shrink, Improve Profitability and Quality for Fresh Food"; https://www.zestlabs.com/wp-content/uploads/2016/03/IN-SB-FreshProduce_RetailGrocers_031016.pdf; Mar. 10, 2016; pp. 1-3.
Zest Labs; "Shelf-life Variability Begins in the Field—Produce Pallets Harvested on the Same Day Vary by as Much as 86 Percent, Contributing to Shrink and Lost Profits"; https://www.zestlabs.com/wp-content/uploads/2018/02/WP-10-0218-Shelf-life-Variability.pdf; Feb. 10, 2018; pp. 1-4.
Zest Labs; "Strawberries—Shelf-Life Variability"; https://www.zestlabs.com/downloads/Zest-Fresh-Strawberries-Report.pdf; Available as early as Jul. 2019; pp. 1-2.
Zest Labs; "The Best of Zest 2018—A Collection of Our Most Popular Blogs"; https://www.zestlabs.com/downloads/The-Best-of-Zest-2018.pdf; Available as early as 2018; pp. 1-15.
Zest Labs; "The ZIPR Code Freshness Metric—Dynamically providing the current freshness of each pallet to help you intelligently manage product and reduce shrink throughout the fresh food supply chain"; https://www.zestlabs.com/downloads/The-ZIPR-Code.pdf; Jun. 1, 2018; pp. 1-3.
Zest Labs; "Today, You Saved $67,571—How Zest Fresh for Managing the Produce Cold Chain Reduces Waste and Saves Retailers Money . . . Beginning on Day One"; https://www.zestlabs.com/downloads/Today-You-Saved.pdf; Jun. 3, 2018; pp. 1-6.
Zest Labs; "True Transparency for Freshness Management, Food Safety, Authenticity and Traceability"; https://www.zestlabs.com/wp-content/uploads/2018/03/SO-04-0218-Zest-Fresh-for-Protein-Solution-Overview.pdf; Feb. 4, 2018; pp. 1-2.
Zest Labs; "Zest Labs FAQ and Reference Guide"; https://www.zestlabs.com/downloads/Zest-Labs-FAQ-and-Reference-Guide.pdf; Jul. 1, 2018; pp. 1-6.
Zest Labs; "Zest Labs Professional Services"; https://www.zestlabs.com/wp-content/uploads/2018/03/SO-05-0318-Zest-Labs-Professional-Services.pdf; Mar. 5, 2018; pp. 1-2.
Mahlknecht, S., et al.; "On Architecture of Low Power Wireless Sensor Networks for Container Tracking and Monitoring Applications" Published by IEEE (Year: 2007); 6 pages.
Softexpert; "SE Inspection Incoming/Outgoing Goods Inspection and Supplier Management"; https://softexpert.com/inspection-evaluation-goods.php; available at least as early as Jan. 27, 2017; pp. 1-3.
*Zest Labs, Inc.* v *Walmart*; ECF No. 102-02; Walmart; "Exhibit B"; United States District Court for the Eastern District of Arkansas; Case No. 4:18-CV-00500-JM; Feb. 20, 2019; pp. 1-59.
"Smart packaging: sensors for monitoring of food quality and safety" Published by Springer Link (Year: 2011).
Baietto, Manuela, and Alphus D. Wilson. "Electronic-nose applications for fruit identification, ripeness and quality grading." Sensors 15.1 (2015): 899-931.
Cubero, Sergio, et al. "Advances in machine vision applications for automatic inspection and quality evaluation of fruits and vegetables." Food and bioprocess technology 4 (2011): 487-504.

* cited by examiner

FIG. 9A
FIG. 9B
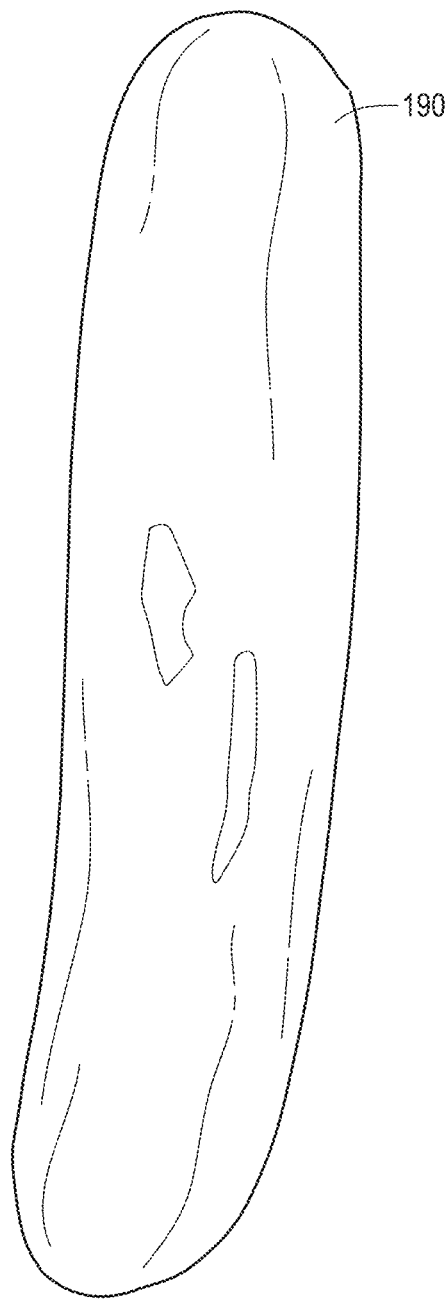
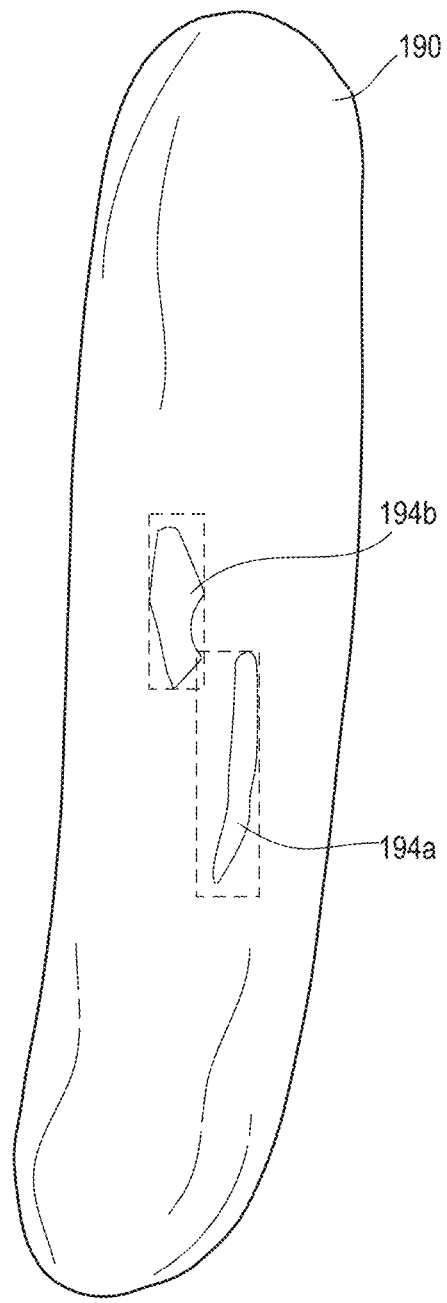

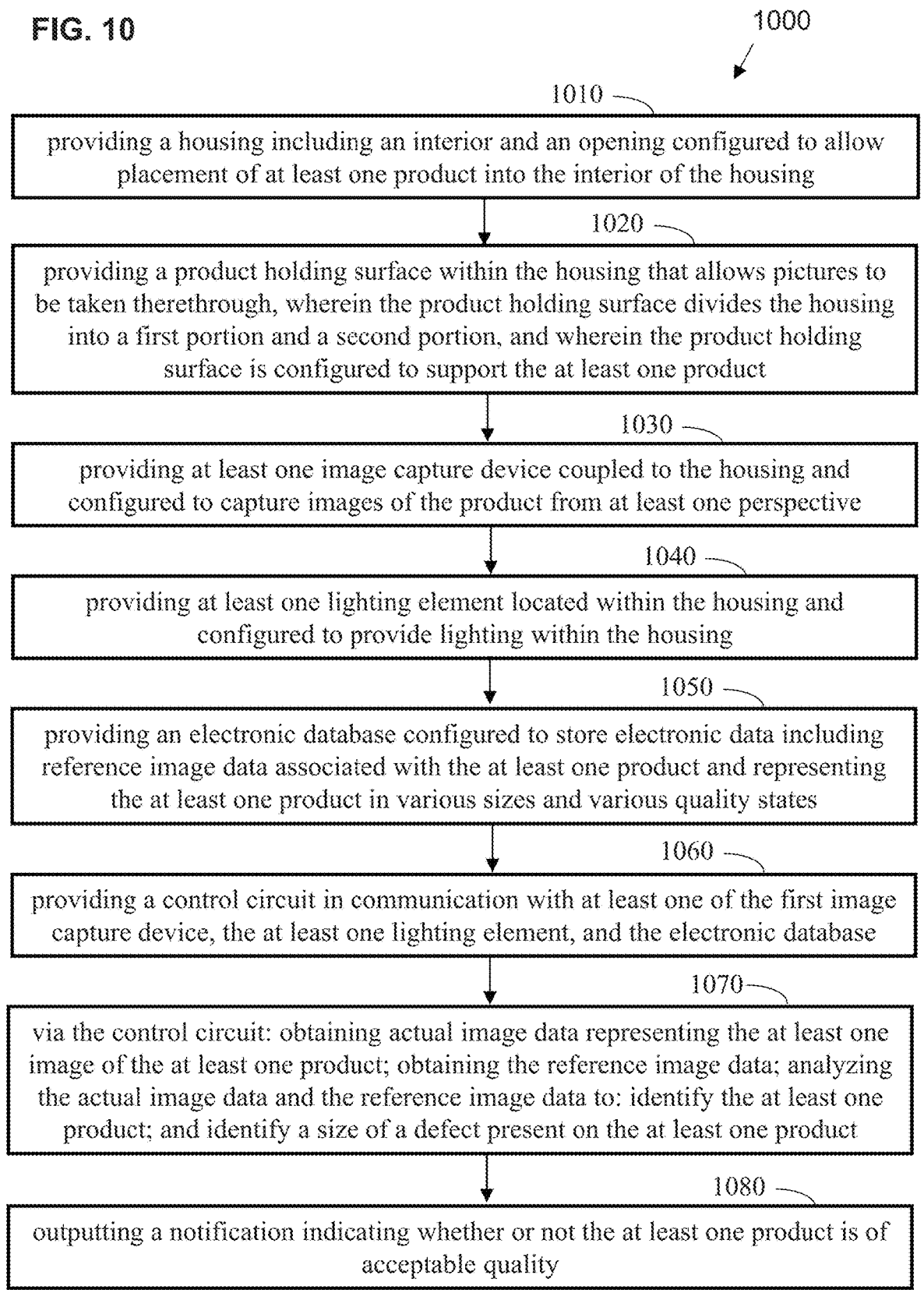

SYSTEMS AND METHODS FOR ASSESSING QUALITY OF RETAIL PRODUCTS

TECHNICAL FIELD

This disclosure generally relates to assessment of product quality and, more particularly, to assessment by a retailer of severity of defects of a retail product.

BACKGROUND

Many retail products, especially perishable goods (e.g., produce) require inspection by a retailer before the products are offered for sale to consumers. For example, the retailer may inspect the products for quality (e.g., size, defects, damage, etc.) to ensure that only suitable products are offered for sale to consumers. Such inspections are typically done manually via retail associates. For example, a retail store associate may physically/visually inspect the products to determine if the products are suitable for sale. While manual inspection of products by store associates can be used to determine the quality of products, such a manual process is time-consuming and thus costly for the retailers. Additionally, manual inspection by can be error prone due to the subjective nature of the inspection and/or due to potential human error oversight. As such, a need exists for systems and methods that can quickly, accurately, and consistently inspect products and assess the quality of the products and the degree of damage/defects on the products.

BRIEF DESCRIPTION OF THE DRAWINGS

Disclosed herein are embodiments of systems and methods of assessing the quality of, and detecting and assessing a severity of the defects in, retail products. This description includes drawings, wherein:

FIG. 9A depicts an original image of an exemplary product the quality of which is being assessed;

FIG. 9B depicts an image of the product being assessed as an instance segmentation map showing sunken area defects on the product derived using instance segmentation;

FIG. 10 is a flow chart diagram of a process of assessing quality of retail products in accordance with some embodiments.

Figure 1:
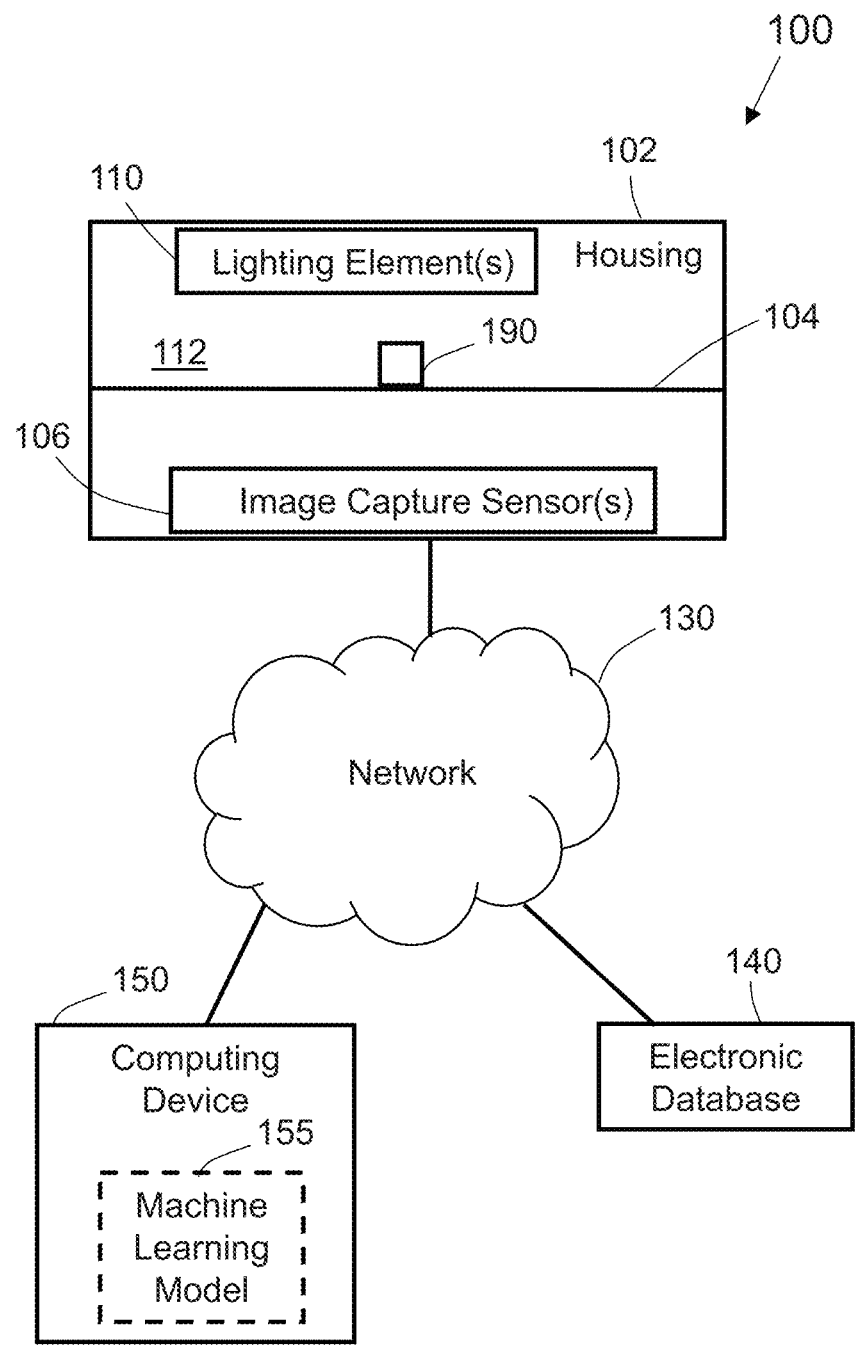
FIG. 1 is a diagram of a system of assessing the quality of, and detecting and assessing the severity of defects in, retail products, in accordance with some embodiments.

Elements in the figures are illustrated for simplicity and clarity and are have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As previously discussed, many retailers inspect products received from suppliers, manufacturers, etc. before they offer the products for sale to consumers. This inspection is performed to ensure that only products of acceptable quality are offered for sale to consumers. Not only does this aid the retailer in promoting the retailer's reputation as a seller of quality goods, but some product inspections are required by governmental agencies (e.g., the Food and Drug Administration (FDA), the U.S. Department of Agriculture (USDA), etc.). In addition to ensuring that only products of acceptable quality are offered for sale, the retailer may benefit from this inspection in that the retailer may reject products that are not suitable for sale and thus avoid paying vendors for products that are not suitable for sale.

Currently, many retailers perform these inspections manually. This manual inspection is time-consuming and error prone. For example, a retailer may inspect produce before offering the produce for sale. In the case of strawberries, a store associate of the retailer may inspect one percent (1%)

of all strawberries received in a shipment. If the retailer receives 3,000 packages (e.g., clamshells) of strawberries, the retailer must inspect 30 of the packages. To inspect a package of strawberries, the store associate must remove the strawberries from the package, count the strawberries, visually inspect the strawberries, visually determine if there is any damage (e.g., bruising, mold, etc.), record the damage, and then return the strawberries to the packaging. For an experienced employee, this process can take about two minutes to complete for each package. Consequently, if 30 packages of strawberries are to be inspected, this process will take about an hour. When adding this time amongst all other products that are to be inspected, it is easy to see how the inspection of products can require a significant portion of a retailer's recourses.

Described herein are systems and methods that can make the product inspection process more efficient and more accurate. Generally speaking, systems and methods for assessing the quality of and detecting the defects in perishable products described herein include a housing having an interior, a product holding surface, an image capture device configured to capture an image of the product, an electronic database configured to store electronic data including reference image data associated with the product and representing the product in various sizes and various quality states, and a processor-based control circuit in communication with the first image capture device and the electronic database. The control circuit is configured to obtain image data representing the image of the product, obtain the reference image data, analyze the image data and the reference image data to identify the product and identify a size of a defect present on the product, and output a notification indicating whether or not the product is of acceptable quality.

In some embodiments, a system for assessing quality of products includes at least one image capture device configured to capture at least one image of at least one product from at least one perspective. In addition, the system includes an electronic database configured to store electronic data including reference image data associated with the at least one product and representing the at least one product in various sizes and various quality states, and a processor-based control circuit in communication with at least one of the first image capture device and the electronic database. The control circuit is configured to: obtain image data representing the at least one image of the at least one product; obtain, from the electronic database, the reference image data; analyze the image data and the reference image data to: identify the at least one product; identify a size of a defect present on the at least one product; and output a notification indicating whether or not the at least one product is of acceptable quality.

In some embodiments, a method of assessing quality of perishable, consumable products comprises capturing at least one image of at least one product from at least one perspective by at least one image capture device and storing, in an electronic database, electronic data including reference image data associated with the at least one product and representing the at least one product in various sizes and various quality states. The method further includes, by a processor-based control circuit that is in communication with at least one of the first image capture device and the electronic database: obtaining image data representing the at least one image of the at least one product; obtaining, from the electronic database, the reference image data; and analyzing the image data and the reference image data to: identify the at least one product; identify a size of a defect present on the at least one product. The method further includes translating the size of the defect present on the at least one product into a defect severity level of the at least one product; correlating the defect severity level of the at least one product to a predetermined threshold defect severity level for the at least one product; and when the defect severity level of the at least one product is below the predetermined threshold defect severity level of the at least one product, outputting a notification for the at least one product indicating that the at least one product is of acceptable quality; and when the defect severity level of the at least one product is above the predetermined threshold defect severity level of the at least one product, outputting a notification for the at least one product indicating that this product is not of acceptable quality.

Figure 2:
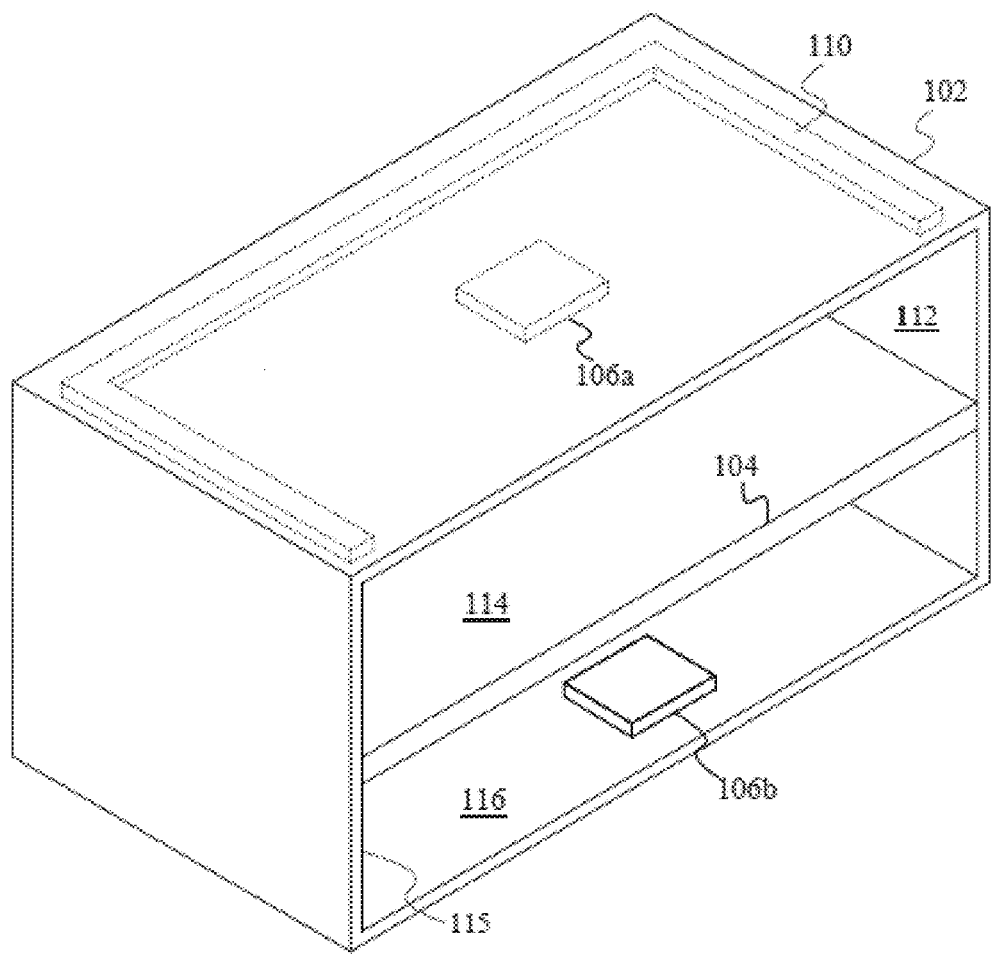
FIG. 2 is a front perspective view of an exemplary housing for assessing the quality of products, according to some embodiments.
Figure 3:
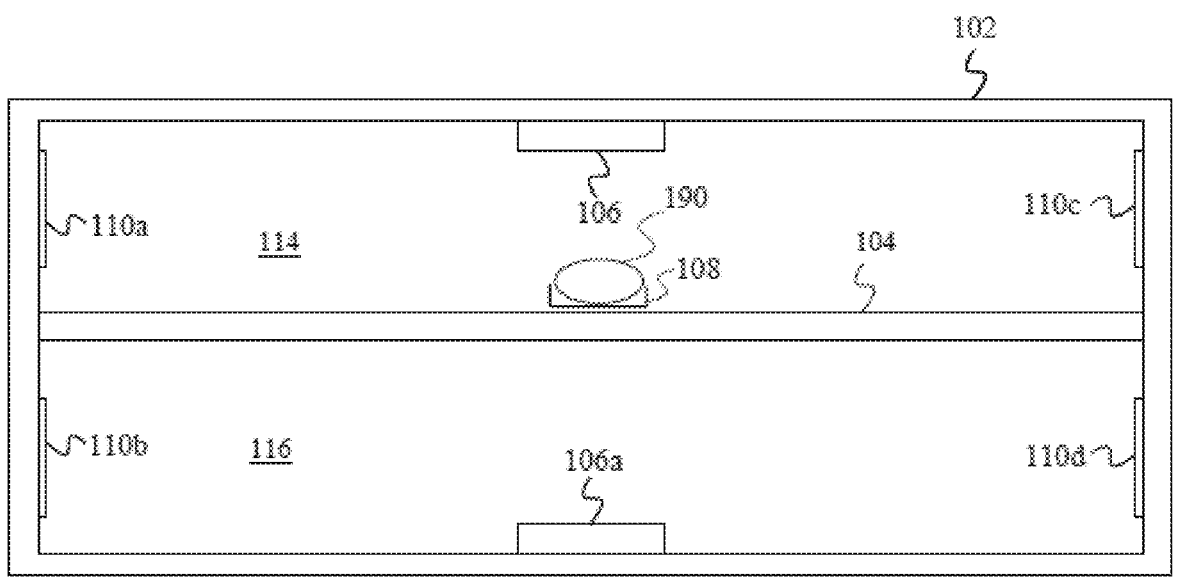
FIG. 3 is a front elevational view of an exemplary housing for assessing the quality of products, according to some embodiments.

FIG. 1 shows an embodiment of a system 100 of a system for assessing quality of products includes an enclosure or housing 102. With further reference to FIGS. 2 and 3, the exemplary housing 102 of FIG. 1 includes an interior 112 and an opening 115 configured to allow placed of one or more products to be assessed into the interior 112. The exemplary housing 102 further includes a product holding surface 104 for supporting thereon one or more (perishable) products 190 to be assessed/inspected for quality within the housing 102. While one product 190 is depicted in FIGS. 1 and 3 on the product holding surface 104 for simplicity, it will be appreciated that the system 100 may be used to simultaneously assess the quality of multiple products 190 placed together into the interior 112 and onto the product holding surface 104 of the housing 102.

Exemplary products 190 may include, but are not limited to, any general-purpose consumer goods, as well as consumable/perishable products, such as food/grocery/beverage items, medications, and dietary supplements. While the housing 102 depicted in FIG. 1 is a generally rectangular shape, it will be appreciated that the housing 102 may be of any shape suitable for receiving (i.e., allowing placement of) one or more products 190, and that the size and shape of the housing 102 can be based upon the size and shape of the products 190 being inspected.

The housing 102 may include a (transparent or non-transparent) door (not shown), which may open and close the opening 115 to the interior 112 of the housing 102. The door can be of any suitable type, for example, hinged at one, or multiple, ends of the housing 102, slidable across the housing 102, rotatable within or around the housing 102, foldable within or about the housing, etc. The door can be rigid and/or pliable (e.g., fabric), as desired based on the type of the housing 102 being used and/or the products 190 being assessed by the system 100. The door can take any suitable form based on a desired condition within the housing 102. For example, in some embodiments, it may be desired that the door create a seal with the housing 102 that prevents, or diminishes the amount of, external light entering the housing 102 when closed. It should be noted, that in some embodiments, the door may not be a "door" in the traditional sense, but rather an opening in the housing 102 that allows placement of a product 190 into the housing 102.

The housing 102 includes a product holding surface 104. The product holding surface 104 is configured to support one or more products 190 thereon. In the illustrated embodiment, the product holding surface 104 divides the housing 102 into two portions: a first portion 114, and a second portion 116. Although in the illustrated embodiment the product holding surface 104 roughly divides the housing 102 into two equal portions 114 and 116, it will be appreciated that the portions 114, 116 of the housing 102 may be of different sizes. For example, in some embodiments, the position/height of the product holding surface 104 can be adjusted (e.g., up and down) within the housing 102 to accommodate products 190 of different sizes and/or fine-tune how images of the products 190 are captured. Preferably, the product holding surface 104 comprises a transparent or translucent material through which images of the product can be taken. For example, the product holding surface 104 can be made of glass, plastic, and/or any other suitable material. Additionally, in some embodiments, only a portion (e.g., a window) of the product holding surface 104 may be transparent/translucent to allow images to be captured through the product holding surface 104, while the rest of the product holding surface 104 may be opaque.

In some embodiments, the product holding surface 104 includes a product stopper 108 configured to retain (i.e., restrict from moving) the products 190 placed on the product holding surface 104 in a specified position and within a specified area (e.g., within the field of view of an image capture device and in an optimal position for the capturing of the images of the product 190, on the product holding surface 104, in an orientation such that any defect on the product 190 faces the image capture devices, etc.). The product stopper 108 may be transparent to permit image devices to capture images of the product 190 therethrough, and may comprise any suitable structure, mechanism, or device for positioning of the product 190 on the product holding surface 104. For example, the product stopper 108 may include a ledge, a ridge, a wall, or the like.

The housing 102 includes two image capture devices: a first image capture device 106a and a second image capture device 106b. The image capture devices can be of any suitable type and are capable of capture still and/or moving images (e.g., video). The image capture devices can be selected based on the size of the housing 102, type of products to be assessed, placement of the product holding surface 104, the shape of the housing 102, the type(s) of images desired, etc. For example, the image capture devices can include wide angle lenses to capture a large area of the housing 102.

In the exemplary embodiment illustrated in FIGS. 2-3, the housing 102 includes a first image capture device 106a and a second image capture device 106b, and the first and second image capture devices 106a, 106b are positioned, such that the first image capture device 106a is located in the first portion 114 of the housing 102 and is configured to capture images of the products 190 from a first perspective. As depicted in FIGS. 2-3, the first image capture device 106a is positioned to capture an overhead (e.g., top view) image of the product 190. That is, the first image capture device 106a is located on the "ceiling" of the housing 102, as indicated by the dashed lines in FIG. 2, although the first image capture device 106a may be located anywhere else in the first portion 114 of the housing 102. For example, the first image capture device 106a can be located on a side wall of the housing 102 (e.g., the side or back of the housing 102) to capture images of the products 190 from a perspective or a side view. In the illustrated embodiment, the housing 102 also includes a second image capture device 106b positioned, such that the second image capture device 106b is located in the second portion 116 of the housing 102 and is configured to capture images of the products 190 from a second perspective. As depicted in FIGS. 2-3, the second image capture device 106b is positioned to capture an underlying (e.g., bottom view) image of the product 190. That is, the second image capture device 106b is located on the "floor" of the housing 102, although the second image capture device 106b may be located anywhere else in the second portion 116 of the housing 102. For example, the second image capture device 106b can be located on a side wall of the housing 102 (e.g., the side or back of the housing 102) to capture images of the products 190 from a perspective or a side view.

Notably, while FIGS. 2-3 depict only two image capture devices 106a and 106b, it will be appreciated that, in some embodiments, the housing can include additional image capture devices. For example, the housing 102 may include a third image capture device to capture images of products 190 from a third perspective, a fourth image capture device to capture images of products 190 from a fourth perspective, etc. The additional image capture devices can be located anywhere about the housing 102 (e.g., in the housing 102, on the housing 102, outside of the housing 102, on a door, etc.). Furthermore, it will be appreciated that the image capture devices 106a, 106b may be any type of video capture device (e.g., a video camera, a thermal camera, a hyper spectral camera, a bifocal camera, an ultra-wideband sensor, or the like).

In some embodiments, the housing 102 includes one or more a lighting elements 110. The lighting elements 110 may be configured to provide lighting for the interior of the housing 102 and/or to provide an operational status of the components of the system 100. For example, the lighting element 110 may include one or more status lights indicating an operational status of at least one of the components of the system 100 (e.g., control circuit (described in more detail below), image capture devices 106a, 106b, lighting element (s) 110, etc.). For example, in one embodiment, the system 100 creates an error log at a time when a status light turns red (indicating that a problem with a component of the system occurred), and processing the error log and determining when the status light turned red enables the control circuit to determine both the hardware component that malfunctioned and the processing step when this malfunction occurred.

In some one embodiment, the lighting element 110 is located within the housing 102 and provides lighting within the housing 102. The housing 102 may include a lighting element 110 located on the "ceiling" and/or floor of the housing 102, as indicated by the dashed lines in FIG. 2 and/or on one or more side walls of the housing 102, as indicated by the lighting elements 110a-110d in FIG. 3. The lighting element can be of any suitable type (e.g., incandescent, fluorescent, LED, etc.) and can produce light that is visible and/or invisible to the human eye. Generally, the housing 102 may include any number of lighting elements 110 configured for providing lighting within the housing 102 and/or providing an operational status of the components of the housing 102 and/or system 100.

In some embodiments, the lighting elements 110 are configured to illuminate one or more side walls of the housing 102 to provide a monochromatic background (e.g., white, green, blue, grey, black, etc.), and each of the lighting elements 110 may be configured to provide light of varying colors such that, when necessary to provide a background more suitable for a given product 190, any one (or all) of the lighting elements 110 may, in response to a signal transmitted by a control circuit (described in more detail below), change the background color of the at least one side wall of the housing 102.

With reference to FIG. 1, as will be described in more detail below, one or more images of one or more products 190 located on the product holding surface 104 of the housing 102 captured by one or more image capture sensors/devices 106a, 106b are transmitted by the image capture sensors/devices 106a, 106b over a network 130 to an electronic database 140 and/or to a computing device 150. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some aspects, one or more electronic devices of system 100 may include cloud-based features, such as cloud-based computer vision application programming interfaces (APIs) and cloud-based memory storage.

With reference to FIG. 1, the exemplary system 100 includes an electronic database 140. In some embodiments, the electronic database 140 and the computing device 150 may be implemented as two separate physical devices. It will be appreciated, however, that the computing device 150 and the electronic database 140 may be implemented as a single physical device. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

Generally, the exemplary electronic database 140 of FIG. 1 is configured to store data associated with images of the products 190 captured by the image capture devices 106a, 106b. Some exemplary electronic data that may be stored in the electronic database 140 includes but is not limited to electronic data corresponding to reference image data associated with the products 190 offered for sale by the retailer and representing the products 190 from various view perspectives (e.g., top, bottom, side, etc.), and in various sizes (e.g., small, medium, large, extra-large) and various quality states (e.g., acceptable, not acceptable, somewhat damaged but acceptable, damaged to an unacceptable degree, including a small defect but acceptable, including a defect large enough to make the product unacceptable, etc.). The electronic database may also include, for example, electronic data representative of unique identifiers of the products 190 (e.g., which may be captured by the image capture devices 106a, 106b from labels on the products 190).

In some embodiments, the electronic database 140 stores a set of one or more government regulations such as FDA regulations, USDA regulations, industry standards, corporate policies, or the like data indicating the governing standard for what is an acceptable product 190 and what is not an acceptable product 190. For example, the electronic database 140 may store predefined specifications defined by the USDA with respect to consumable product quality standards, and which may define the maximum possible degree of defect/damage on a surface of a given consumable product 190 (e.g., produce) that may be acceptable for a retailer to sell to a consumer by a retailer.

The system 100 of FIG. 1 further includes a computing device 150 configured to communicate with the electronic database 140, the image capture devices 106a, 106b, and the lighting elements 110 over the network 130. The computing device 150 may be a stationary or portable electronic device, for example, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. As shown in FIG. 1, the computing device 150 may be configured to execute a machine learning model 155. 1 The computing device 150 may be located at the same physical location as the electronic database 140, or may be located at a remote physical location relative to the electronic database 140.

Notably, in the embodiment illustrated in FIG. 1, the computing device 150 is communicatively coupled to the housing 102 and may be in two-way communication with components of the housing 102 (e.g., image capture devices 106a, 106b and/or lighting elements 110) over the network 130. In some embodiments, the computing device may be integrally mounted to the housing 102 and be in the form of a user interface-based controller.

Figure 4:
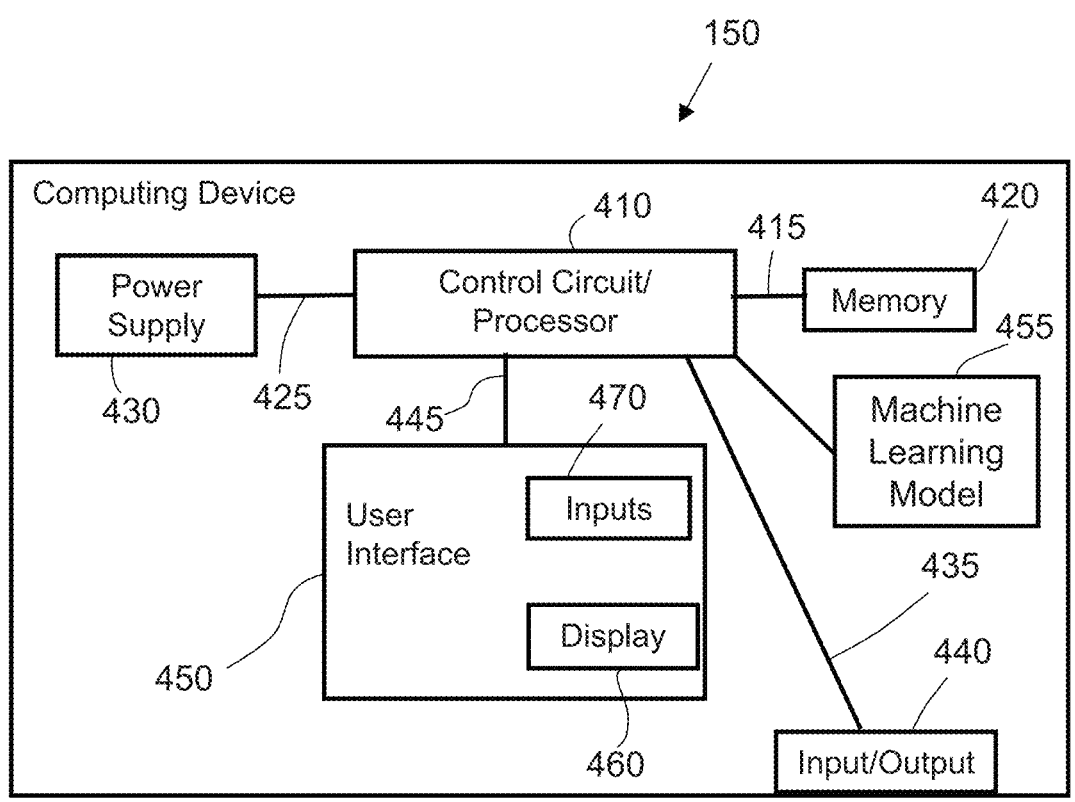
FIG. 4 is a functional diagram of an exemplary computing device usable with the system of FIG. 1 in accordance with some embodiments.

With reference to FIG. 4, the exemplary computing device 150 configured for use with exemplary systems and methods described herein may include a control circuit 410 including a programmable processor (e.g., a microprocessor or a microcontroller) electrically coupled via a connection 415 to a memory 420 and via a connection 425 to a power supply 430. The control circuit 410 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 410 can be configured (for example, by using corresponding programming stored in the memory 420 as will be well understood by those skilled in the art) to carry out one or more of the steps, actions, and/or functions described herein. In some embodiments, the memory 420 may be integral to the processor-based control circuit 410 or can be physically discrete (in whole or in part) from the control circuit 410 and is configured non-transitorily store the computer instructions that, when executed by the control circuit 410, cause the control circuit 410 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 410 of the computing device 150 is also electrically coupled via a connection 435 to an input/output 440 that can receive signals from, for example, from the image capture devices 106, electronic database 140, and/or from another electronic device (e.g., an electronic device of a worker of the retailer or a mobile electronic device of a customer of the retailer). The input/output 440 of the computing device 150 can also send signals to other devices, for example, a signal to the electronic database 140 to store and update reference images associated with products 190. For example, in some aspects, the control circuit 410 is programmed to process the images captured by the image capture devices 106 and to extract raw image data and metadata from the images, and to cause transmission of the data extracted from the images to the electronic database 140 for storage. In some aspects, the image capture devices 106 may capture images of the products 190 and transmit the captured images to an image processing service, which may be cloud-based, or which may be installed on/coupled to the computing device 150 and executed by the control circuit 410.

Figure 7:
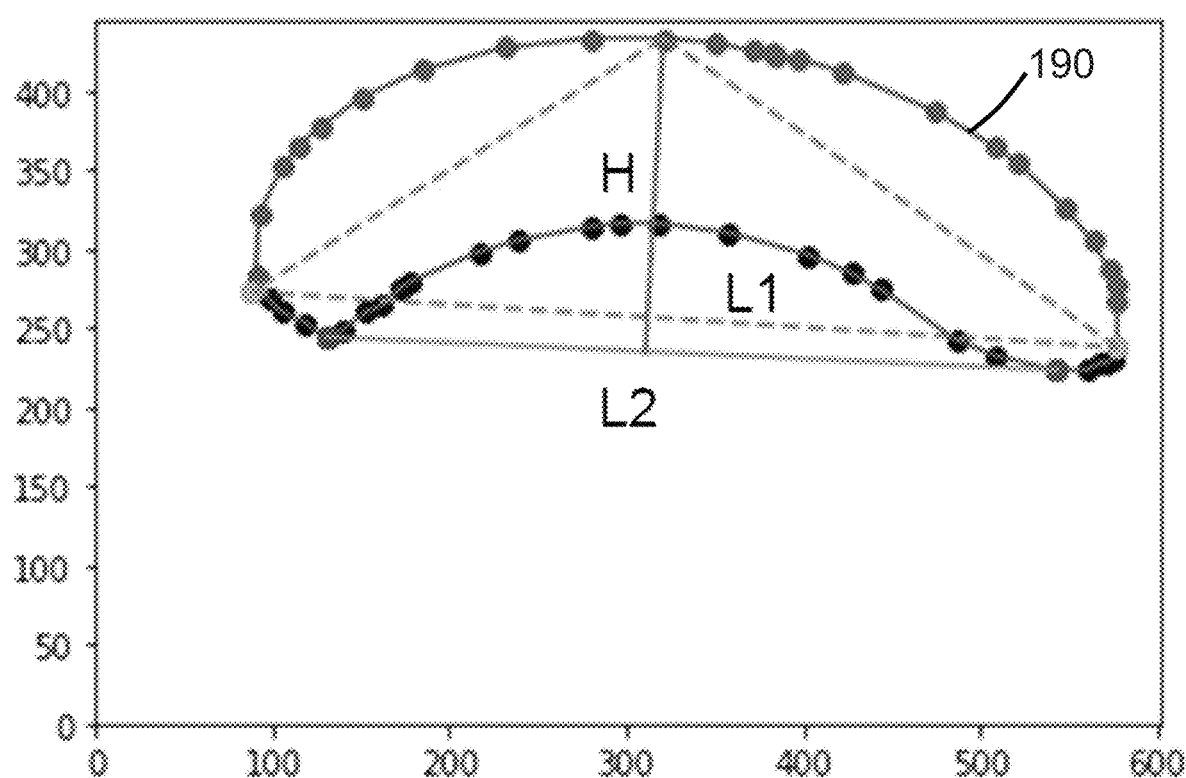
FIG. 7 depicts an exemplary image depicting a dot matrix shape representation of an image of another exemplary product the quality of which is being assessed.

The processor-based control circuit 410 of the computing device 150 shown in FIG. 7 is electrically coupled via a connection 445 to a user interface 450, which may include a visual display or display screen 460 (e.g., LED screen) and/or button input 470 that provide the user interface 450 with the ability to permit an operator of the computing device 150 (e.g., worker at a the retail facility (or a worker at a remote control center) tasked with monitoring the quality and defect severity of the products 190 received by a facility (e.g., distribution center, store, etc.) to manually control the computing device 150 by inputting commands via touch-screen and/or button operation and/or voice commands. Possible commands may, for example, cause the computing device 150 to cause transmission of a notification signal indicating that a certain product 190 is of a quality acceptable to the retailer or below a quality that is acceptable to the retailer.

In some aspects, the manual control by an operator of the computing device 150 may be via the user interface 450 of the computing device 150, via another electronic device of the operator, or via another user interface and/or switch, and may include an option to modify/update the reference image data generated by the control unit 410 using a machine learning model 455 (e.g., deep neural network) with respect to the products 190 analyzed by the system 100. In some embodiments, the user interface 450 of the computing device 150 may also include a speaker 480 that provides audible feedback (e.g., alerts) to the operator of the computing device 150. It will be appreciated that the performance of such functions by the processor-based control circuit 410 is not dependent on a human operator, and that the control circuit 410 may be programmed to perform such functions without a human operator.

In some embodiments, the control circuit 410 of the computing device 150 is programmed to control various elements of the housing 102, for example, the image capture devices 106 and the lighting elements 110. For example, the control circuit 210 may be programmed to send one or more signals to instruct the lighting elements 110 to illuminate the interior 112 of the housing 102 in a selected color (e.g., to provide a monochromatic background that would enhance the quality of the images taken by the image capture devices 106), or to instruct one or more of the image capture devices 106 to capture one or more images of one or more products 190 located on the product holding surface 104.

In some embodiments, the control circuit 410 of the computing device 150 is configured to obtain from the electronic database 140, directly, or via a cloud-based computer vision model application programming interface (API), one or more images of one or more products 190 captured by the image capture devices 106*a*, 106*b* while the product(s) was/were positioned on the product holding surface 104 of the housing 102. In certain implementations, the control circuit 410 is configured to process the image(s) captured by the image capture devices 106*a*, 106*b* to detect/identify each individual product 190 in the image. For example, in some aspects, the control circuit 410 is configured to process the images to detect the identity and the overall size and shape of each product 190 captured in the image.

Figure 5:
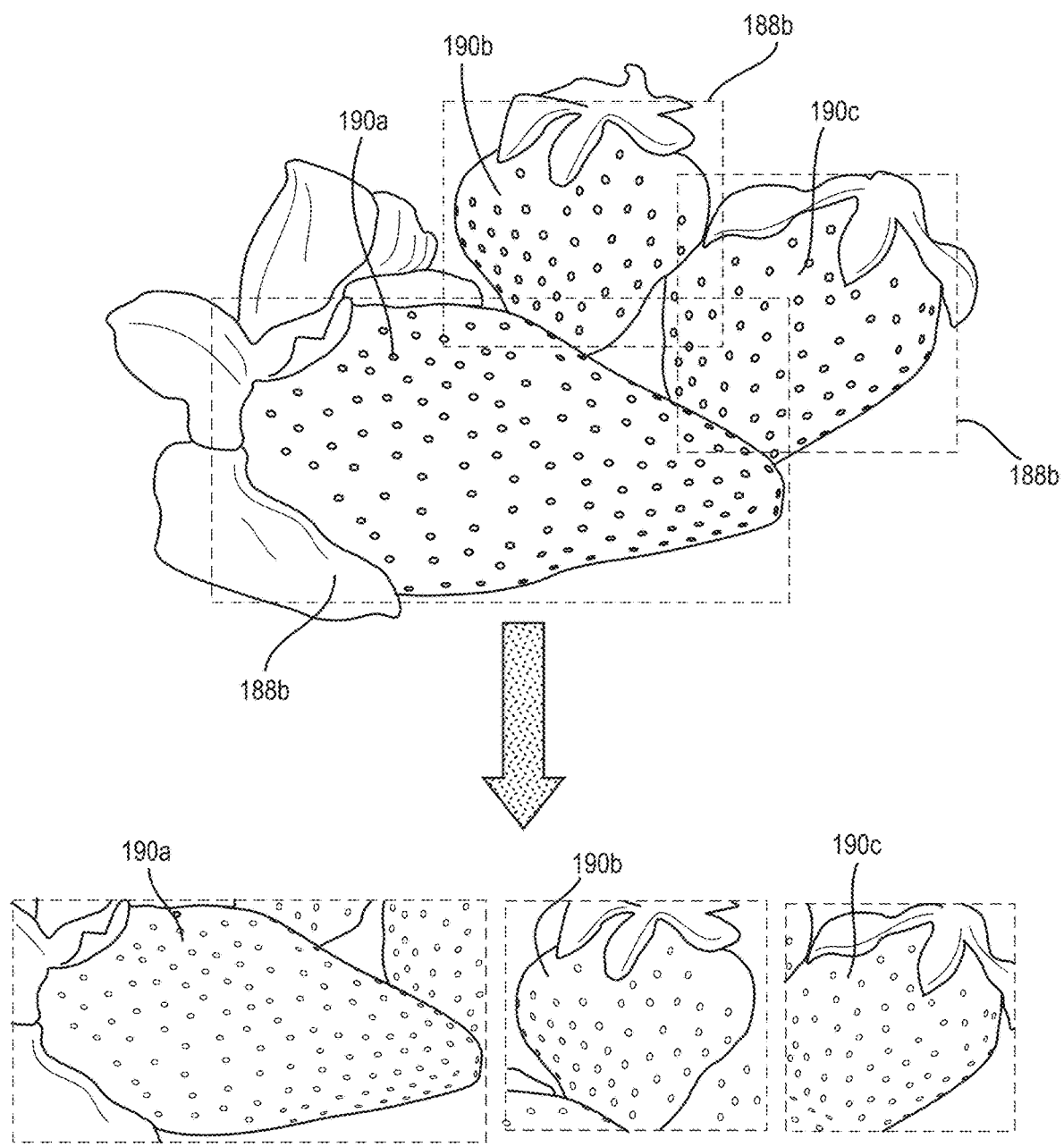
FIG. 5 depicts an image of a group of products being assessed with a virtual boundary line around each one of the products, as well as images of each of the individual products cropped out of the group image based on the virtual boundary lines.

In some embodiments, the control circuit 410 is programmed to detect and/or classify the product 190 captured in the image by processing the raw data of the image to generate a virtual boundary line 188*a*-188*c* around each one of the products 190*a*-190*c* (in this exemplary case, strawberries) detected in the image, as shown in FIG. 5. In the exemplary image shown in FIG. 5, three products 190*a*-190*c* (i.e., strawberries) were detected by the control circuit 410, and each of the products 190*a*-190*c* in the image is surrounded by its own respective virtual boundary line 188*a*-188*c*. As can be seen in FIG. 3, each virtual boundary line 188*a*-188*c* fully encloses its respective product 190*a*-190*c*, and the size of the product 190*a*-190*c* corresponds to the size of the virtual boundary line 188*a*-188*c* (i.e., the smallest product 190*b* has a virtual boundary line 188*b* with the smallest perimeter, the larger product 190*c* has a virtual boundary line 188*c* with a larger perimeter, and the largest product 190*a* has a virtual boundary line 188*a* with the largest perimeter).

In the embodiment shown in FIG. 5, after the general outline of each one of the products 190*a*-190*c* is detected, and after each of the individual products 190*a*-190*c* detected in the image is bounded by a virtual boundary line 188*a*-188*d*, the control circuit 410 is programmed to process the image shown in FIG. 5 (e.g., by cropping) to create a series of images that each include only the image data located within a perimeter of one of the virtual boundary lines 188*a*-188*c*. Exemplary individual cropped images created by the control circuit 410 based on the original image (as well as the original image itself) are shown in FIG. 5. In some aspects, one or more of the cropped images of FIG. 5 may serve as reference image data boundary box models for the product 190 to facilitate future identification of the product 190 using the images captured by the image capture devices 106*a*, 106*b* in the housing 102.

In some embodiments, after reference image data as shown in FIG. 5 are generated, the control circuit 410 is programmed to use the reference image data to train machine learning and computer vision models that may include one or more models (e.g., a neural network-based model or the like) to draw virtual boundary lines 188*a*-188*c* around, and classify/identify, the products 190 in images that may be captured in the future by the image capture devices 106*a*, 106*b* on the product holding surface 104 of the housing 102. In some aspects, a machine learning/neural network may be a deep convolutional neural network.

In some implementations, the control circuit 410 is configured to train the machine learning/computer vision models to draw virtual boundary lines 188*a*-188*c* around the products 190*a*-190*c* using a cloud-based computer vision API. As such, the processing of the raw image data by the control circuit 710 of the computing device 150 may generate a large set of reference image data that may be used to train computer vision models to detect, in future images of products 190 captured by image capture devices 106*a*, 106*b*, the presence of defects, damage, or the like.

In some embodiments, after the raw image data of the products 190*a*-190*c* is obtained and the virtual boundary lines 188*a*-188*c* are generated around the products 190*a*-190*c*, the control circuit 410 is programmed to use these reference bounded images to train machine learning and computer vision models (e.g., convolutional neural network (CNN), recurrent neural network (RNN), long short-term memory (LSTM), feedforward neural network (FFNN), TensorFLow, neural architecture learning, transfer learning, Google AutoML, etc.) to draw virtual boundary lines 188*a*-188*c* around consumer products 190*a*-190*c* and/or to specifically identify the products 190*a*-190*c* based on raw image data of the products 190a-190c that may be captured in the future by the image capture devices 106a, 106b in the housing 102.

In some embodiments, classic computer vision techniques are used to train the computer models for product and product defect identification and classification. In some embodiments, the computing device 150 is configured to use reinforcement learning to optimize architecture configurations of a convolutional neural network with transfer learning from ImageNet, but it will be appreciated that various different object detection algorithms may be used.

In certain implementations, the control circuit is programmed to analyze the actual image data captured by the image capture devices 106a, 106b of a product 190 (e.g., strawberries) being assessed for quality in the housing 102 and to analyze the reference image data stored in the electronic database 140 in association with the same type product 190 (e.g., strawberries) to identify a type of defect/damage present on the product 190 being currently assessed, and to output an indication identifying the type of defect detected as being present on the product 190 being assessed. For example, in some embodiments, the damage/defects in product (e.g., strawberries, cucumbers, apples, bananas, etc.) that may be detected by the control circuit 410 via the machine learning/computer vision model may include but are not limited to scars damage, shriveled ends damage, sunken area damage, decay damage, and the like.

In some aspects, the reference image data for various products 190 detected in images previously captured by the image capture devices 106a, 106b are stored in the electronic database 140 for future retrieval by computing device 150 when processing incoming actual images newly-captured by the image capture devices 106a, 106b. Since they are generated via computer vision/neural networks trained on hundreds/thousands of images of the products 190, the reference image data models generated by the computing device 150 (and/or a cloud-based computer vision API) and stored in the electronic database 140 facilitate faster and more precise detection/classification/identification of the products 190 in subsequent images newly-captured by the image capture devices 106a, 106b.

In one aspect, the control circuit 410 is programmed to obtain (from the image capture devices 106a, 106b or the electronic database 140) actual image data representing one or more images of one or more products 190 captured by the image capture devices 106a, 106b while located on the product holding surface 104, obtain, from the electronic database 140, the reference image data, and analyze the actual image data and the reference image data to identify the one or more products 190 in the image, as well as to detect one or more defects present on the surface of the one or more products 190, and identify a size (e.g., area) of each detected defect, and to output a notification (e.g., on a display screen 460 of the computing device 150, on a display screen of a portable electronic device of a store associate, etc.) indicating whether or not the product 190 is of a quality that is acceptable to the retailer for offering for sale to the consumers.

Figure 6:
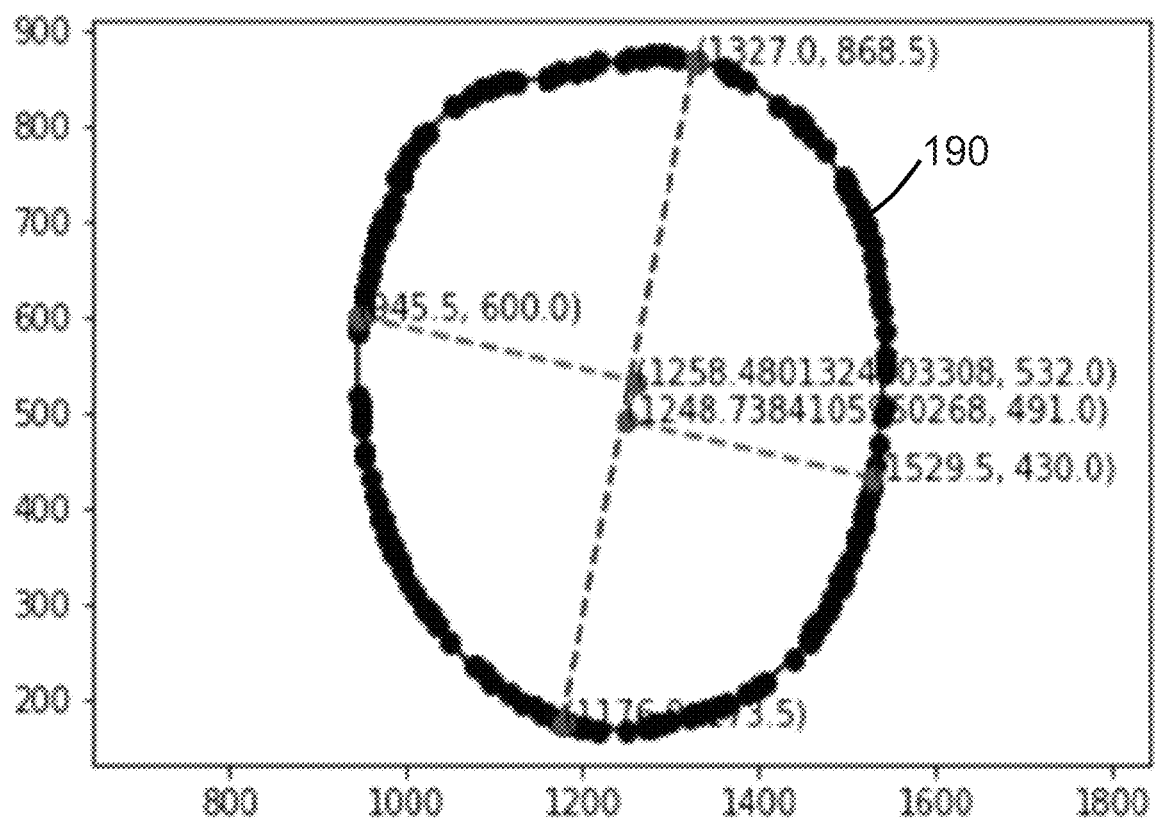
FIG. 6 depicts an exemplary image depicting a dot matrix shape representation of an image of one exemplary product the quality of which is being assessed, in accordance with some embodiments.

In some embodiments, control circuit 410 of the computing device 150 is programmed to analyze the actual image data of the product 190 being assessed for quality and the reference image data stored in the electronic database 140 to detect exterior contours of the product 190 in order to identify the size (e.g., length, width, height, arc, etc.) of the product 190. For example, FIG. 6 shows an exemplary pictorial representation of a generally round/oval produce product 190 (i.e., strawberry) depicted as a series of pixelated dots that represent the contours of the product 190 that was captured in an image by an image capture device 106 installed in the housing 102. In some embodiments, the control circuit 410 is programmed to determine a scale factor and a number of pixels representing the contours of the product 190, for example, using a color card (e.g., a Macbeth color checker chart), and to then translate the number of pixels representing the contours of the product 190 to actual dimensions (in inches, centimeters, etc.) of the product 190. In one implementation, the control circuit 410 may be programmed to process the actual image data associated with the product 190 using the color card to white balance and color correct colors in the actual image data, as a result of which the control circuit 410 more precisely defines the contours of the product 190 and more precisely determines the size of the product 190 (and the size of the defects on the product 190), even based on images of the product 190 taken at different lighting conditions (and potentially different housings 102).

In the example depicted in FIG. 6, based on the analysis of the scale factor and number of pixels of the product 190 (i.e., strawberry), the control circuit 410 estimated the size of the product 190 to have a length of 2.44 inches and a width of 2.08 inches, and when this product 190 was measured using a ruler to determine its actual size, the length of the product 190 was 2.43 inches (absolute error 0.01 inches) and the width of the product 190 was 2 inches (absolute error 0.08 inches). In certain implementations, the control circuit 410 of the computing device is programmed to cause the data representing the estimated size of the product 190 and/or the estimated size of the defects of the product 190 to be displayed to a user within a graphical modifiable user interface in the form of a dashboard, enabling the user (i.e., a quality control associate), when necessary, to override the product/defect size estimations by the control circuit 410. In an event that the user overrides one or more product/defect size estimates by the control circuit 410, the control circuit 410 is programmed to update the reference image data stored in the electronic database 140 in association with the given retail product 190, which also permits the control circuit 410 to retrain the computer vision/object identification model for the product 190 using more precise data, making the model more precise in future uses.

In another example, FIG. 7 shows an exemplary pictorial representation of a produce (i.e., banana) having a different (elongate and arcuate) shape depicted as a series of pixelated dots that represent the contours of the product 190 that was captured in an image by an image capture device 106 installed in the housing 102. In some embodiments, the control circuit 410 is programmed to determine a scale factor and a number of pixels representing the contours of the product 190 (e.g., using a color card), and to then translate the number of pixels representing the contours of the product 190 to actual physical dimensions (in inches, centimeters, etc.) of the product 190. In the example depicted in FIG. 7, based on the analysis of the scale factor and number of pixels of the product 190 (i.e., strawberry), the control circuit 410 estimated that the length (L1) of the product 190 is 508.55 pixels, the ventral straight length (L2) of the product is 413.53 pixels, the arc height (H) of the product 190 is 198.45 pixels. In some implementations, the control circuit 410 is programmed to determine a ratio of an overall surface area of the defect present on the at least one product 190 and an overall surface area of the at least one product 190, and correlate the determined (i.e., calculated)

ratio to the predetermined threshold defect severity level to determine whether the product 190 is of acceptable quality.

As mentioned above, in some embodiments, the control circuit 410 is programmed to obtain actual image data representing one or more images of one or more products 190 captured by the image capture devices 106a, 106b, obtain, from the electronic database 140, the reference image data, and analyze the actual image data and the reference image data to detect and/or classify one or more defects present on the surface of the one or more products 190, and identify a size (e.g., area) of each detected defect. In certain implementations, the control circuit 410 is programmed to, after determining a size or area of the defect, to translate the size of the defect present on the product 190 into a severity level of the product 190.

In one aspect, the electronic database 140 stores data representative of product severity thresholds for each type of product 190 (e.g., strawberries, bananas, tomatoes, grapes, apples, cucumbers, etc.) being assessed for quality by the system 100. The product severity threshold is a defect/damage severity value that represents the maximum defect/damage severity value associated with a given product 190 that the retailer is willing to accept (due to local governmental regulations, the retailer's internal quality standards, etc.) for purposes of offering the product 190 to consumers. In some embodiments, the control circuit 410 is programmed to correlate the defect severity level determined for a product 190 being assessed to a predetermined threshold defect severity level for the product 190 stored in the electronic database 140. In one implementation, when the defect severity level of the product 190 is below the predetermined threshold defect severity level of the product 190, the control circuit 410 is programmed to output (to a display 460 of the computing device 150 or to a display of a portable electronic device of a worker of the retailer) a notification indicating that the product 190 is of acceptable quality. Conversely, when the defect severity level of the product 190 is above the predetermined threshold defect severity level of the product 190, the control circuit 410 is programmed to output (to a display 460 of the computing device 150 or to a display of a portable electronic device of a worker of the retailer) a notification indicating that the product 190 is of an unacceptable quality.

Figure 8A:
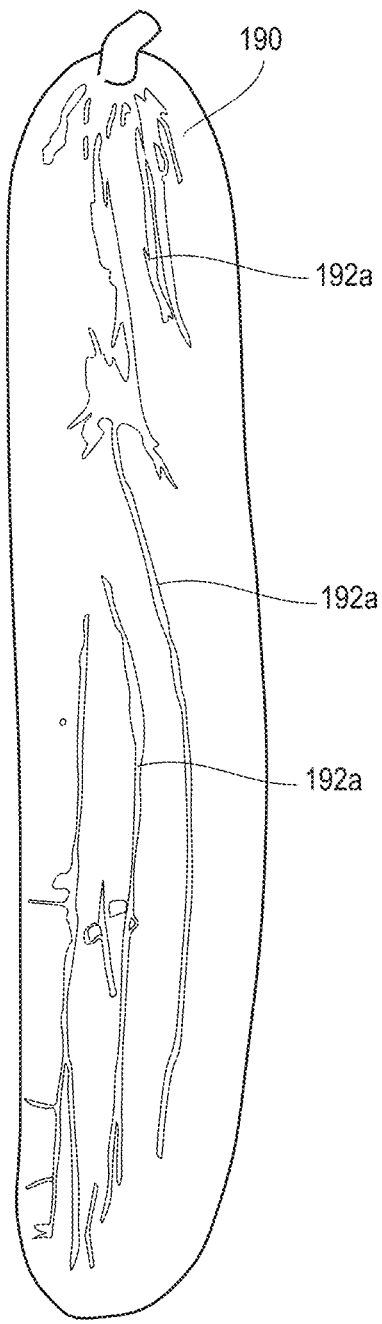
FIG. 8A depicts an original image of an exemplary product the quality of which is being assessed.
Figure 8B:
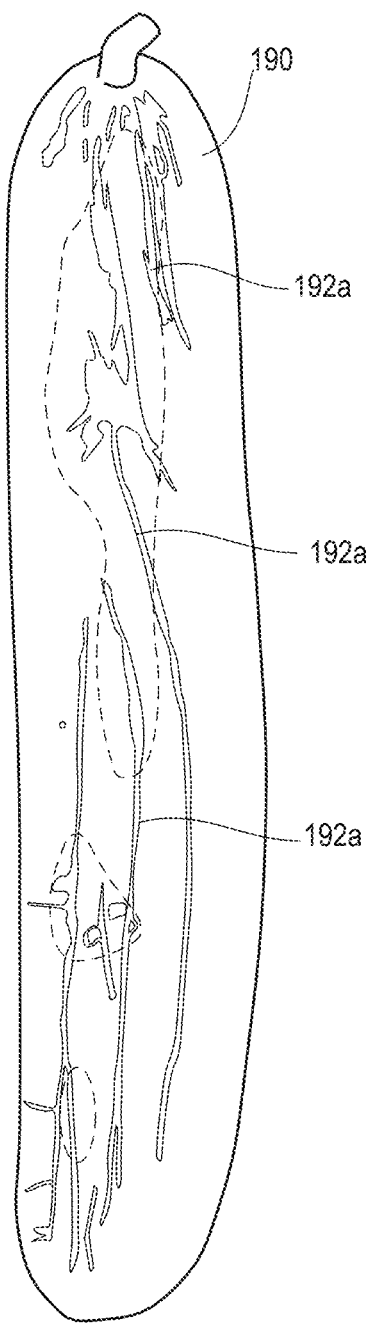
FIG. 8B depicts an image of the product being assessed as a heat map derived during a class activation map (CAM) analysis.

In certain aspects, the processor of the control circuit 410 of the computing device 150 is programmed to extract raw data from an image of a product 190 (e.g., a cucumber) captured by an image capture device 106 (as in FIG. 8A) and to analyze this raw data by employing the trained machine learning/computer vision model and/or transfer learning in conjunction with class activation maps (CAMs), resulting in an image (as in FIG. 8B) that visually identifies the pixels of the original image that contribute most to a damage/defect feature (e.g., scars) of a product 190 being analyzed. FIGS. 8A-8D depict the steps of an exemplary process, where the control circuit 410 extracts the defects identified on the surface of the product 190 and calculates the area of the defect, with FIG. 8A showing an original image of a product 190 that includes scar marks 192a, and FIG. 8B representing a class activation heat map of the image in FIG. 8A, localizing the scars on the surface of the product 190.

Figure 8C:
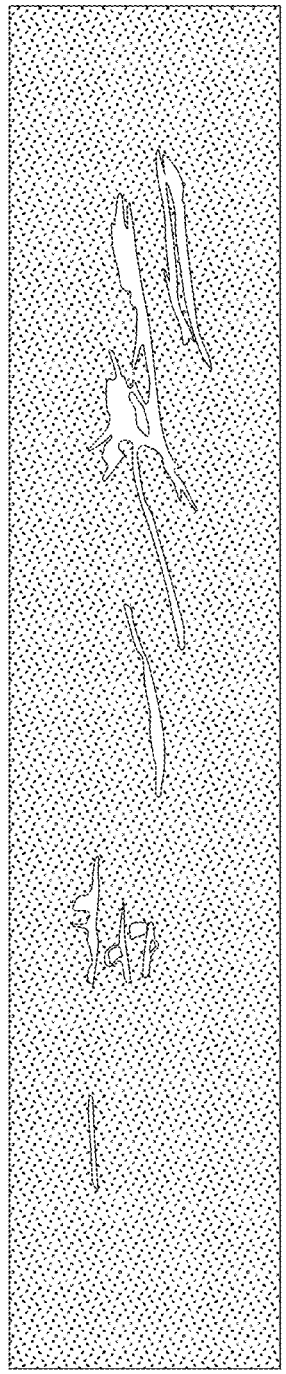
FIG. 8C depicts an image of the product being assessed after binarization is applied to the CAM heat map image of FIG. 8B.
Figure 8D:
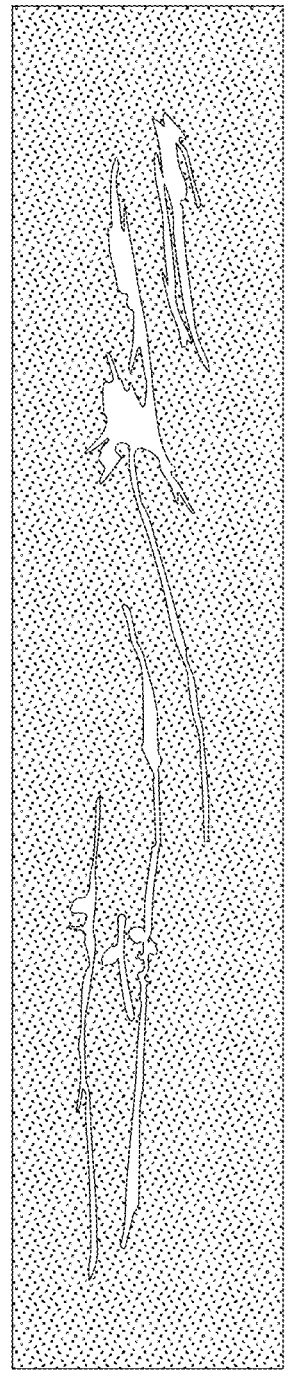
FIG. 8D depicts an image of the product being assessed showing scar defects on the product being assessed after the connected components algorithm is applied to the binarization-based image of FIG. 8C.

In one embodiment, after obtaining/generating a class activation heat map as in FIG. 8B, the control circuit 410 is programmed to process this heat map using a binarization technique to obtain/determine the pixels associated with a detected defect (i.e., scars) on the surface of the product 190, represented by the image shown in FIG. 8C. Generally speaking, image binarization processing by the control circuit 410 may include converting color scale images into black and white (0 and 1), thereby providing sharper and clearer contours of various objects (product 190, defects (i.e., scars) on the product 190) present in the image, and improving the precision of the machine learning/computer vision-based models. In some aspects, after applying binarization to result in the image shown in FIG. 8C, the control circuit 410 is programmed to apply a connected components algorithm to extend the defects outside of the CAM heat map, resulting in an image as shown in FIG. 8D. In one implementation, a reference scale is used when the original image of the product 190 is captured using the image capture device 160, and the control circuit 410 is programmed to determine an area of each of the defects detected on a surface of the product 190 via the reference scale.

In certain aspects, instead of employing class activation maps, the processor 410 of the control circuit 410 of the computing device 150 is programmed to extract raw data from an image of a product 190 (e.g., a cucumber) captured by an image capture device 106 and to analyze this raw data by employing a trained machine learning/computer vision model in conjunction with image segmentation techniques, resulting in an image (as in FIG. 9B) that visually identifies the areas of the original image that correspond to a defect feature (e.g., sunken surface) of the product 190. Generally, image segmentation is the process of partitioning a digital image into multiple segments (e.g., sets of pixels or image objects) in order to simplify the original image into representation of an image into an image that makes it easier to detect and localize certain objects of interest (in this example, area of sunken surfaces) in the image. More precisely, image segmentation involves assigning a label to every pixel in an image such that pixels with the same label share certain characteristics, with the goal being to get a view of objects of the same class divided into difference instances.

An exemplary original image of a product 190 (i.e., a cucumber) is shown in FIG. 9A, and an exemplary image obtained using image segmentation and clearly identifying the defects (i.e., sunken areas) 194a, 194b of interest is shown in FIG. 9B. In one implementation, a reference scale is used when the original image (as in FIG. 9A) of the product 190 is captured using the image capture device 106, and the control circuit 410 is programmed to determine an area of each of the defects 194a, 194b detected on a surface of the product 190 in the image generated via image segmentation via the reference scale.

FIG. 10 is a flow chart depicting an exemplary method 1000 of assessing a quality of a product 190, in according to some embodiments. The exemplary method 1000 may include providing a housing 102 including an interior 112 and an opening 115 configured to allow placement of at least one product 190 to be assessed for quality into the interior 112 of the housing 102 (step 1010). As pointed out above, the method may include providing the product holding surface 104 with one or more transparent stoppers 108 sized and shaped to restrict the product 190 from moving on the product holding surface 104 and hold the product 190 in a position such that the defect on the product 190 faces the image capture device 106. The exemplary method 1000 of FIG. 10 may further include providing a product holding surface 104 configured to support one or more products 190 located within the housing 102, with the product holding surface allowing images to be taken through the product holding surface 104 and dividing the housing 102 into a first portion 1140 and a second portion 116 (step 1020). Notably, steps 1010 and 1020 may be optional in some embodiments, as the method 1000 may be implemented to assess the quality of the product 190 without the housing 102 or the product supporting surface 104 of the housing 102.

Additionally, the method 1000 includes providing at least one image capture device 106a, 106b coupled to the housing 102 and configured to capture at least one image of the at least one product 190 from at least one perspective, for example, from a top view, bottom view, side view, etc. (step 1030). In some embodiments, the method may include illuminating at least side wall of the housing 102 facing the interior 112 by one or more lighting elements to provide a monochromatic background, and changing (e.g., in response to a signal transmitted by the control circuit 410) the color of one or more side walls of the housing 102 via the via one or more of the lighting elements 110a, 110b, 110c, and 110d. In certain implementations, the method may include indicating, via lighting elements configured as status lights, an operational status of at least one of the control circuit 410, image capture device 106, and lighting element 110.

With reference to FIG. 10, the method 1000 further includes providing an electronic database 140 configured to store electronic data including reference image data associated with one or more products 190 being assessed for quality and representing the one or more products 190 in various sizes and various quality states (step 1050). In addition, the method 1000 includes providing a processor-based control circuit 410 in communication with at least one of the first image capture device 106, the at least one lighting element 110, and the electronic database 140 (step 1060).

The exemplary method 1000 of FIG. 10 further includes, via the control circuit 410, obtaining actual image data representing one or more images of the product 190 being assessed, obtaining, from the electronic database 140, the reference image data, and analyzing the actual image data and the reference image data to identify the at least one product and identify a size of a defect present on the at least one product (step 1070). In certain implementations, the method 1000 may include analyzing, by the control circuit 410, the actual image data and the reference image data to detect exterior contours of the product 190 being assessed to identify the size of the product (e.g., at least one of length, width, and height). In one embodiment, the method 1000 includes analyzing the actual image data and the reference image data to identify a type of defect (e.g., scars, shriveled ends, sunken areas, decay, etc.) present on the product 190 and outputting an indication of the type of defect on the product 190 identified by the control circuit 410.

In one implementation, the method 1000 may include determining, by the control circuit 410, a scale factor and a number of pixels representing the contours of the product 190 using a color card (e.g., a Macbeth color checker chart), and translating the number of pixels representing the contours of the product 190 to actual dimensions (e.g., inches, centimeters, etc.) of the product 190. In another implementation, the method 1000 may include analyzing, by the control circuit 410, the actual image data associated with the product 190 using the color card to white balance and color correct colors in the actual image data, thus enabling the control circuit 410 to more precisely define the contours of the product 190 and more precisely determine the size of the product 190 (and the size of the defects on the product 190), even based on images of the product 190 taken at different lighting conditions.

With reference back to FIG. 10, the method 1000 further includes the control circuit 410, after an analysis by the control circuit 410 of the actual image data and the reference image data associated with the product 190 being assessed for quality, outputting a notification indicating whether or not the product 190 is of acceptable quality (step 1080). In some embodiments, the method 1000 may include determining, via the control circuit 410, a scale factor of an image of the product 190, and a number of pixels representing the contours of the product 190 (using a color card or without a color card), then translating the number of pixels representing the contours of the product 190 to actual dimensions of the product 190, and then outputting, to a display screen 460 of the computing device 150 or to a graphical, user-modifiable dashboard interface accessible by a worker of the retailer via the worker's mobile electronic device, an electronic notification (text-based, voice based, etc.) indicating whether or not the product 190 is of an acceptable quality.

The above-described exemplary embodiments of the methods and systems of assessing the quality of retail products advantageously provide a scalable automated solution for collecting image data in association with the retail products and building/training machine learning models that provide for efficient and precise identification of a large number of retail products, as well as for efficient and precise detection of damage/defects on these retail products (especially perishable products such as fruits, vegetables, etc.). As such, the systems and methods described herein provide for an efficient and precise tool for a retailer to determine whether the retail products delivered to the retailer are acceptable for offering for sale to the consumers, thereby providing a significant cost in operation savings and the corresponding boost in revenue to the retailer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for assessing quality of a plurality of products, the system comprising:
   at least one image capture device configured to capture at least one image of at least one product of the plurality of products from at least one perspective, the products being perishable, consumable items selected from a group consisting of: food items, grocery items, beverage items, medication items, and dietary supplement items;
   an electronic database configured to store electronic data including reference image data associated with the at least one product and representing the at least one product in various sizes and various quality states;
   a processor-based control circuit in communication with at least one of the first image capture device and the electronic database, and configured to:
   obtain image data representing the at least one image of the at least one product;
   obtain, from the electronic database, the reference image data;
   analyze the image data and the reference image data to:
   identify the at least one product;
   identify a type of a defect present on a surface of the at least one product;
   identify a surface area of the defect present on the surface of the at least one product;
   correlate the type of the defect and the surface area of the defect present on the surface of the at least one product to the type of the at least one product and an overall surface area of the at least one product to determine a defect severity level of the at least one product; and
correlate the determined defect severity level of the at least one product to a threshold defect severity level predetermined for the type of the at least one product to determine whether the at least one product is of acceptable quality for consumption by a consumer, and:
when the determined defect severity level of the at least one product is below the threshold defect severity level predetermined for the at least one product, output a notification for the at least one product indicating that the at least one product is of acceptable quality for consumption by the consumer; and
when the determined defect severity level of the at least one product is above the threshold defect severity level predetermined for the at least one product, output a notification for the at least one product indicating that the at least one product is not of acceptable quality for consumption by the consumer.

2. The system of claim 1, wherein the control circuit is further programmed to analyze the image data and the reference image data to detect exterior contours of the at least one product to identify the size of the at least one product, the size of the at least one product including at least one of length, width, and height of the at least one product.

3. The system of claim 2, wherein the control circuit is further programmed to:
determine a scale factor and a number of pixels representing the contours of the at least one product using a color card; and
translate the number of pixels representing the contours of the at least one product to physical dimensions of the at least one product.

4. The system of claim 1, wherein the control circuit is further programmed to analyze the image data associated with the at least one product using a color card to white balance and color correct colors in the image data.

5. The system of claim 1, wherein the control circuit is further programmed to:
analyze the image data and the reference image data to identify a type of defect present on the at least one product; and
output an indication of the type of defect on the at least one product identified by the control circuit.

6. The system of claim 1, wherein the control circuit is further programmed to analyze the image data and the reference image data to determine an area of the defect present on the at least one product via a machine learning model, wherein the machine learning model is trained using the reference image data stored in the electronic database.

7. The system of claim 1, further comprising:
a housing including an interior and an opening configured to allow placement of the at least one product into the interior of the housing;
a product holding surface located within the housing, wherein the product holding surface allows images to be taken through the product holding surface, wherein the product holding surface is configured to support the at least one product;
wherein the product holding surface includes one or more transparent stoppers sized and shaped to restrict the at least one product from moving on the product holding surface and hold the at least one product in a position such that the defect on the at least one product faces the at least one image capture device.

8. The system of claim 7, further comprising at least one lighting element located within the housing and configured to provide lighting within the housing, wherein:
the housing includes at least one side wall facing the interior;
the at least side wall is illuminated by the at least one lighting element to provide a monochromatic background; and
the at least one lighting element, in response to a signal transmitted by the control circuit, changes a color of the at least one side wall.

9. The system of claim 7, further comprising at least one lighting element located within the housing, wherein the at least one lighting element includes one or more status lights indicating an operational status of at least one of the control circuit, the at least one image capture device, and the at least one lighting element.

10. The system of claim 1, wherein the type of defect present on the surface of the at least one product comprises at least one of: scars, shriveled ends, sunken areas, bruising, mold, and decay.

11. A method of assessing quality of a plurality of products, the method comprising:
capturing at least one image of at least one product of the plurality of products from at least one perspective by at least one image capture device, the products being perishable, consumable items selected from a group consisting of: food items, grocery items, beverage items, medication items, and dietary supplement items;
storing, in an electronic database, electronic data including reference image data associated with the at least one product and representing the at least one product in various sizes and various quality states;
by a processor-based control circuit that is in communication with at least one of the first image capture device and the electronic database:
obtaining image data representing the at least one image of the at least one product;
obtaining, from the electronic database, the reference image data;
analyzing the image data and the reference image data to:
identify the at least one product;
identify a type of a defect present on a surface of the at least one product;
identify a surface area of the defect present on the surface of the at least one product;
correlating the type of the defect and the surface area of the defect present on the surface of the at least one product to the type of the at least one product and an overall surface area of the at least one product to determine a defect severity level of the at least one product; and
correlating determined defect severity level of the at least one product to a threshold defect severity level predetermined for the type of the at least one product to determine whether the at least one product is of acceptable quality for consumption by a consumer; and:
when the determined defect severity level of the at least one product is below the threshold defect severity level predetermined for the at least one product, outputting a notification for the at least one product indicating that the at least one product is of acceptable quality for consumption by the consumer; and when the determined defect severity level of the at least one product is above the threshold defect severity level predetermined for the at least one product, outputting a notification for the at least one product indicating that the at least one product is not of acceptable quality for consumption by the consumer.

12. The method of claim 11, further comprising analyzing, via the control circuit, the image data and the reference image data to detect exterior contours of the at least one product to identify the size of the at least one product, the size of the at least one product including at least one of length, width, and height of the at least one product.

13. The method of claim 12, further comprising, by the control circuit:
determining a scale factor and a number of pixels representing the contours of the at least one product using a color card; and
translating the number of pixels representing the contours of the at least one product to physical dimensions of the at least one product.

14. The method of claim 11 further comprising analyzing, by the control circuit, the image data associated with the at least one product using a color card to white balance and color correct colors in the image data.

15. The method of claim 11, further comprising, by the control circuit:
analyzing the image data and the reference image data to identify a type of defect present on the at least one product; and
outputting an indication of the type of defect on the at least one product identified by the control circuit.

16. The method of claim 11, further comprising analyzing, by the control circuit the image data and the reference image data to determine an area of the defect present on the at least one product via a machine learning model, wherein the machine learning model is trained using the reference image data stored in the electronic database.

17. The method of claim 11, further comprising:
providing a housing including an interior and an opening configured to allow placement of the at least one product into the interior of the housing;
providing a product holding surface located within the housing, wherein the product holding surface allows images to be taken through the product holding surface, wherein the product holding surface is configured to support the at least one product; and
providing the product holding surface with one or more transparent stoppers sized and shaped to restrict the at least one product from moving on the product holding surface and hold the at least one product in a position such that the defect on the at least one product faces the at least one image capture device.

18. The method of claim 17, further comprising providing at least one lighting element within the housing and configured to provide lighting within the housing, wherein:
the housing includes at least one side wall facing the interior;
the at least side wall is illuminated by the at least one lighting element to provide a monochromatic background; and,
by the at least one lighting element and in response to a signal transmitted by the control circuit, changing a color of the at least one side wall.

19. The method of claim 17, further comprising providing at least one lighting element within the housing, wherein the at least one lighting element includes one or more status lights indicating an operational status of at least one of the control circuit, the at least one image capture device, and the at least one lighting element.

20. The method of claim 11, wherein the type of defect present on the surface of the at least one product comprises at least one of: scars, shriveled ends, sunken areas, bruising, mold, and decay.

* * * * *